(12) United States Patent
Sakoda

(10) Patent No.: US 10,116,367 B1
(45) Date of Patent: Oct. 30, 2018

(54) METHOD AND SYSTEM FOR MULTIPLE-HOP RELAYED DIRECTIONAL WIRELESS COMMUNICATION

(71) Applicant: SONY CORPORATION, Tokyo (JP)

(72) Inventor: Kazuyuki Sakoda, Campbell, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/618,577

(22) Filed: Jun. 9, 2017

(51) Int. Cl.
| H04B 7/04 | (2017.01) |
| H04B 7/0491 | (2017.01) |
| H04B 7/06 | (2006.01) |
| H04L 12/721 | (2013.01) |

(52) U.S. Cl.
CPC .......... *H04B 7/0491* (2013.01); *H04B 7/061* (2013.01); *H04L 45/26* (2013.01)

(58) Field of Classification Search
CPC ........ H04B 7/0491; H04B 7/061; H04L 45/26
See application file for complete search history.

(56) References Cited

U.S. PATENT DOCUMENTS

| 9,474,009 | B2 | 10/2016 | Deenoo et al. | |
|---|---|---|---|---|
| 2008/0080449 | A1* | 4/2008 | Huang | H04B 7/0634 370/342 |
| 2013/0156120 | A1* | 6/2013 | Josiam | H04B 7/0697 375/260 |
| 2015/0382275 | A1* | 12/2015 | Pragada | H04W 40/12 370/236 |
| 2016/0029403 | A1 | 1/2016 | Roy et al. | |
| 2016/0183232 | A1 | 6/2016 | Stirling-Gallacher et al. | |
| 2017/0034812 | A1 | 2/2017 | Deng et al. | |
| 2017/0156153 | A1 | 6/2017 | Hart et al. | |

FOREIGN PATENT DOCUMENTS

GB       2455794 A       6/2009

OTHER PUBLICATIONS

ISA/European Patent Office, International Search Report and Written Opinion dated Aug. 24, 2018, related PCT International Application No. PCT/162018/053816, pp. 1-18, claims searched, pp. 19-23.
Pirzada, Asad Amir et al., "Multi-Linked AODV Routing Protocol for Wireless Mesh Networks", IEEE Global Telecommunications Conference 2007 (IEEE Globecom 2007), proceedings, pp. 4925-4930, Nov. 1, 2007.
Nitsche, Thomas et al., "IEEE 802.11ad: Directional 60 GHz Communication for Multi-Gigabit-per-Second Wi-Fi", IEEE Communications Magazine, vol. 52, No. 12, Dec. 1, 2014, pp. 132-141.

* cited by examiner

*Primary Examiner* — Kenneth Lam
(74) *Attorney, Agent, or Firm* — John P. O'Banion

(57) ABSTRACT

Multiple-hop relayed directional beam formed wireless communication (mm-wave mesh network) method and apparatus which takes place at the PHY layer. Network capability is enhanced by improving routing protocols between neighboring STAs when communicating from an originating STA, through intermediate STAs, to a destination STA. The routing takes into consideration antenna sector selection to limit interference with neighboring STAs, and channel time utilization to increase throughput. Link metrics and channel times are established for optimizing routing and the determination of intermediate stations between an originating STA and a destination STA. The apparatus and method balances both end-end path link quality and interference impact.

18 Claims, 44 Drawing Sheets

METHOD AND SYSTEM FOR MULTIPLE-HOP RELAYED DIRECTIONAL WIRELESS COMMUNICATION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional wireless communications between stations, and more particularly to multiple-hop relayed directional wireless communication.

2. Background Discussion

Millimeter wave (mm-wave) technology, such as between 30 GHz and 300 GHz, and more preferably around 60 GHz, is a promising physical (PHY) layer (e.g., seven-layer OSI model) technology for high bandwidth communications. Certain communication devices in the mm-wave PHY layer are configured for using directional transmissions to mitigate its poor link budget. As the transmission is beam-formed, it is possible to mitigate interference to other neighbor STAs. Theoretically, this leads to higher system capacity as the spectrum can be reused by neighboring STAs more aggressively compared with non-beam-formed PHY, such as 2.4 GHz or 5 GHz WLAN. However, due to their configuration, present systems are unable to reach toward these theoretical limits.

BRIEF SUMMARY

A need exists for improved directional wireless routing protocols. Accordingly, this disclosure describes an efficient multiple-hop (multi-hop) communication network that uses directional transmission in the PHY layer (i.e., mm-wave PHY), and which is referred to herein as a mm-wave mesh network. It should be noted that link budget of mm-wave PHY is still poor even with beam-formed transmission. Adding multi-hop relay capability is a promising technology mix toward overcoming some of the drawbacks of mm-wave PHY.

Although the concept of mm-wave mesh network is not new, there are many unknowns on how to operate and manage such a network, and current offerings have numerous shortcomings.

The present disclosure provides a mm-wave mesh network with new operating and optimization processes. More specifically, the disclosed system, apparatus and/or method provides components to improve existing routing protocols of wireless mesh networks when operated over mm-wave PHY. In addition, an approach is taught for maximizing network capacity by facilitating spectrum reuse among neighbor stations (STAs).

A number of terms are found in the disclosure whose meanings are generally utilized as described below.

AODV: Ad-hoc On-Demand Distance Vector, a routing protocol for data packets in ad-hoc wireless networks.

Mesh networks: In a mesh network topology each node relays data for the network, and all mesh nodes cooperate in the distribution of data in the network. Mesh networks are a type of ad-hoc (spontaneous, impromptu, or on-the-fly construction) network.

Neighbor list: A data table containing information on neighbor STAs. Once STA receives management frame such as Beacon frame from another STA in its 1 hop communication area, it stores information on the neighbor STA in its memory. STA creates a data table by receiving management frames from neighbor STA. STA may collect multiple neighbor STAs information and store their information in neighbor list.

P2P: Peer-to-peer (P2P) communications arise when two or more stations are connected and share resources without going through a separate controller/server. A P2P network can be an ad hoc connection.

Routing table: A data table that stores information on the route to destination STAs. STA looks up routing table to determine to which immediate neighbor STA it should transmit a frame (next hop STA) when it try to transmit a frame to the destination STA.

RREQ: Routing Request, a packet used in data routing protocols to discover the path between the source STA and the destination STA.

RREP: Routing Reply, a packet transmitted in response to RREQ in routing protocols. Upon reception of RREP by source STA it can start transmitting the data packets.

RSS: Received signal strength (RSS) is a measurement of the power present in a received radio signal.

SSW: Sector Sweep, is an operation in which transmissions are performed in different sectors (directions) and information collected on received signals, strengths and so forth.

STA: Station; a logical entity that is a singly addressable instance of a medium access control (MAC) and physical layer (PHY) interface to the wireless medium (WM).

In typical mesh network, a route from Originating STA to Destination STA is determined by selecting intermediate STAs for the end-end path. Often, the intermediate STAs are chosen so that the links for use offer best link quality, as seen in the AODV example.

For the purpose of network capacity optimization it is desirable that the mesh links are selected so that the transmissions do not affect other transmissions. However, it is difficult to manage the interference if transmission signals are radiated to its neighboring STAs.

In mm-wave PHY, where directional transmission is used, it is possible to limit the interference impact to other neighbor STAs by selecting a proper antenna sector. Using techniques disclosed in our prior patent applications in the area of wireless directional mesh networks, it is possible for STAs to learn link quality of each antenna sector among one hop neighbor STAs.

The present disclosure teaches, for example, how to optimize multi-hop mm-wave mesh network by each of the following: (a) Running routing protocol to determine end-end route; (b) Picking up proper antenna sector for use when setting up a route; (c) Considering neighbor STAs channel time utilization and impact to the ongoing traffic at the neighbor STAs; (d) Assigning channel time at the time of route set up; (e) Accumulating forward link and reverse link metric for the determination of the route; and (f) Deciding intermediate STAs for the multi-hop path.

Another aspect of this technology is to extend routing decision protocols for including both picking up proper intermediate STAs and antenna sector for use toward optimize mm-wave mesh network. Still another aspect of this technology is the ability to balance both end-end path link quality and interference impact.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

Figure 9:
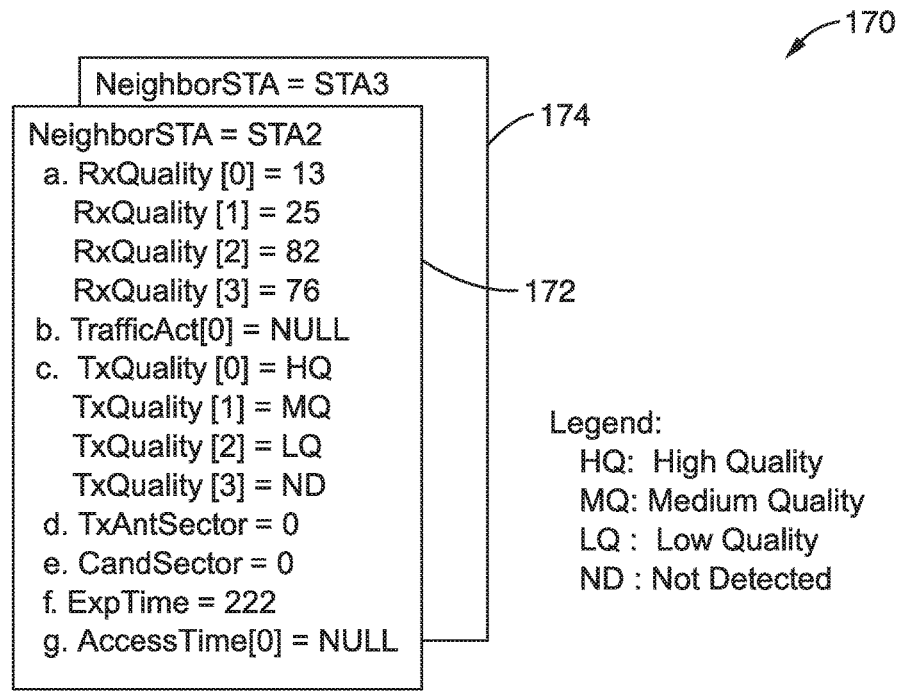

FIG. 9 a data table format for neighbor list construction as utilized according to an embodiment of the present disclosure.

Figure 10:
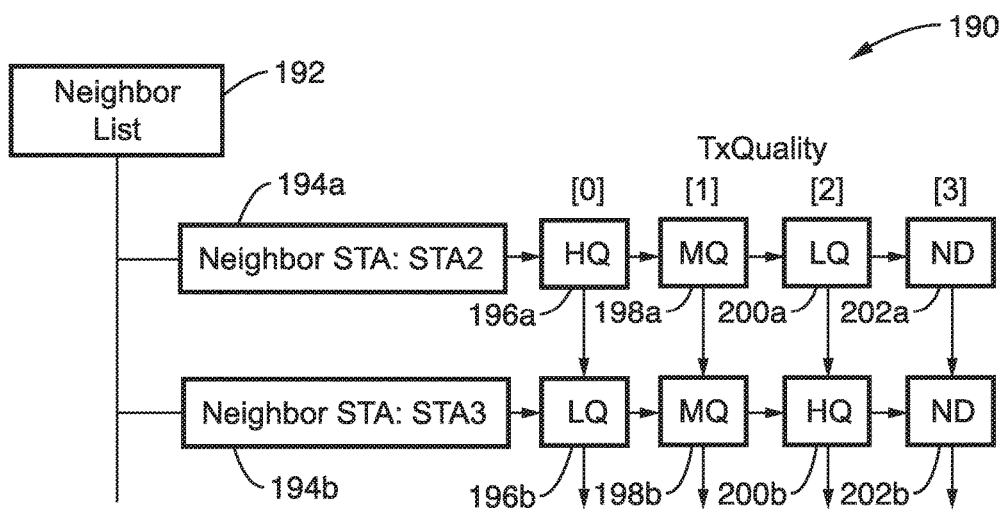

FIG. 10 is a data format within the neighbor list data structure as utilized according to an embodiment of the present disclosure.

Figure 11:
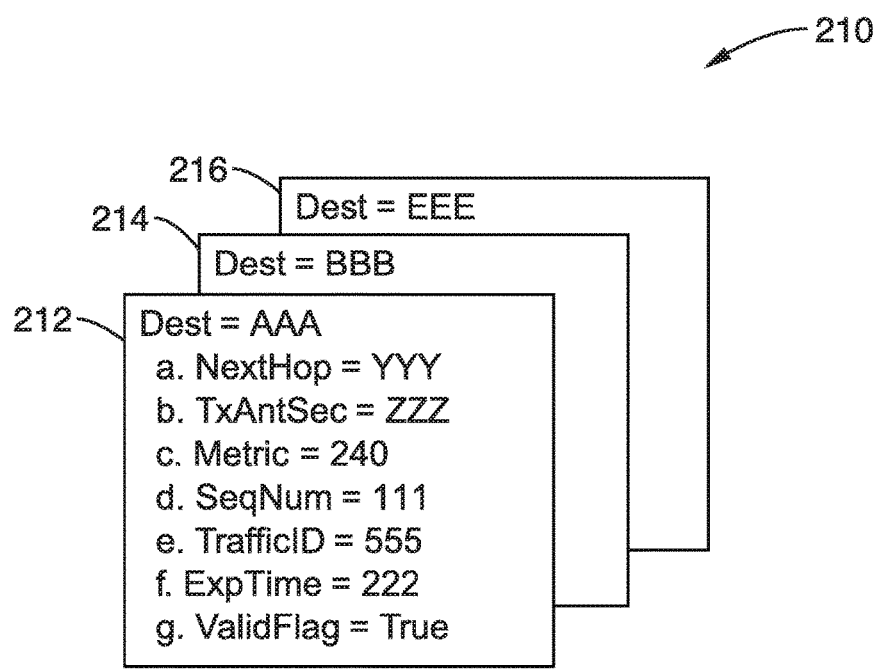

FIG. 11 is a data format for a routing table between neighboring STAs as utilized according to an embodiment of the present disclosure.

Figures 12A, 12B:
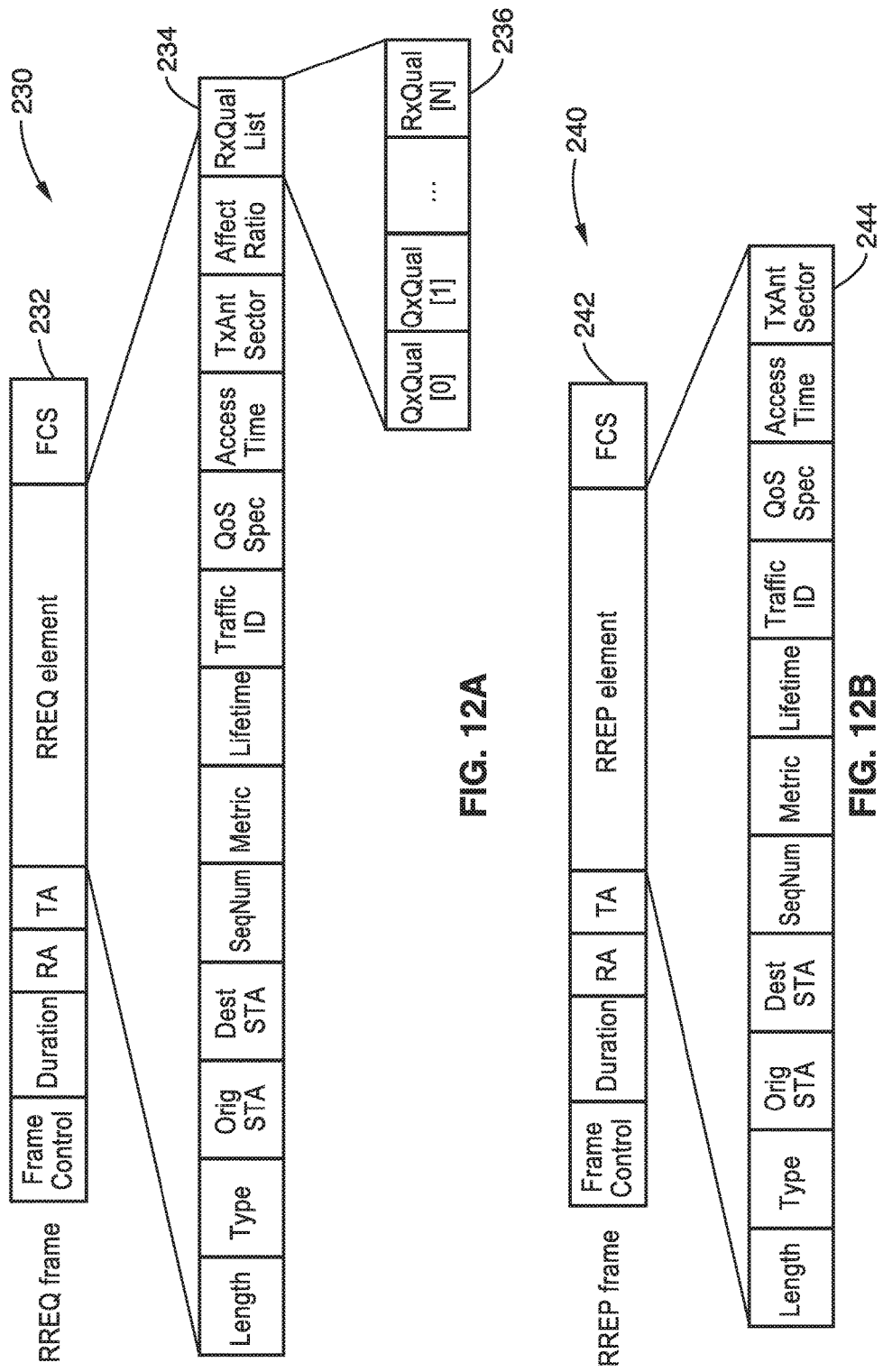

FIG. 12A and FIG. 12B are data field formats for RREQ and RREP frames as utilized according to an embodiment of the present disclosure.

Figure 13:
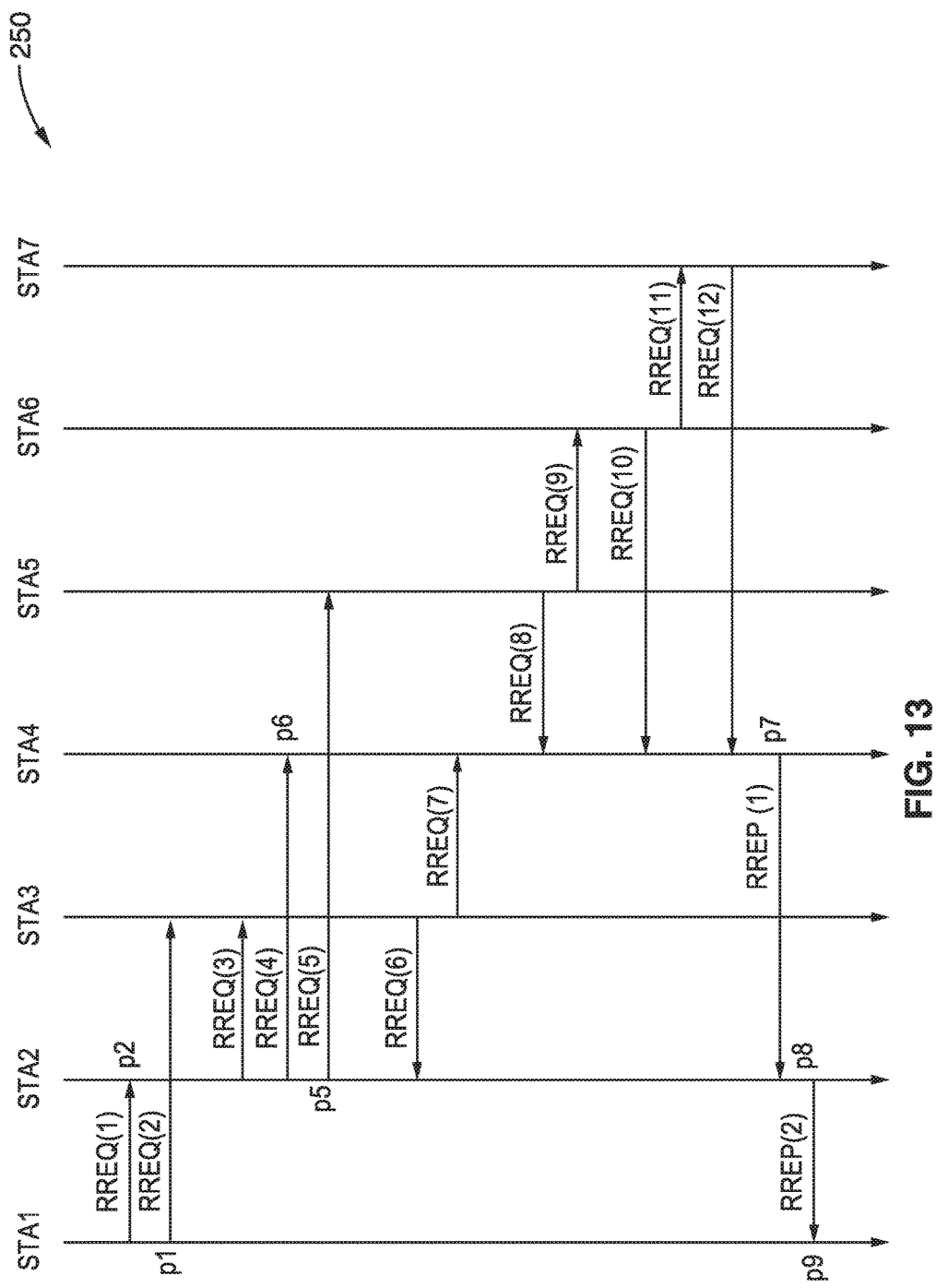

FIG. 13 is a message sequence for frame exchanges while establishing a route from an originating STA to a destination STA according to a first embodiment of the present disclosure.

Figure 14:
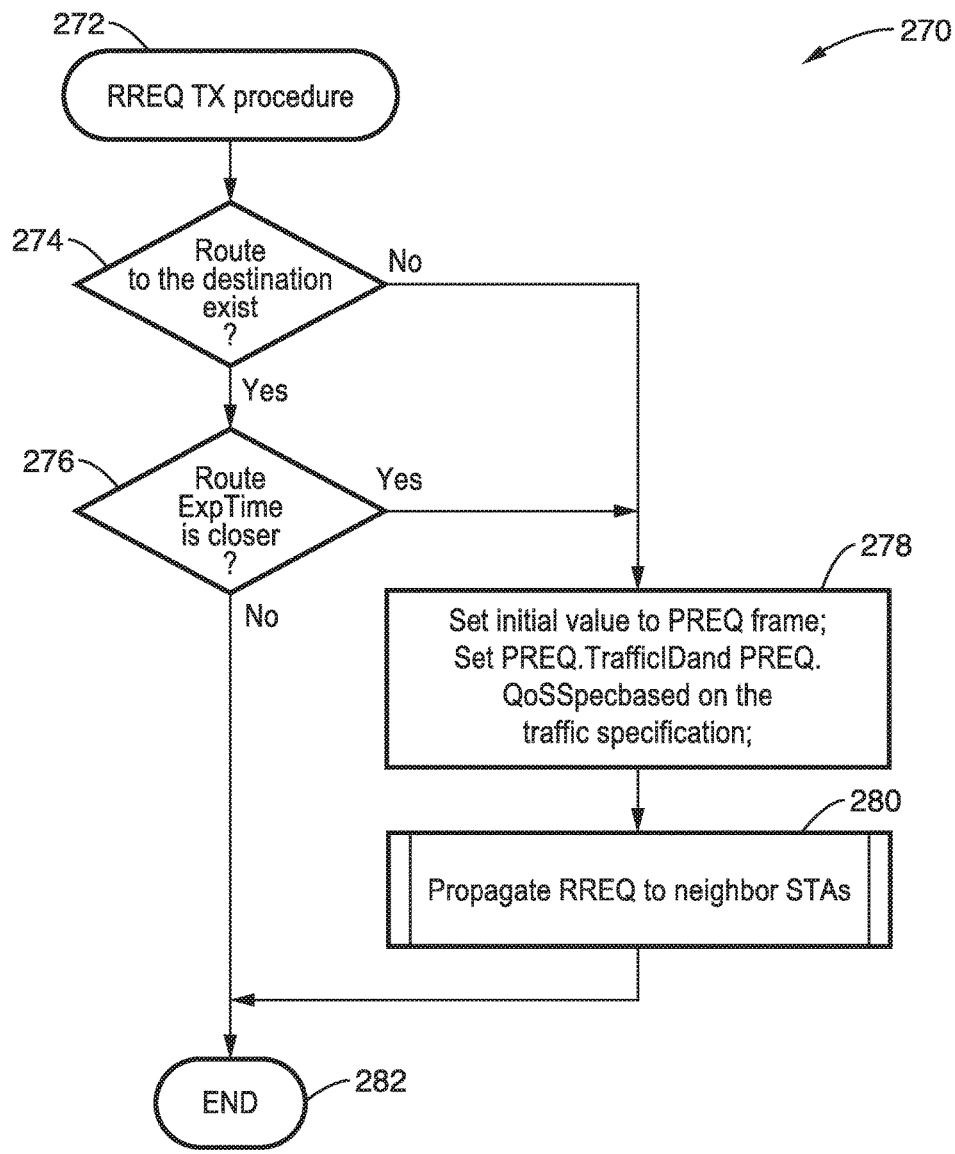

FIG. 14 is a flow diagram of originating RREQ transmission logic as utilized according to an embodiment of the present disclosure.

Figure 15A:
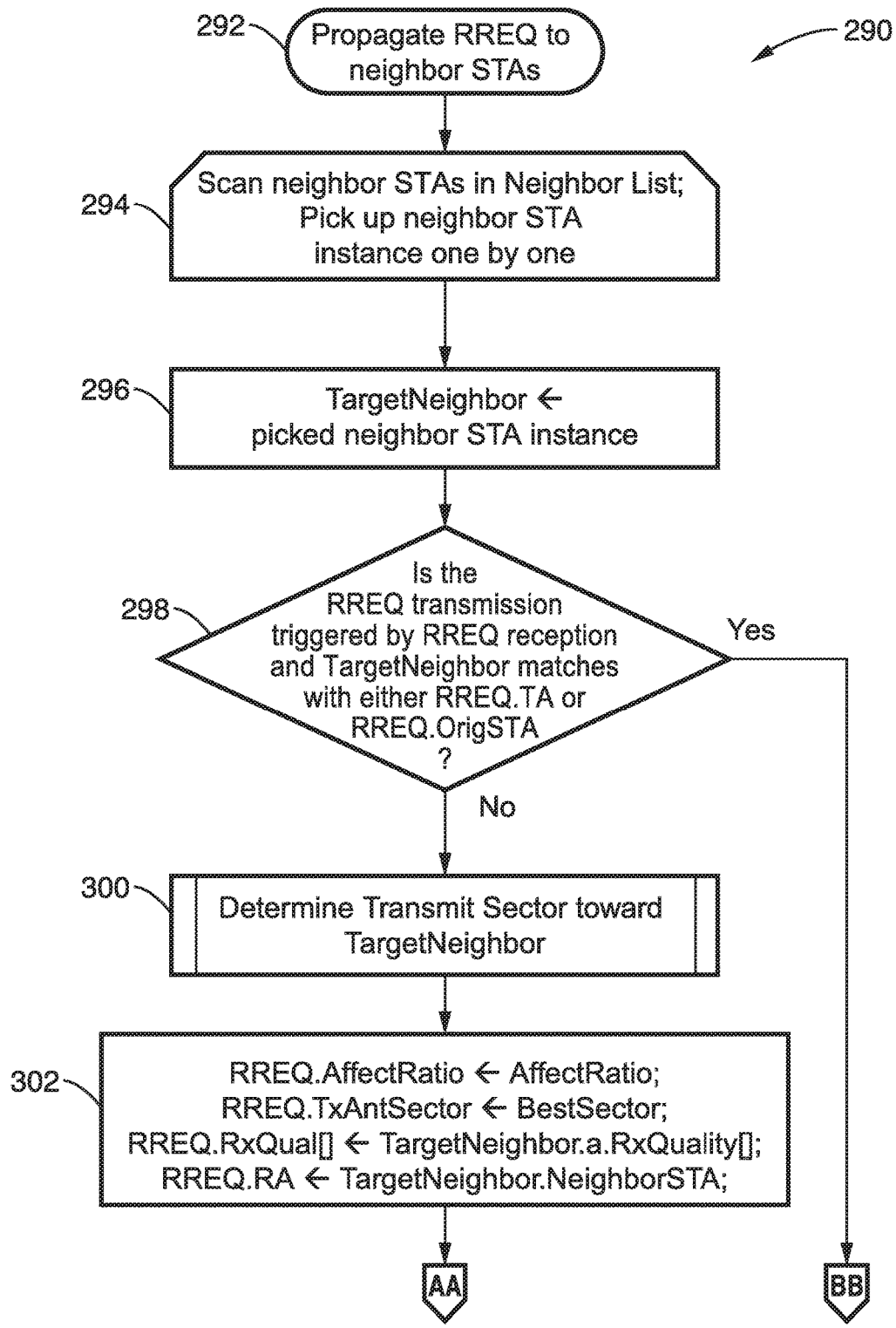
Figure 15B:
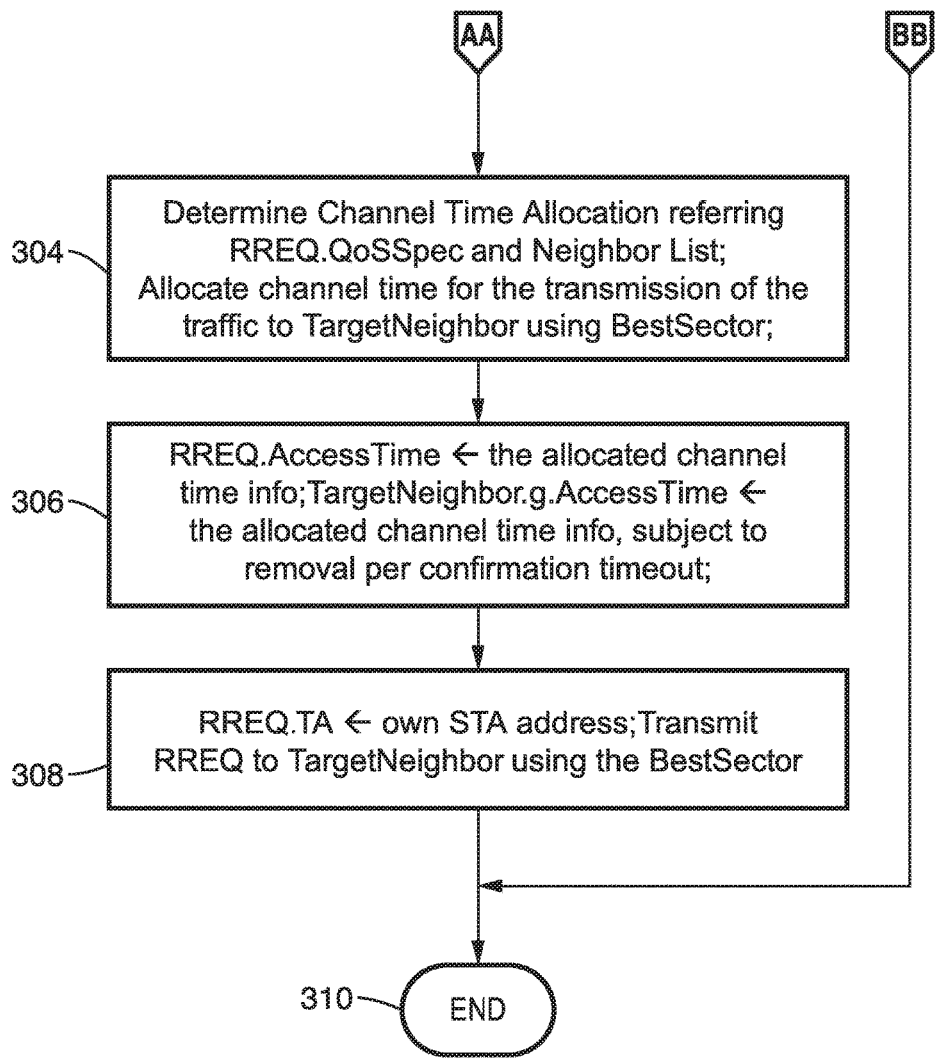

FIG. 15A and FIG. 15B are a flow diagram of propagating RREQs to neighbor STAs according to an embodiment of the present disclosure.

Figure 16A:
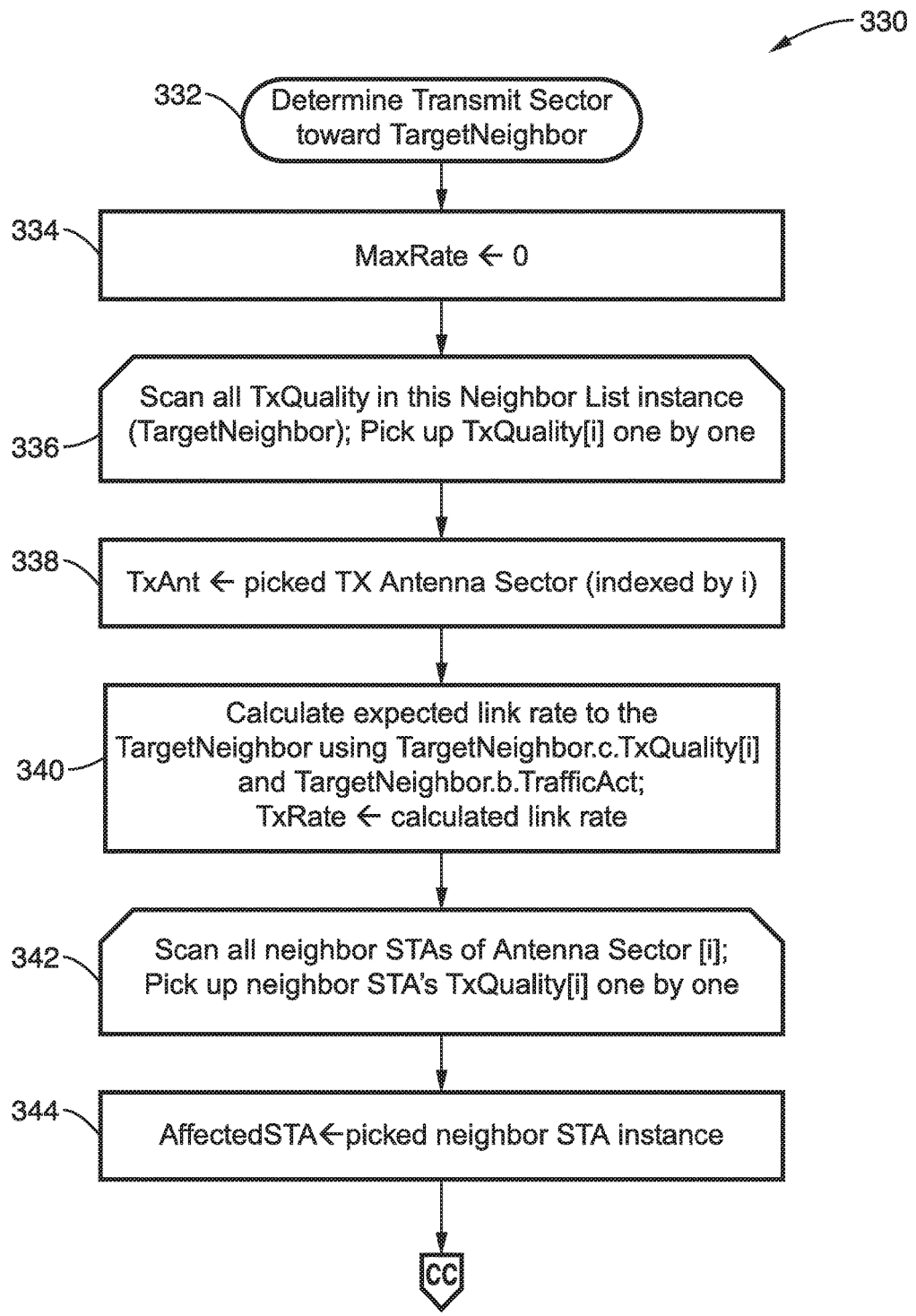
Figure 16B:
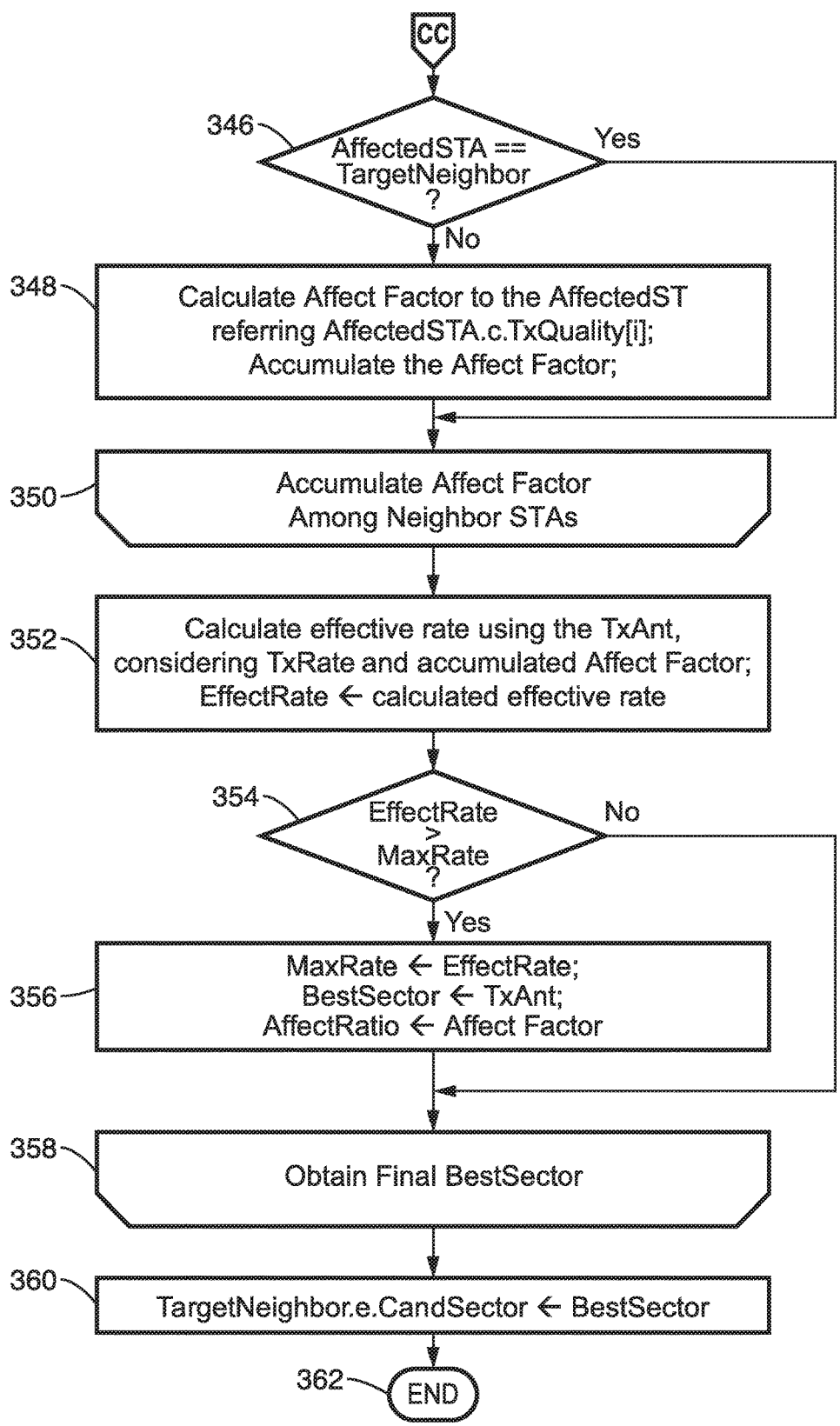

FIG. 16A and FIG. 16B are a flow diagram of determining transmit antenna sector to a neighboring STA according to an embodiment of the present disclosure.

Figure 17:
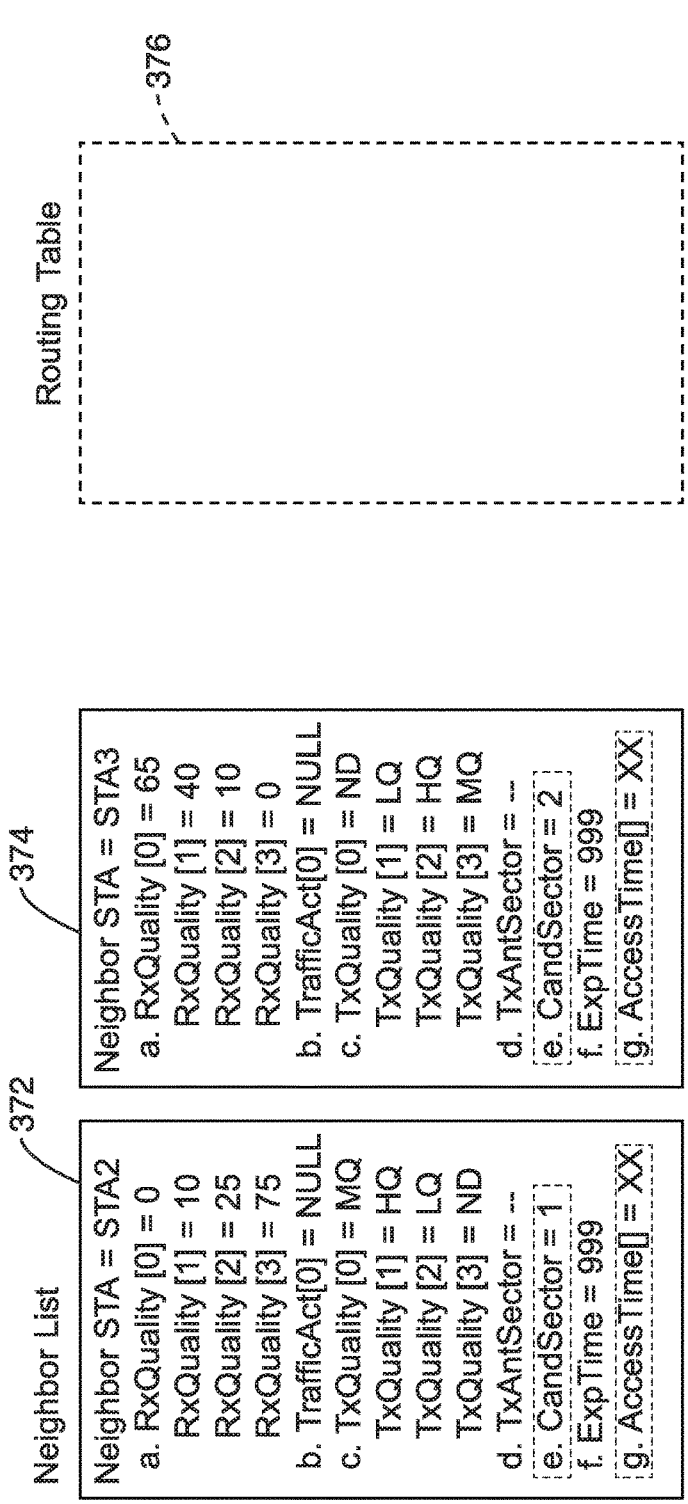

FIG. 17 is a neighbor list and routing table structure example for a communication scenario of STA1@P1, as utilized according to an embodiment of the present disclosure.

Figure 18A:
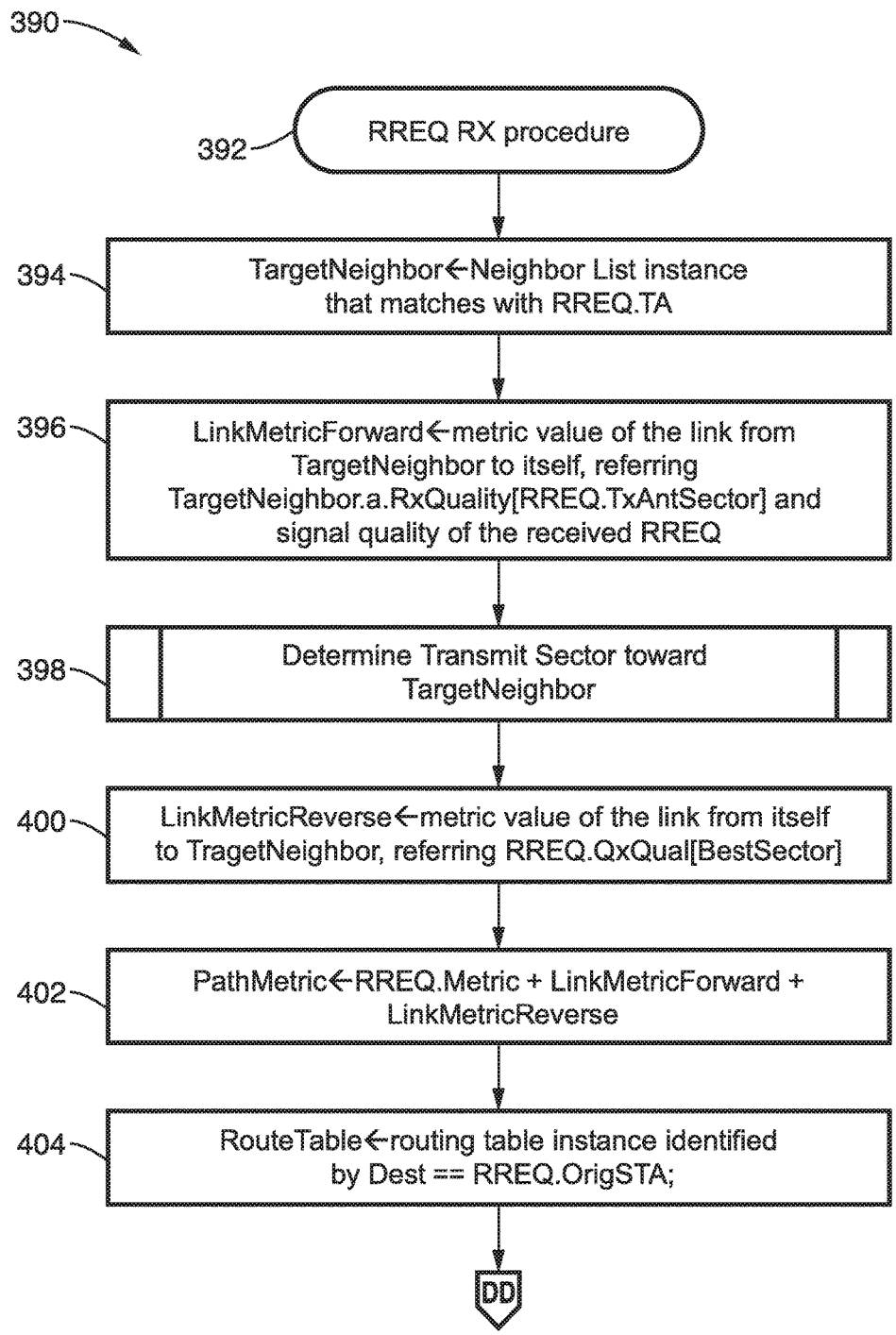
Figure 18B:
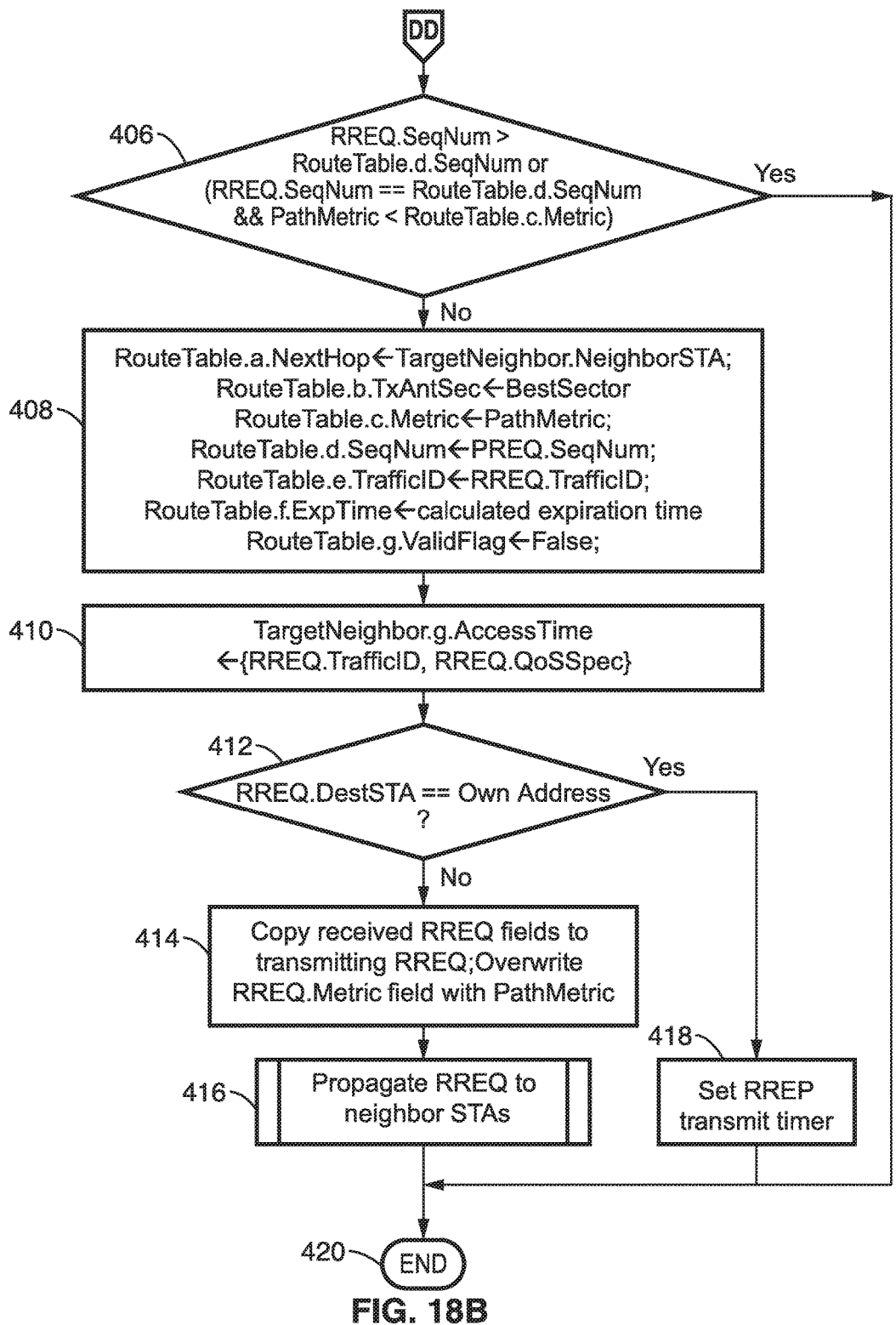

FIG. 18A and FIG. 18B are a flow diagram of RREQ receive procedure according to an embodiment of the present disclosure.

Figure 19:
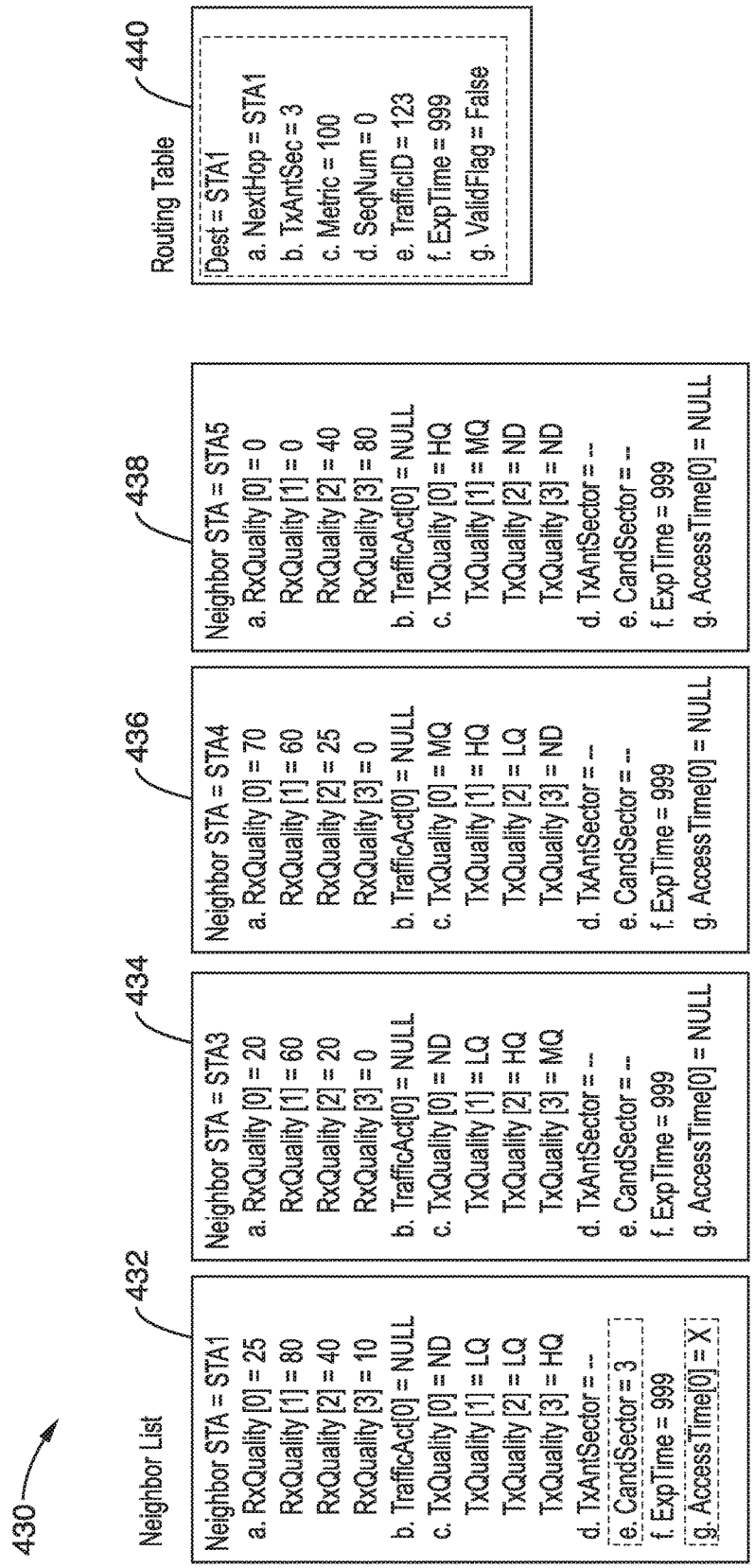

FIG. 19 is a neighbor list and routing table structure example for a communication scenario of STA2@P2, as utilized according to an embodiment of the present disclosure.

Figure 20:
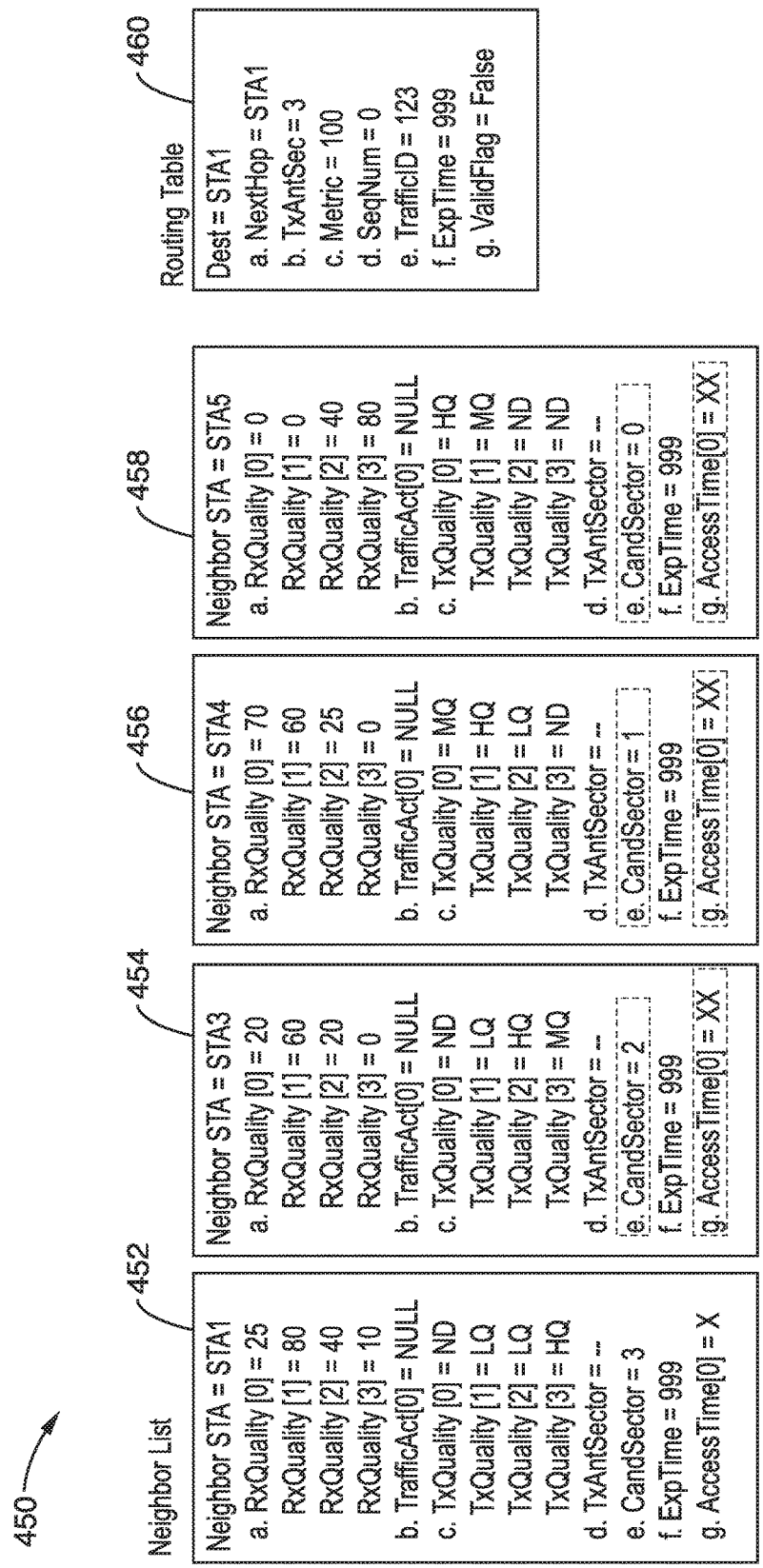

FIG. 20 is a neighbor list and routing table structure example for a communication scenario of STA2@P5, as utilized according to an embodiment of the present disclosure.

Figure 21:
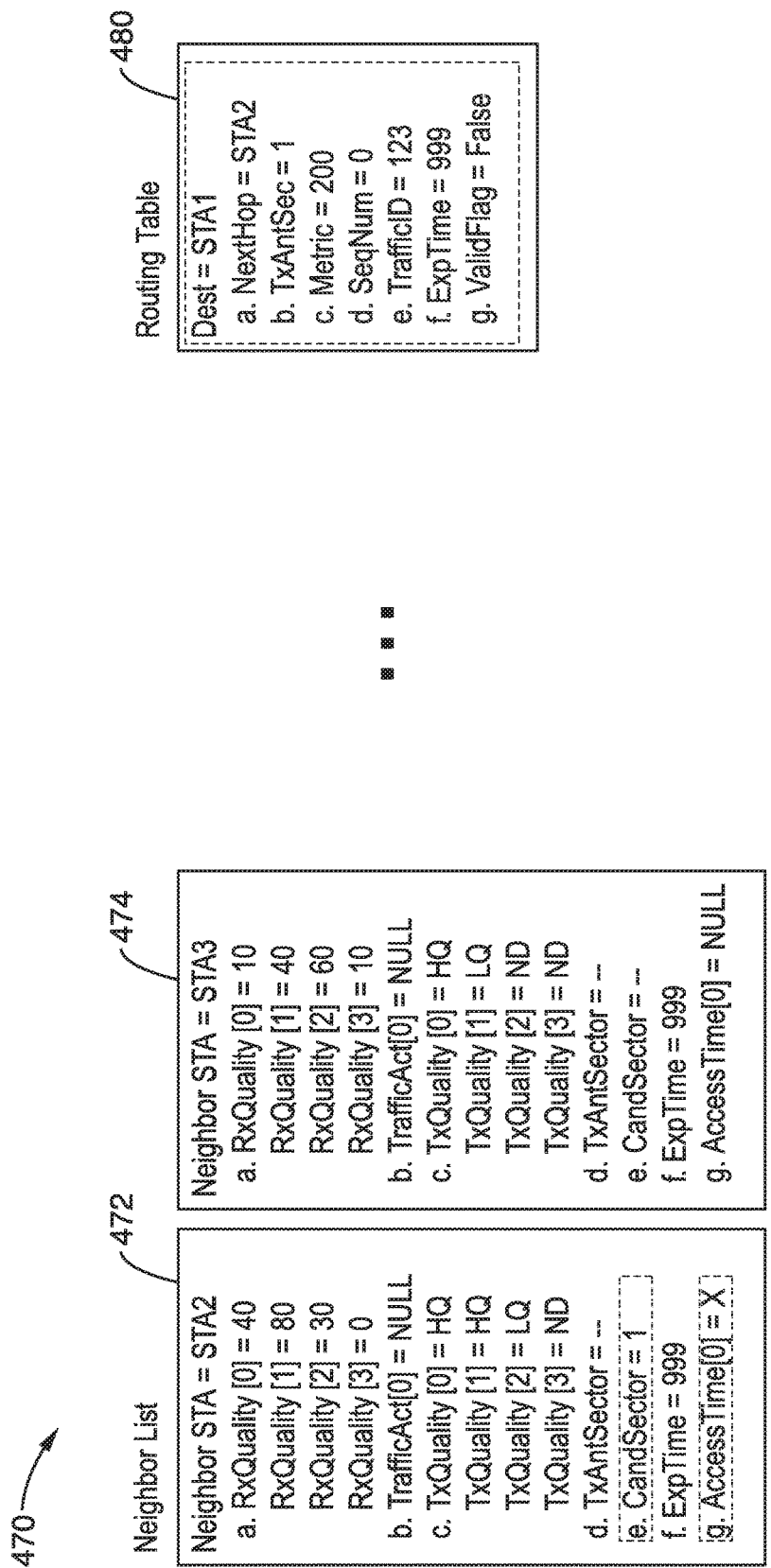

FIG. 21 is a neighbor list and routing table structure example for a communication scenario of STA4@P6, as utilized according to an embodiment of the present disclosure.

Figure 22:
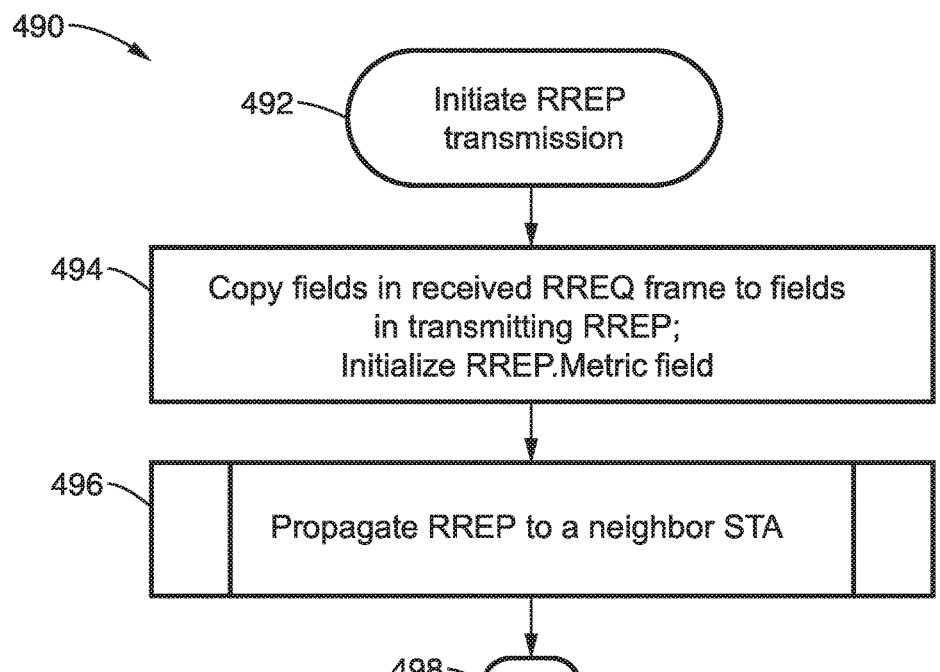

FIG. 22 is a flow diagram of initiating RREP transmission according to an embodiment of the present disclosure.

Figure 23:
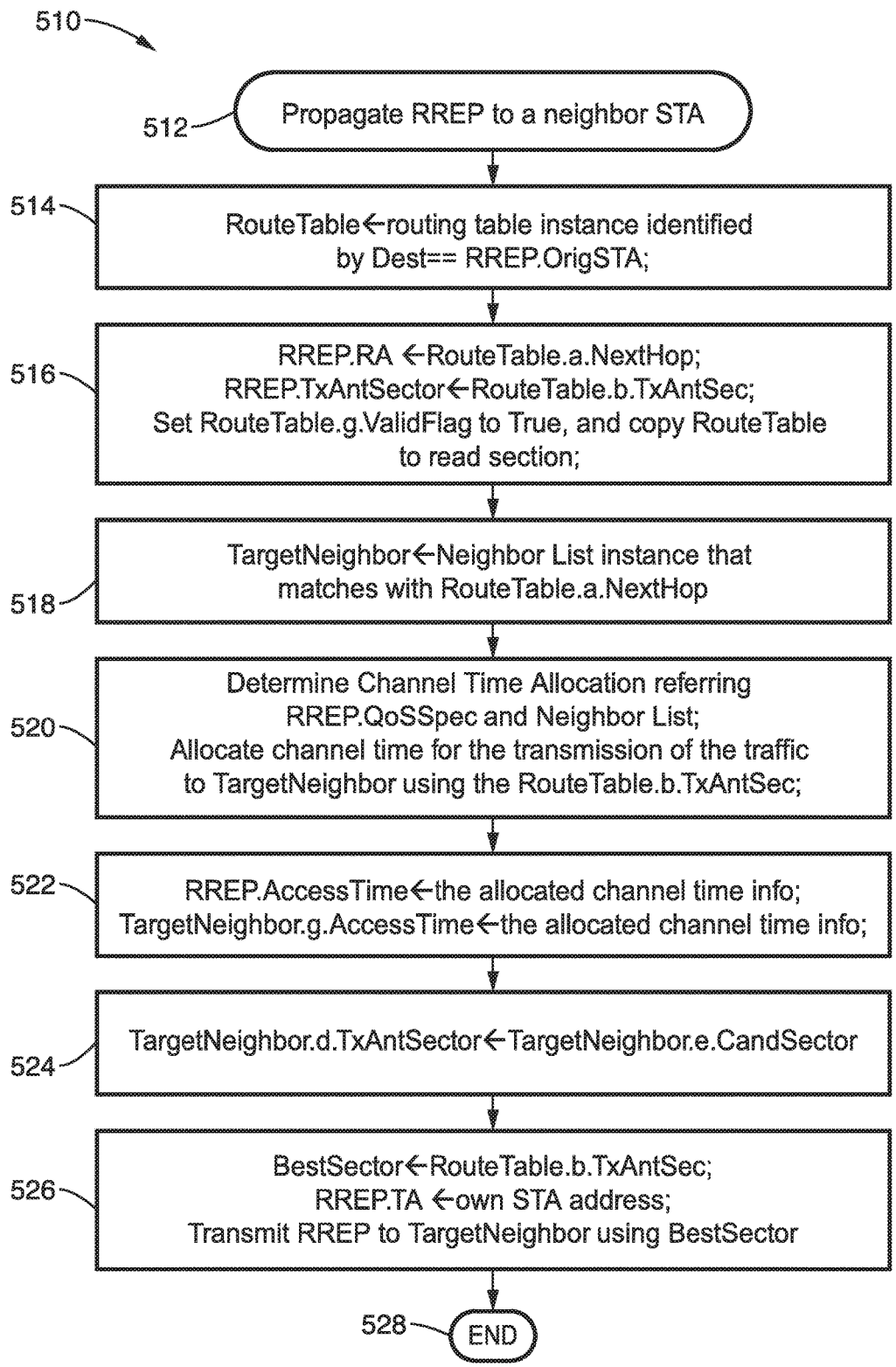

FIG. 23 is a flow diagram of propagating RREP to a neighbor STA according to an embodiment of the present disclosure.

Figure 24:
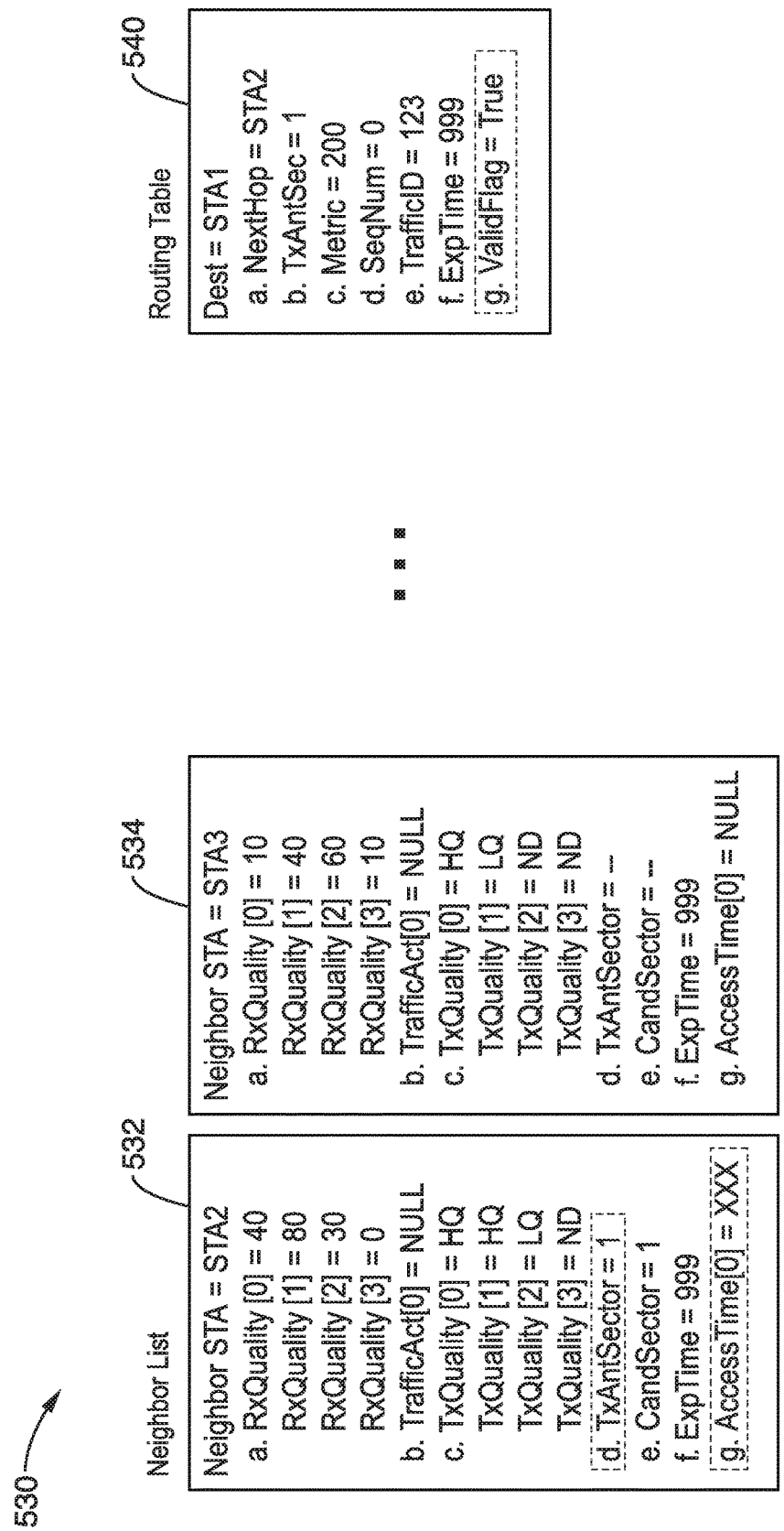

FIG. 24 is a neighbor list and routing table structure example for a communication scenario of STA4@P7, as utilized according to an embodiment of the present disclosure.

Figure 25:
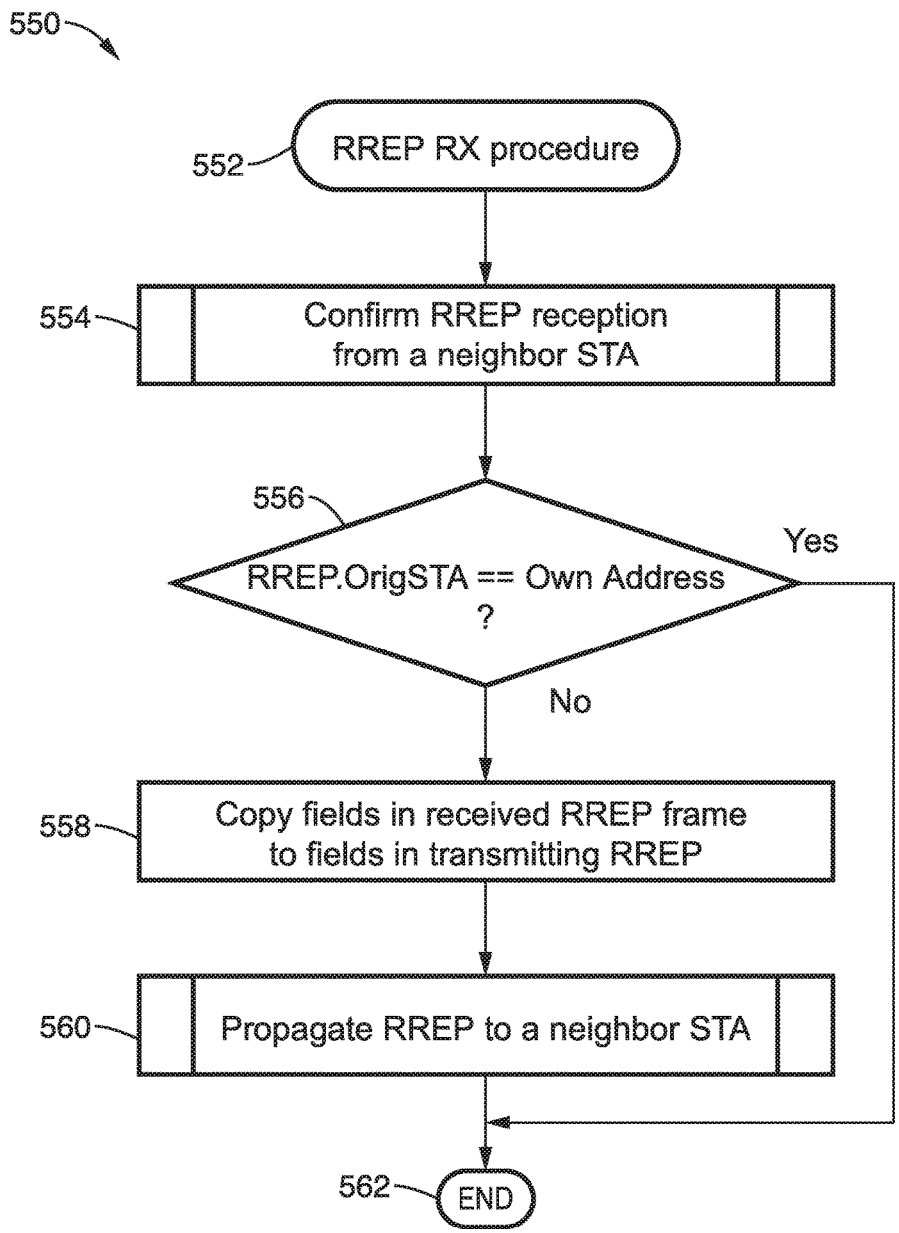

FIG. 25 is a flow diagram of RREP receiving procedure according to an embodiment of the present disclosure.

Figure 26:
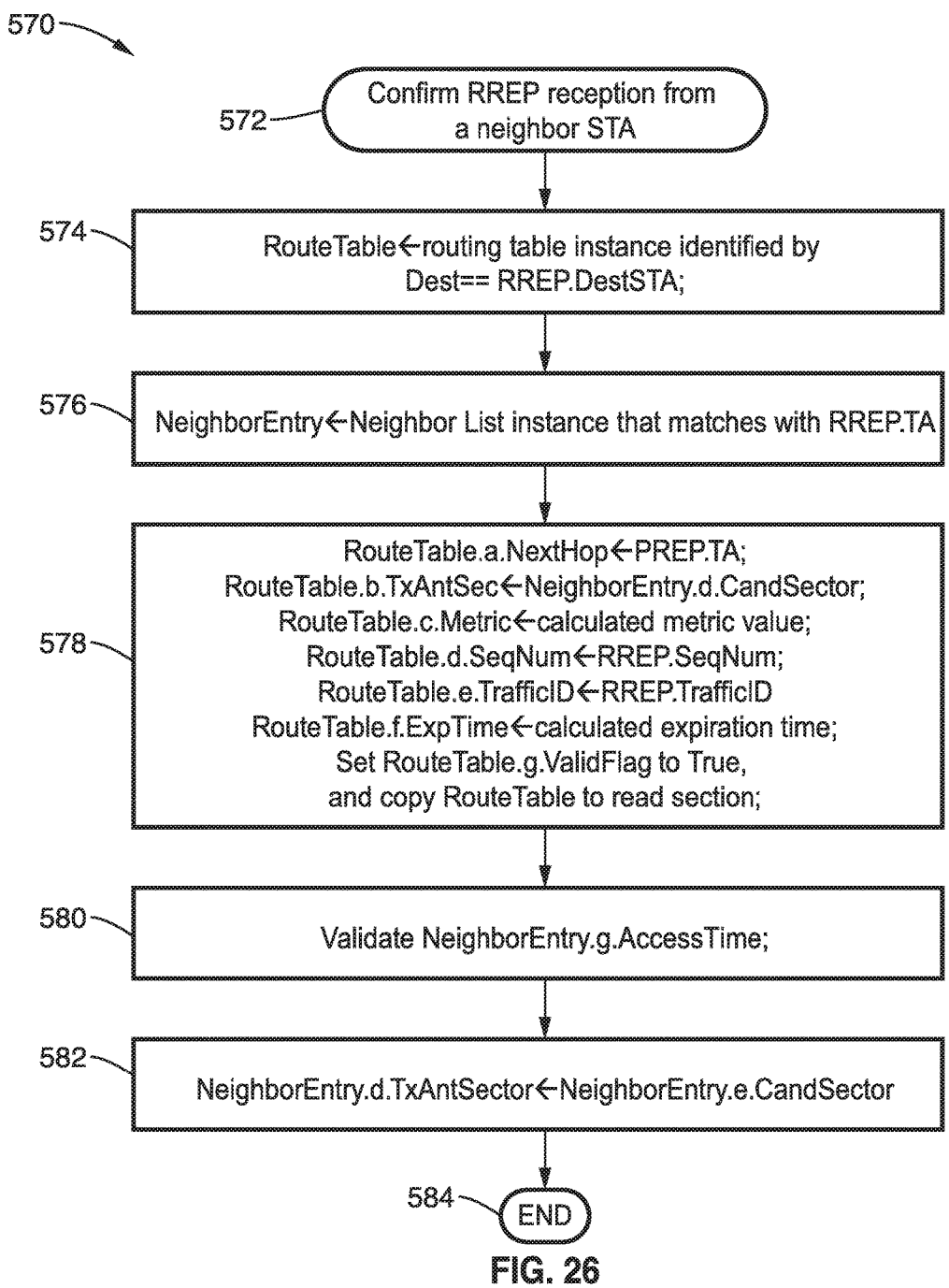

FIG. 26 is a flow diagram of confirming RREP reception according to an embodiment of the present disclosure.

Figure 27:
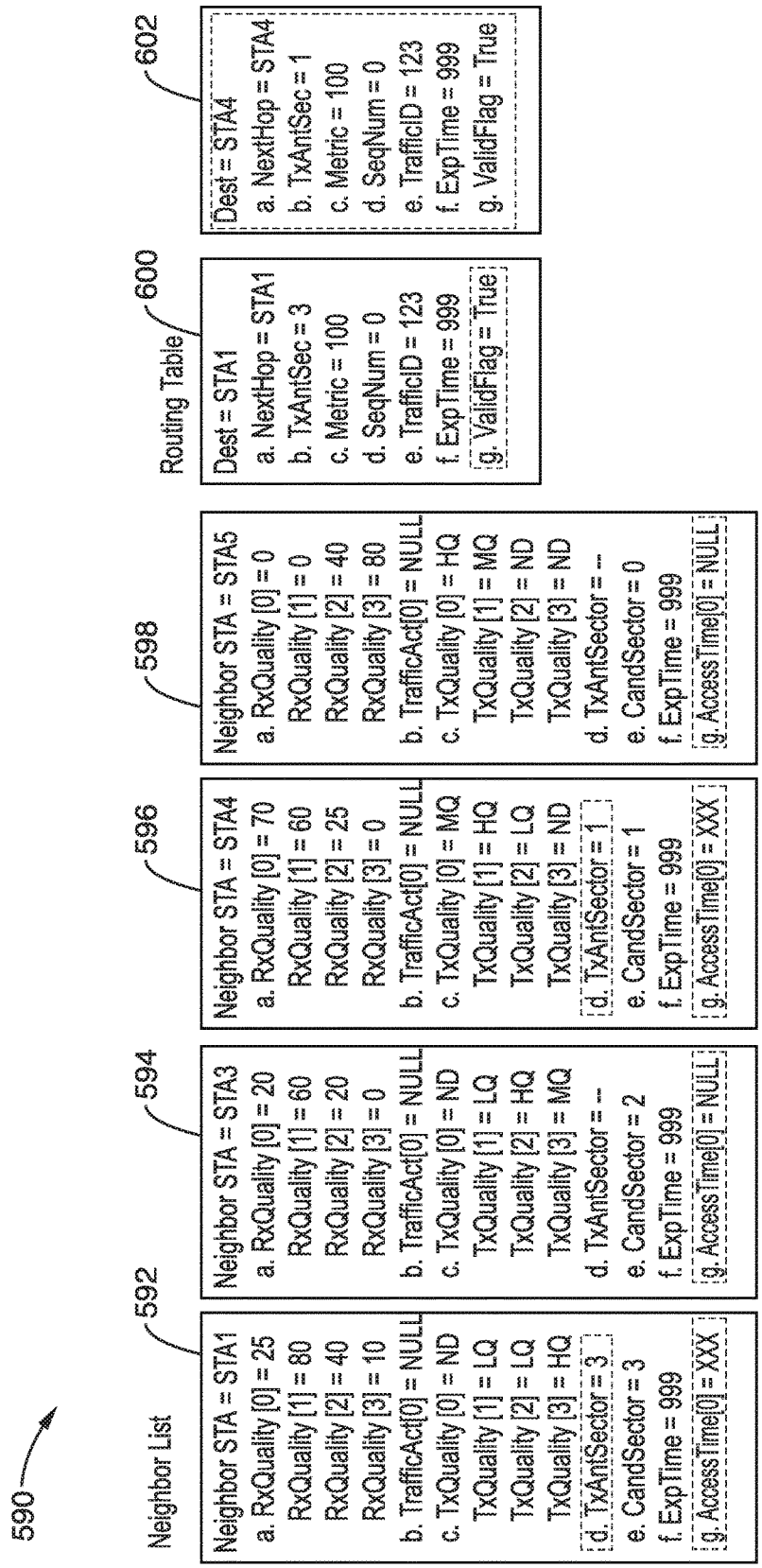

FIG. 27 is a neighbor list and routing table structure example for a communication scenario of STA2@P8, as utilized according to an embodiment of the present disclosure.

Figure 28:
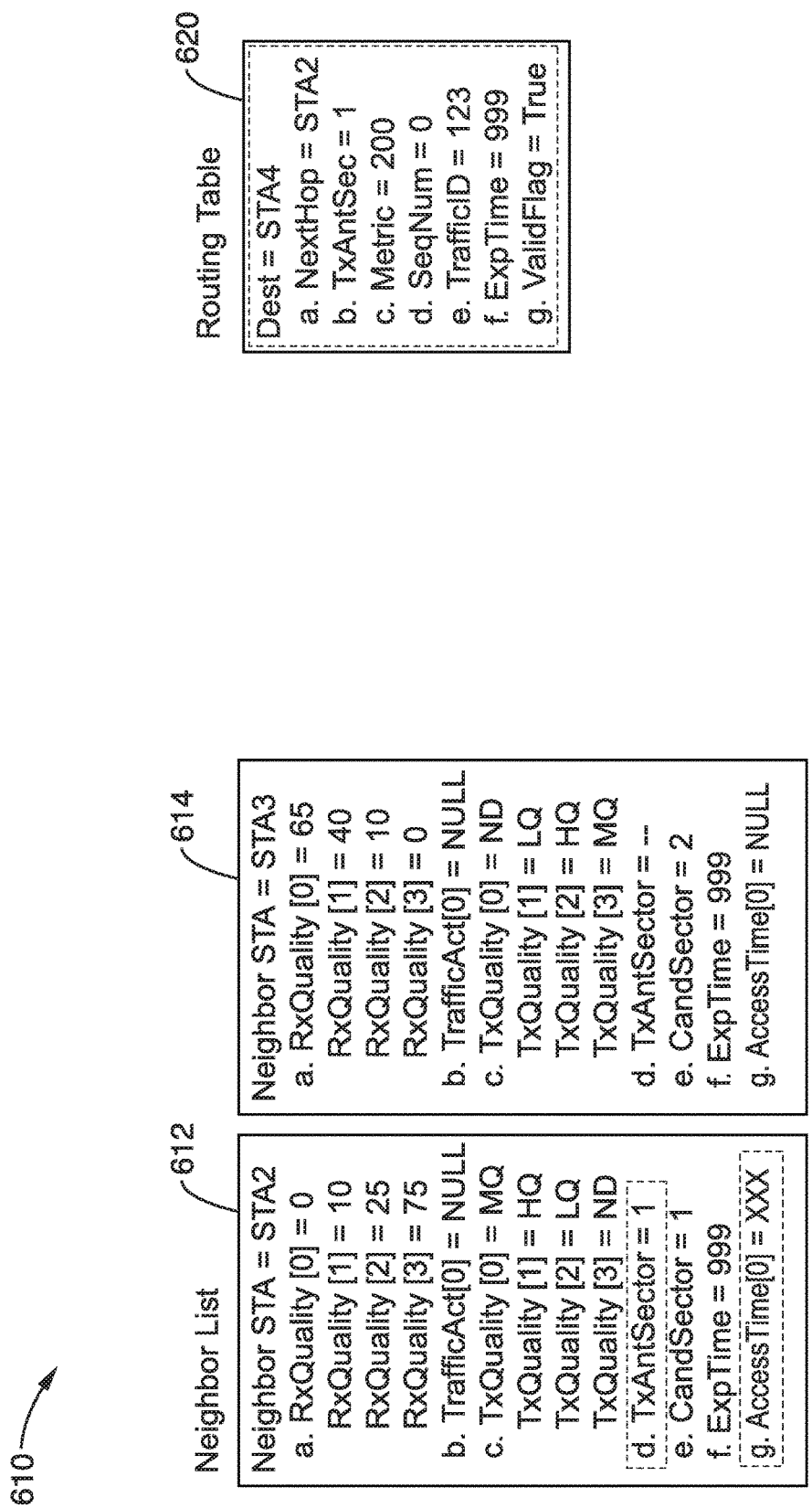

FIG. 28 is a neighbor list and routing table structure example for a communication scenario of STA1@P9, as utilized according to an embodiment of the present disclosure.

Figure 29:
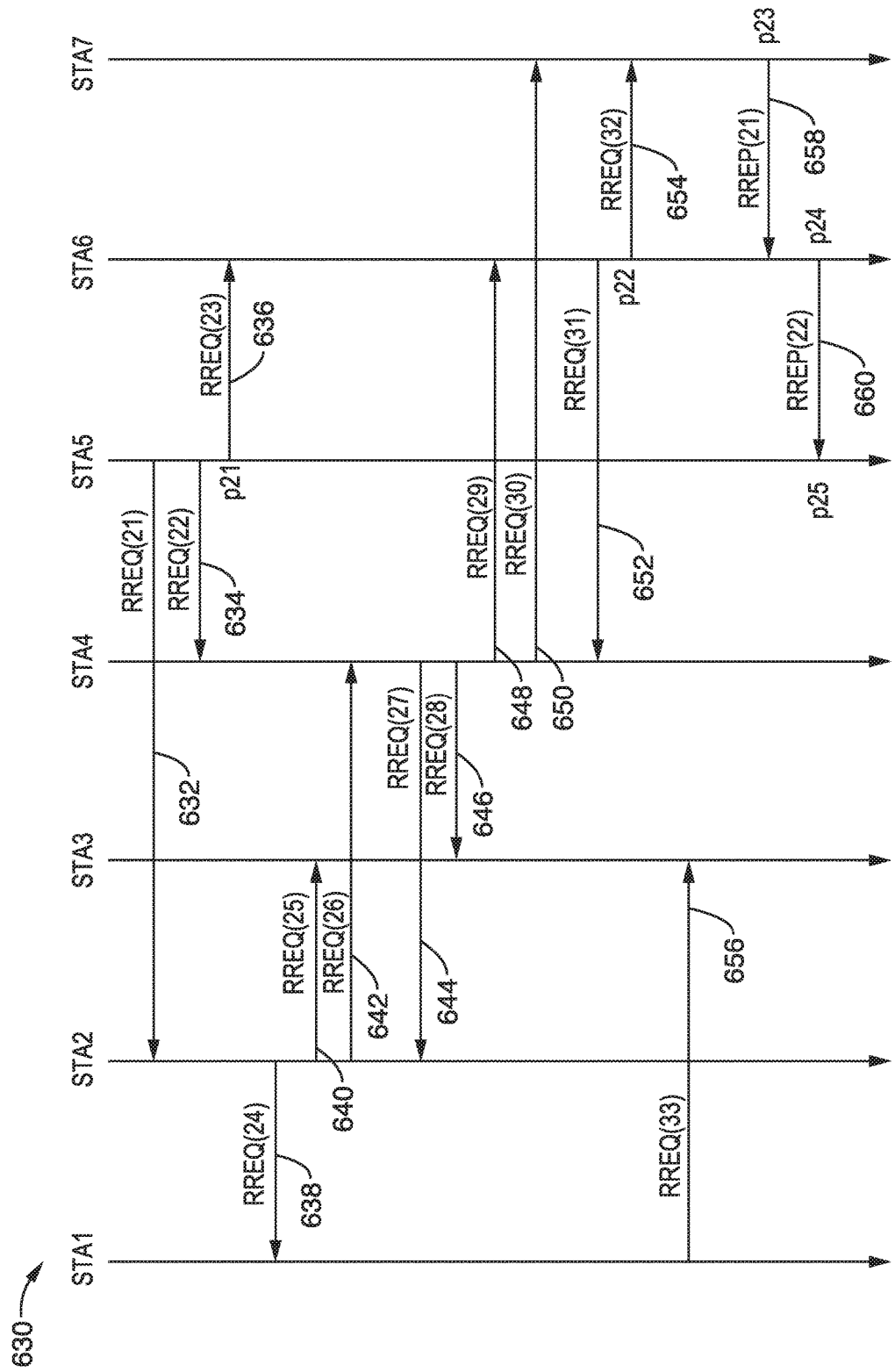

FIG. 29 is a message sequence for frame exchanges while establishing a route from an originating STA to a destination STA according to a second embodiment of the present disclosure.

Figure 30:
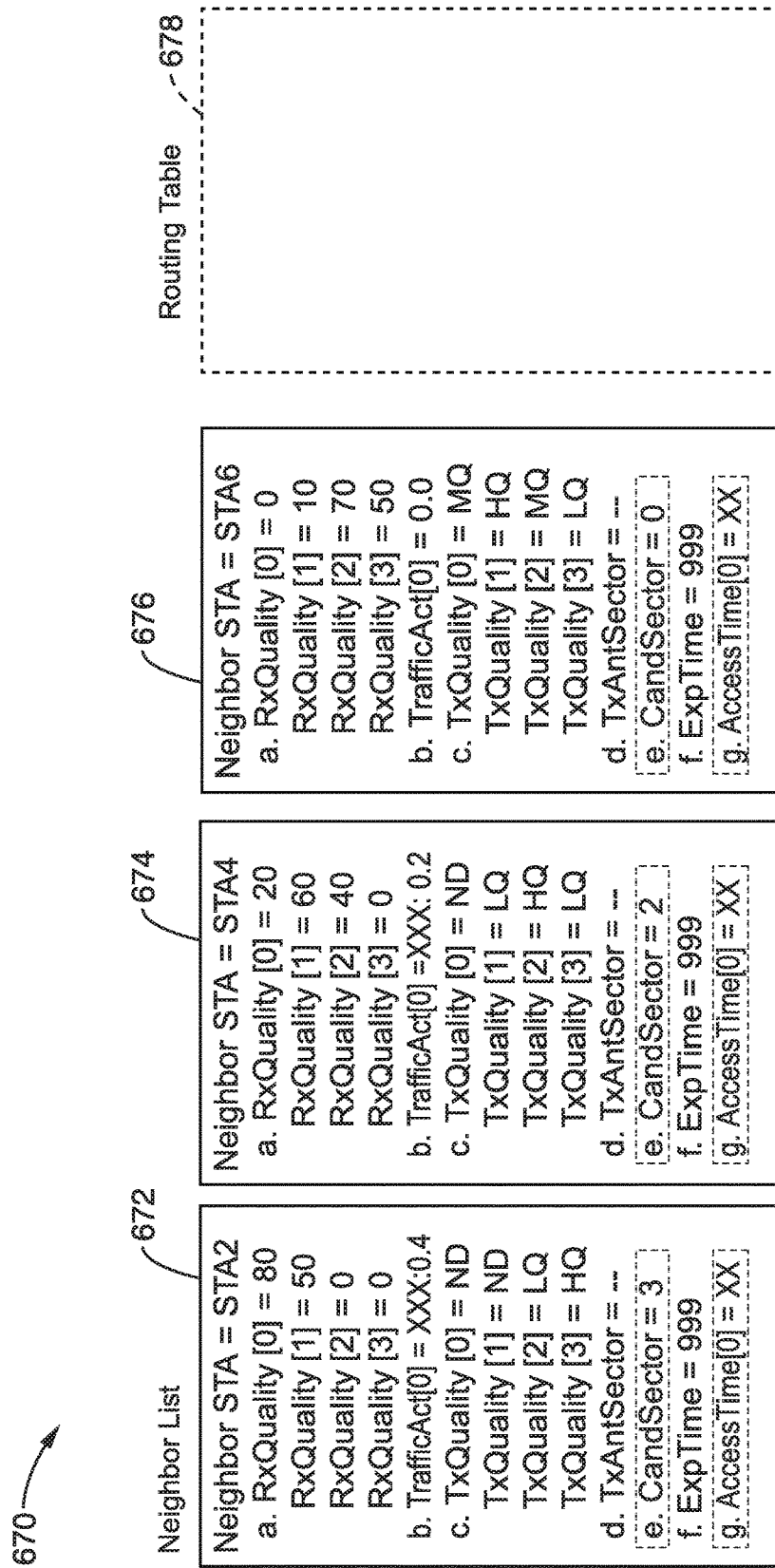
Figure 31:
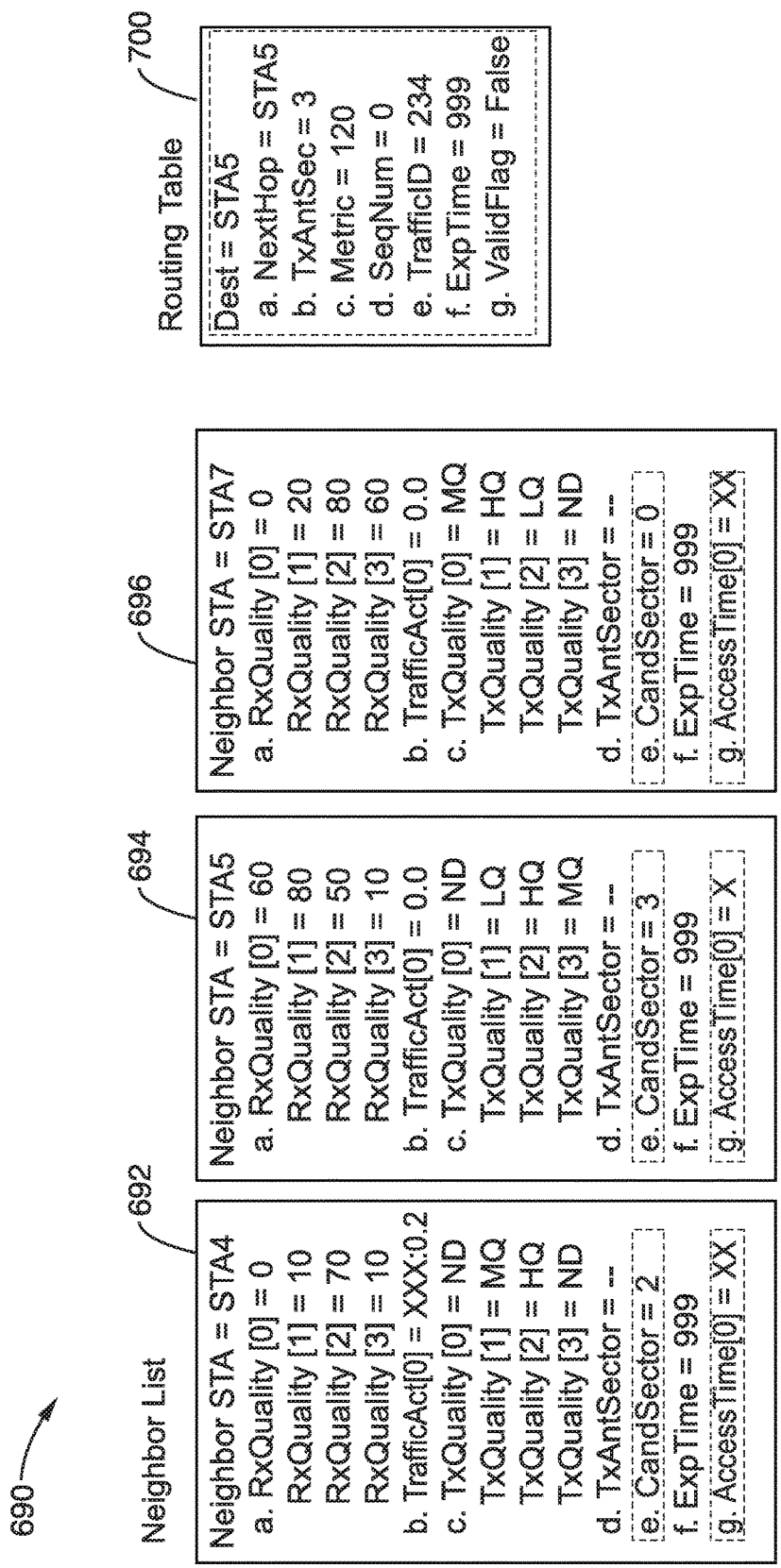

FIG. 30 is a neighbor list and routing table structure example for a communication scenario of STA5@P21, as utilized according to an embodiment of the present disclo- FIG. 31 is a neighbor list and routing table structure example for a communication scenario of STA6@P22, as utilized according to an embodiment of the present disclosure.

Figure 32:
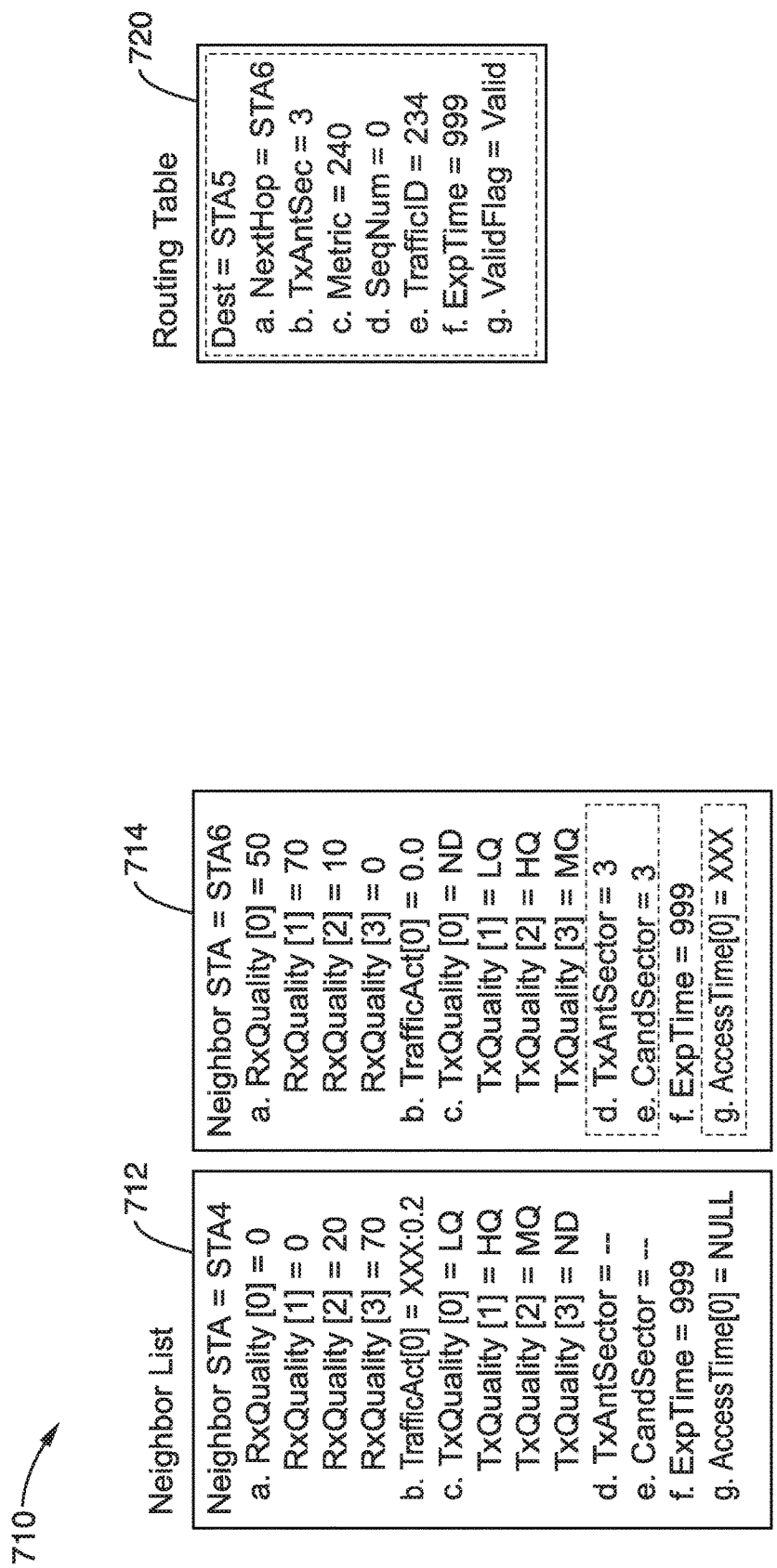

FIG. 32 is a neighbor list and routing table structure example for a communication scenario of STA7@P23, as utilized according to an embodiment of the present disclosure.

Figure 33:
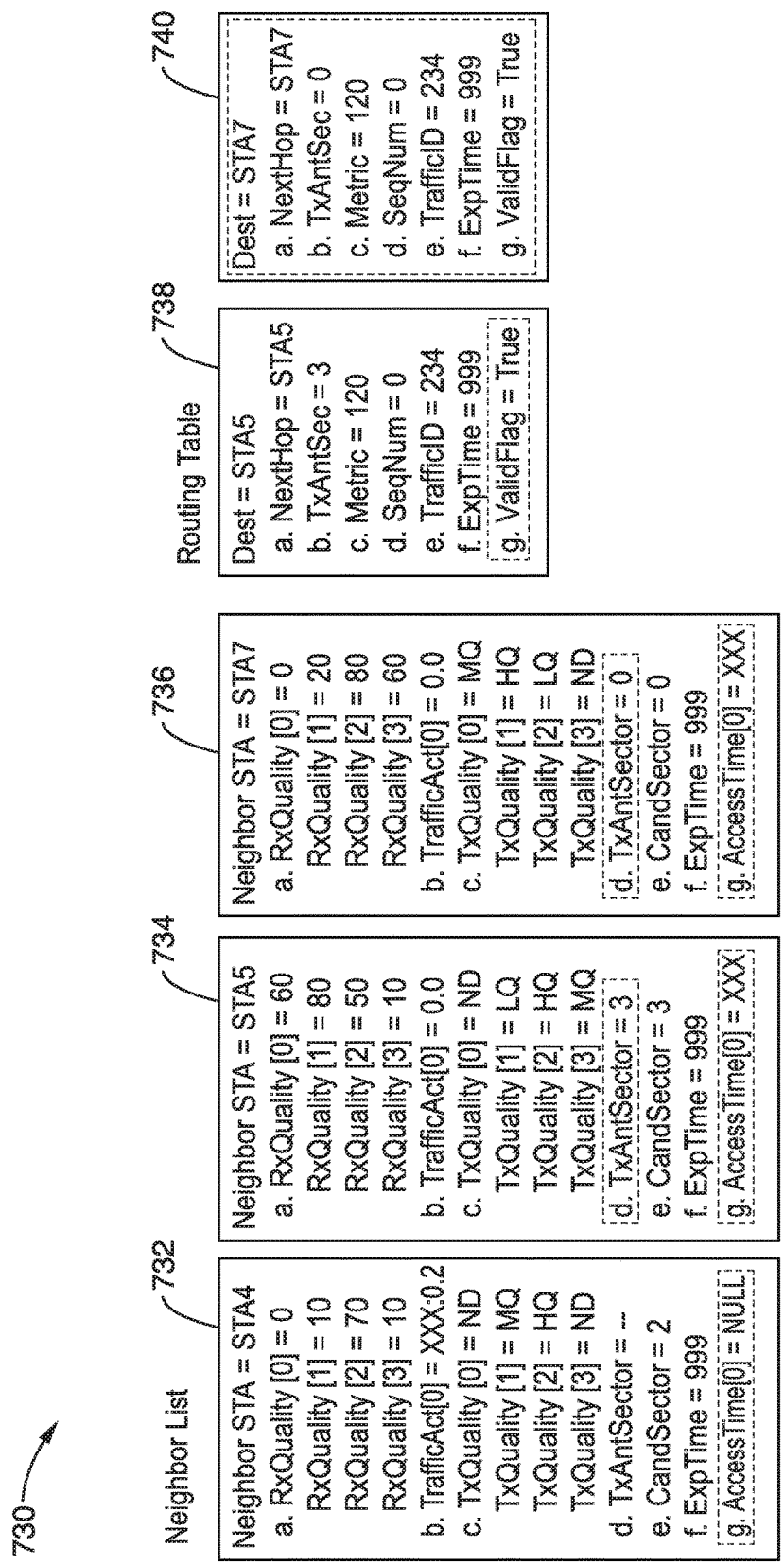

FIG. 33 is a neighbor list and routing table structure example for a communication scenario of STA6@P24, as utilized according to an embodiment of the present disclosure.

Figure 34:
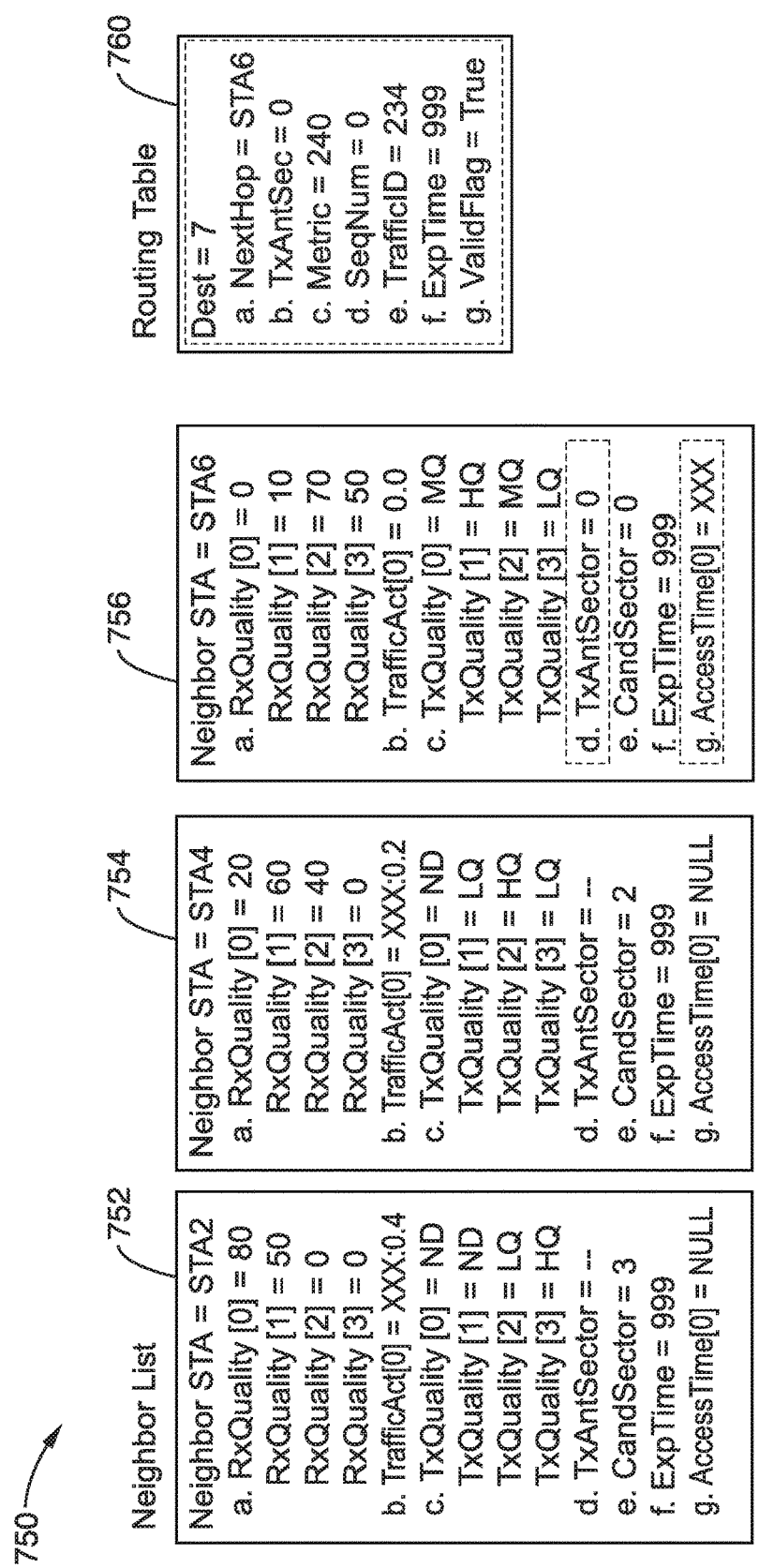

FIG. 34 is a neighbor list and routing table structure example for a communication scenario of STA5@P25, as utilized according to an embodiment of the present disclosure.

Figure 35:
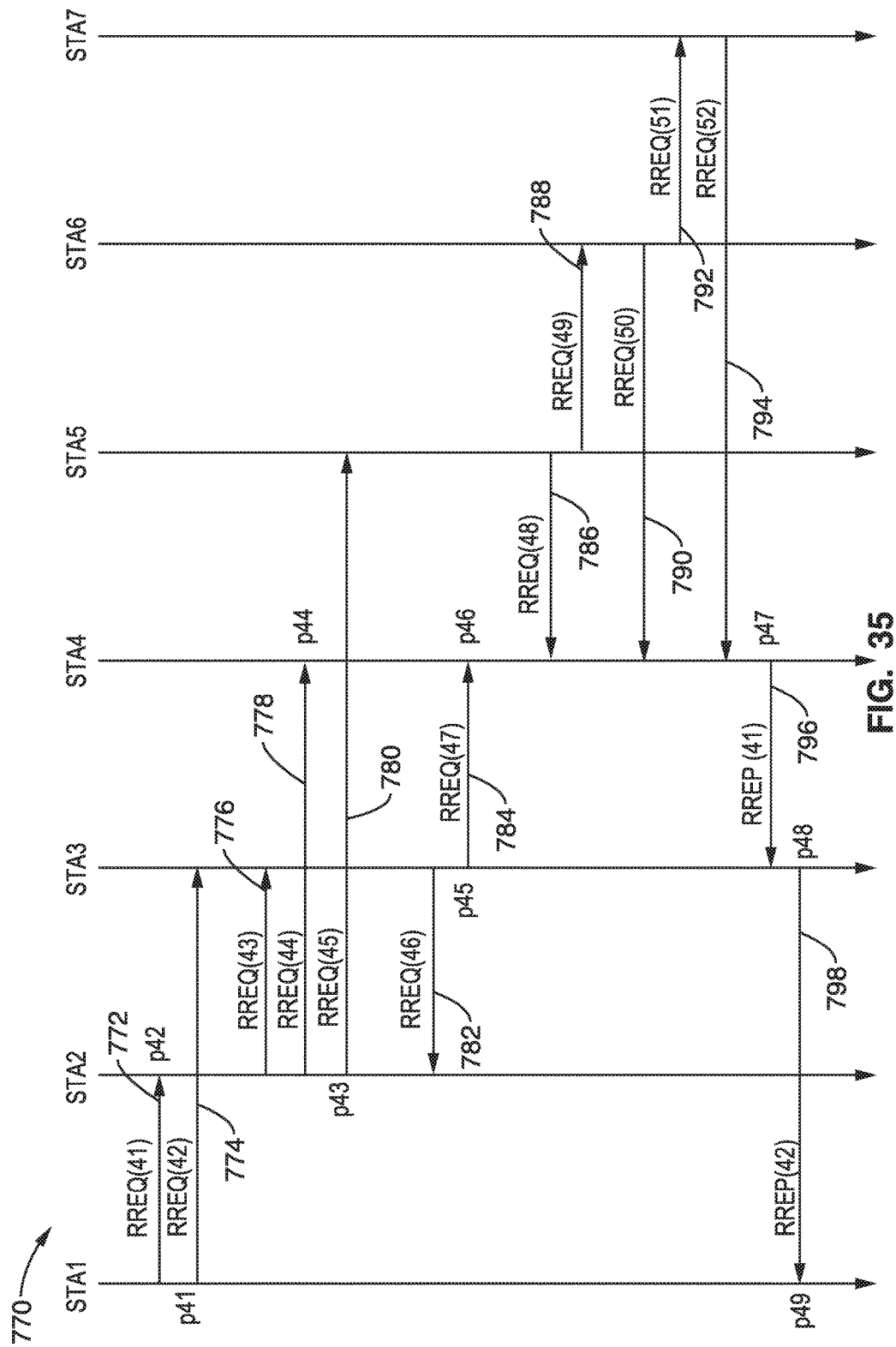

FIG. 35 is a message sequence for frame exchanges while establishing a route from an originating STA to a destination STA according to a third embodiment of the present disclosure.

Figure 36:
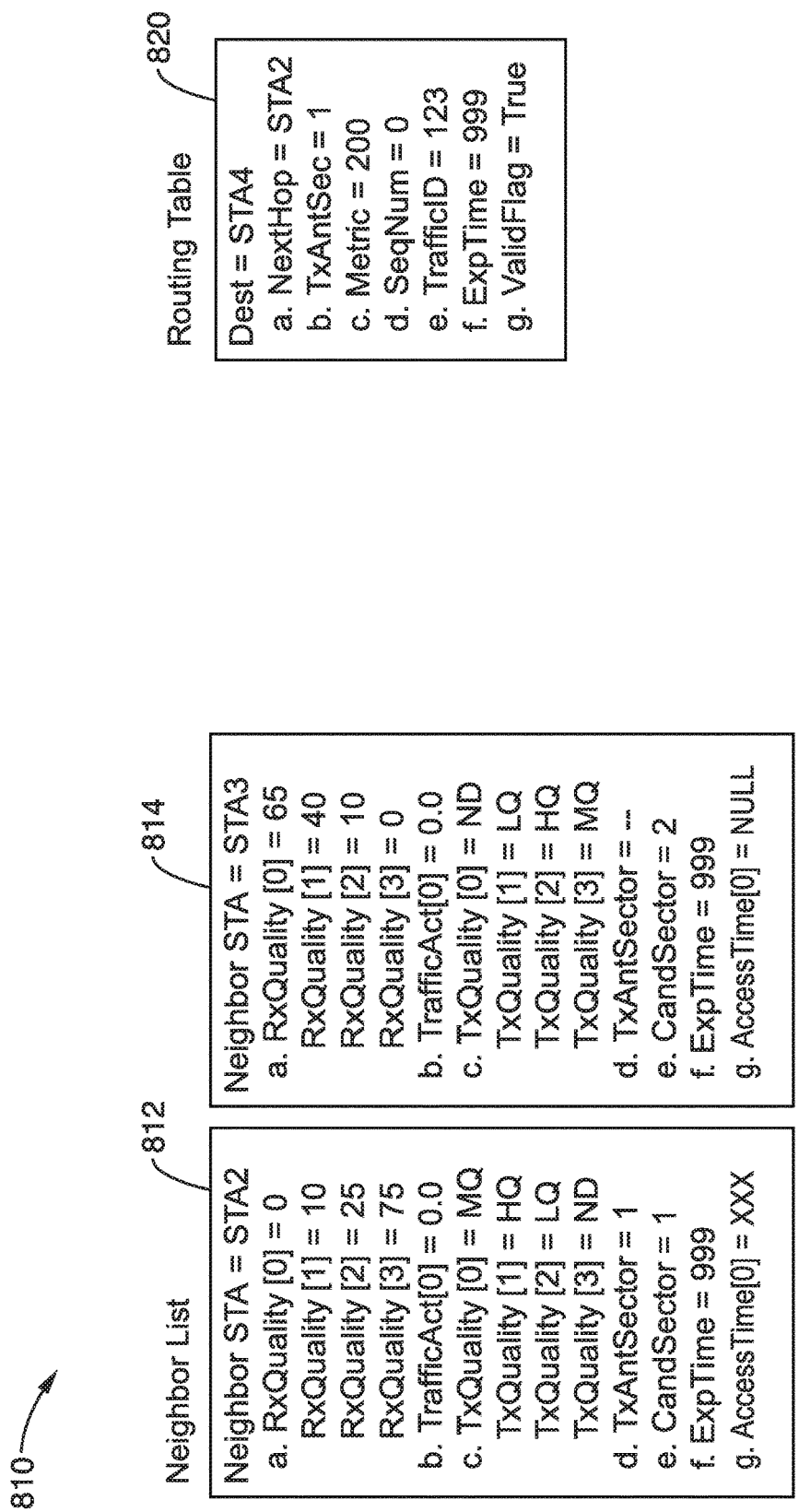

FIG. 36 is a neighbor list and routing table structure example for a communication scenario of STA1@P41, as utilized according to an embodiment of the present disclosure.

Figure 37:
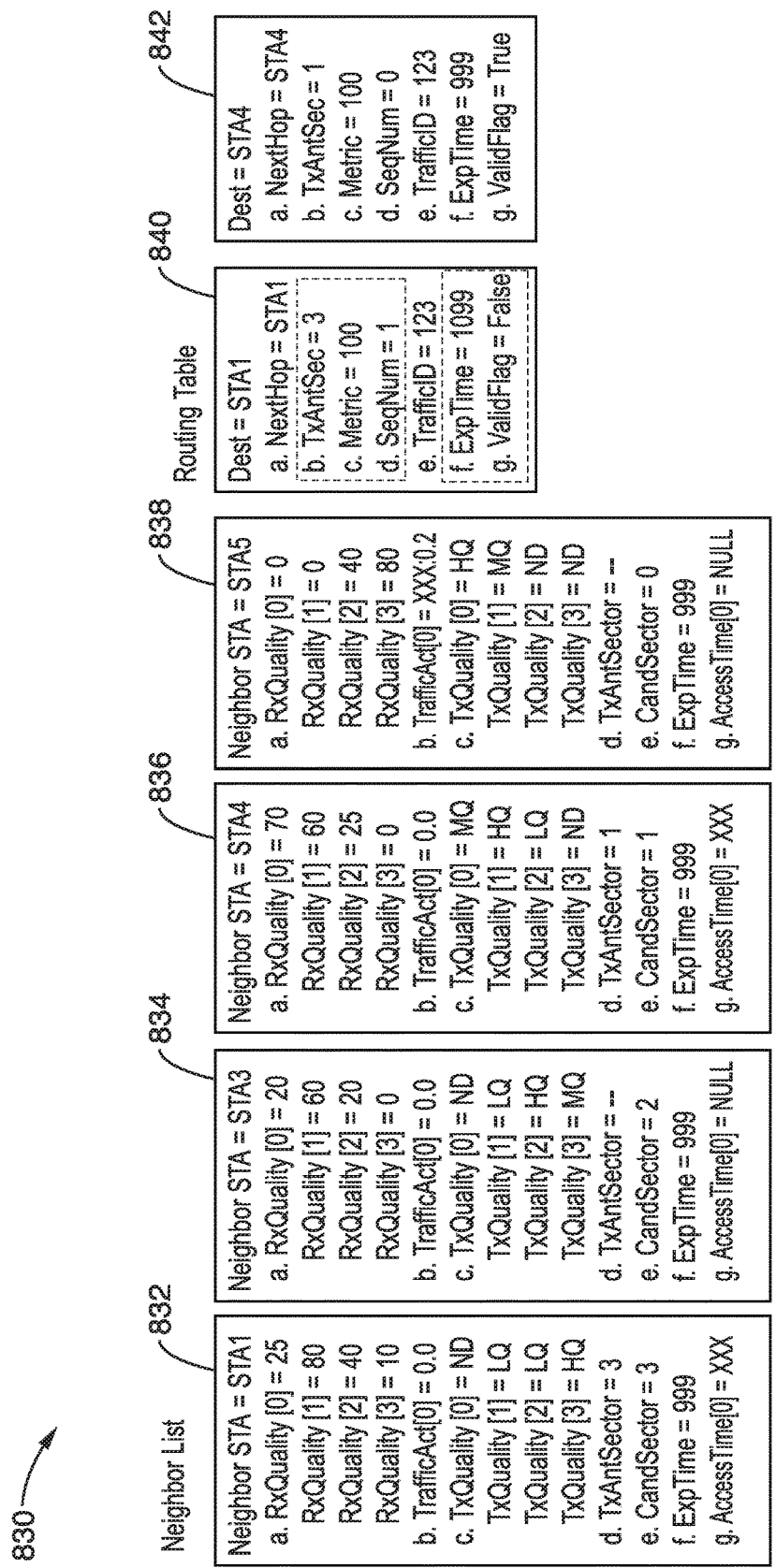

FIG. 37 is a neighbor list and routing table structure example for a communication scenario of STA2@P43, as utilized according to an embodiment of the present disclosure.

Figure 38:
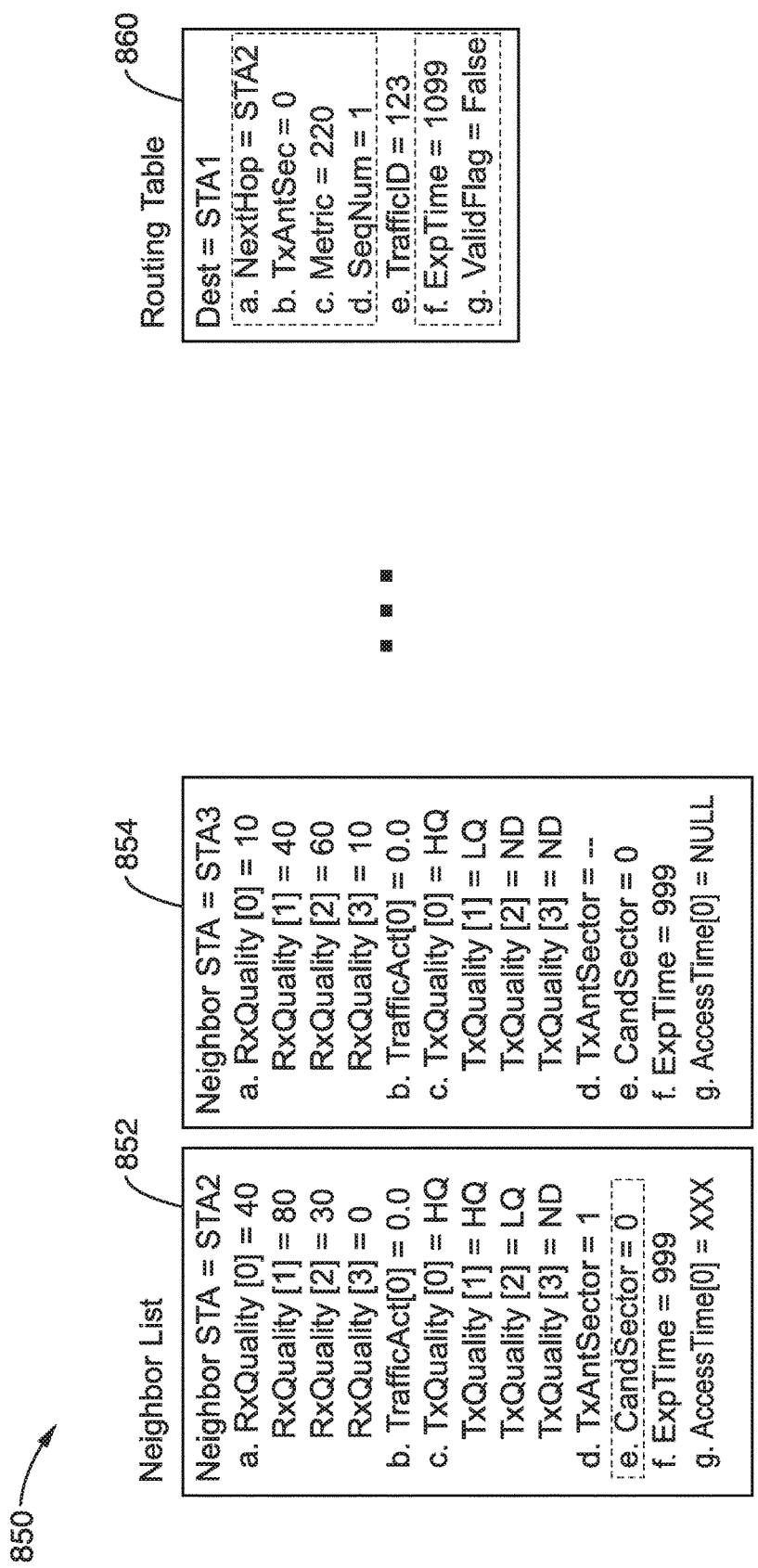

FIG. 38 is a neighbor list and routing table structure example for a communication scenario of STA4@P44, as utilized according to an embodiment of the present disclosure.

Figure 39:
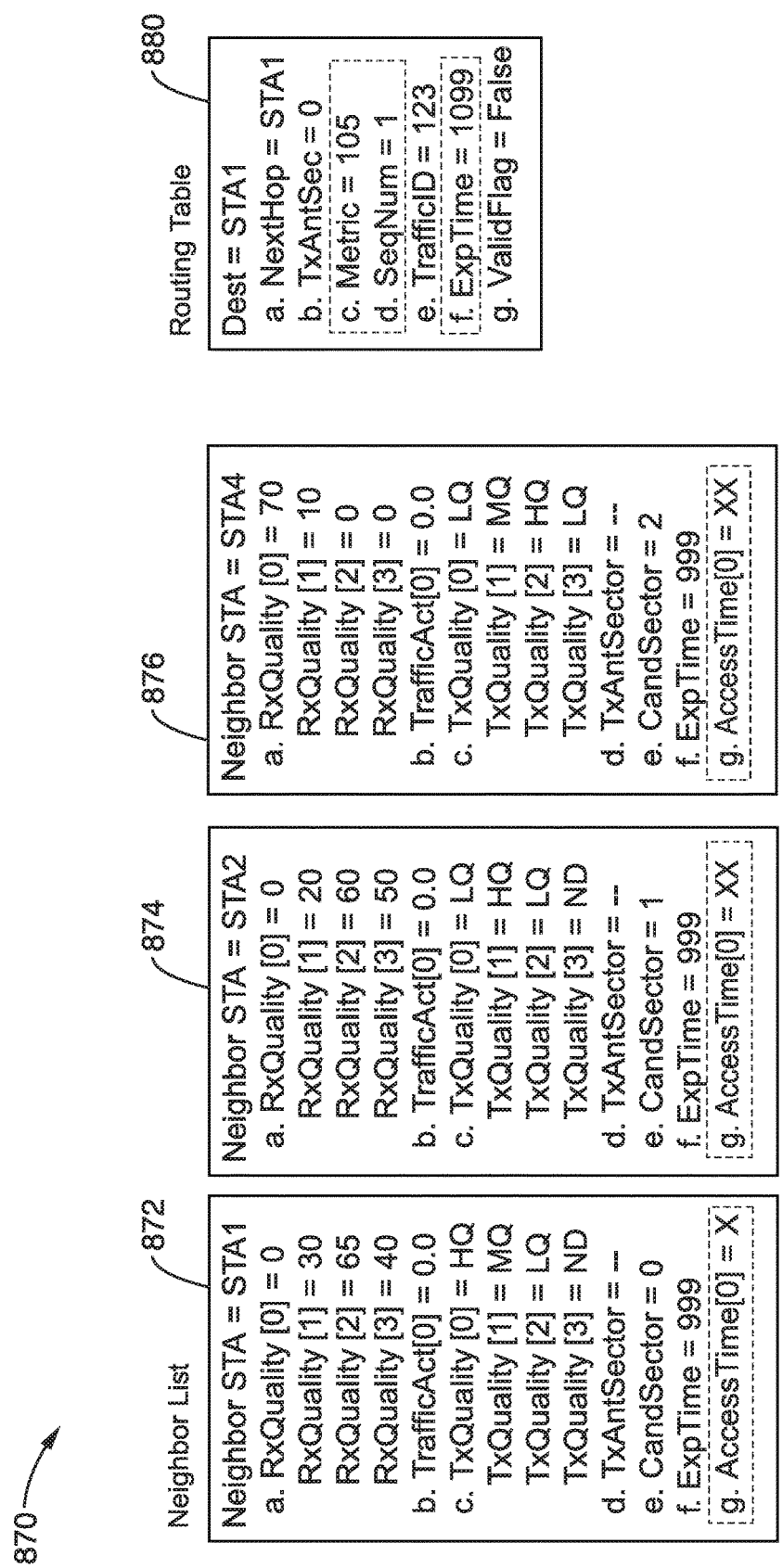

FIG. 39 is a neighbor list and routing table structure example for a communication scenario of STA3@P45, as utilized according to an embodiment of the present disclosure.

Figure 40:
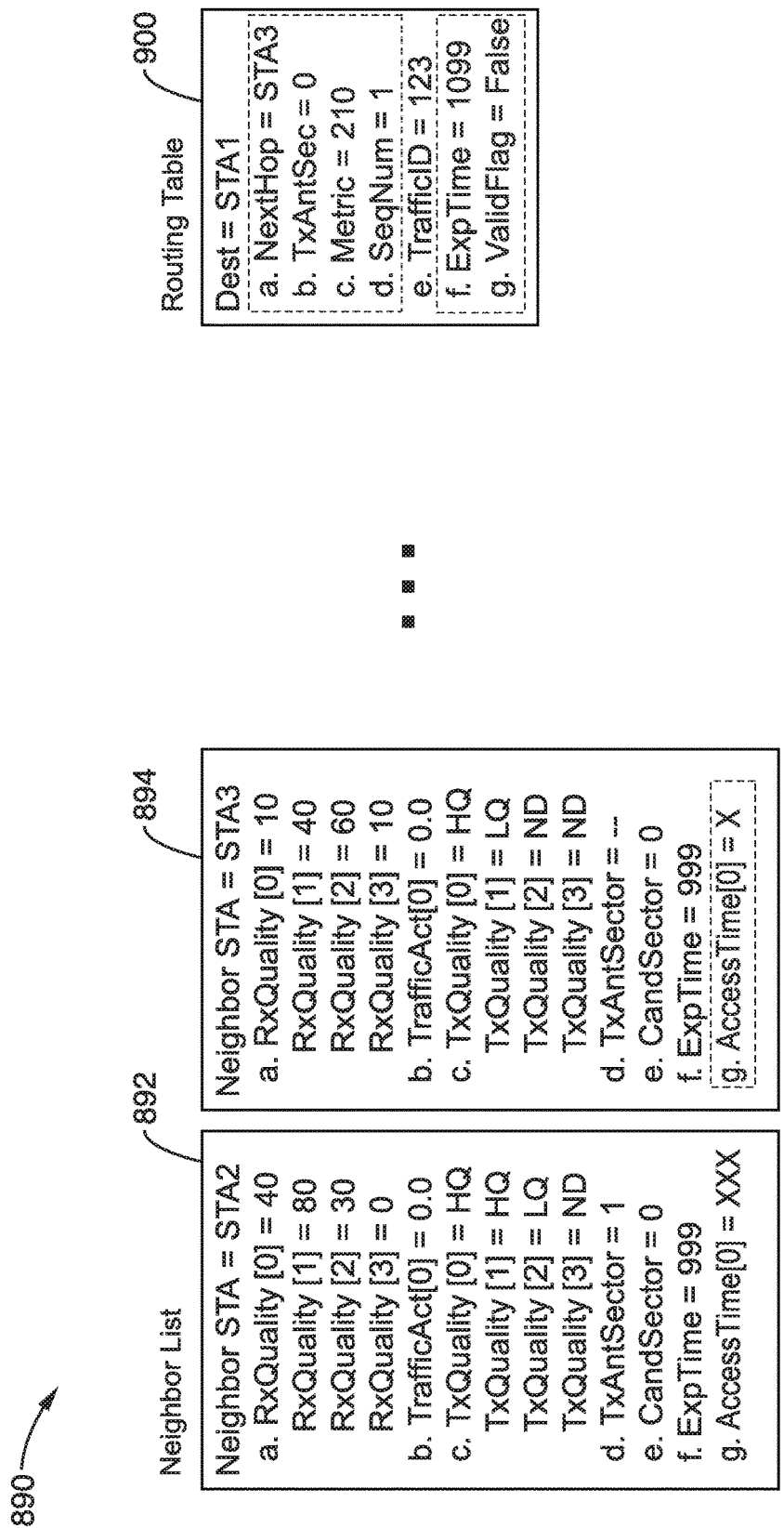

FIG. 40 is a neighbor list and routing table structure example for a communication scenario of STA4@P46, as utilized according to an embodiment of the present disclosure.

Figure 41:
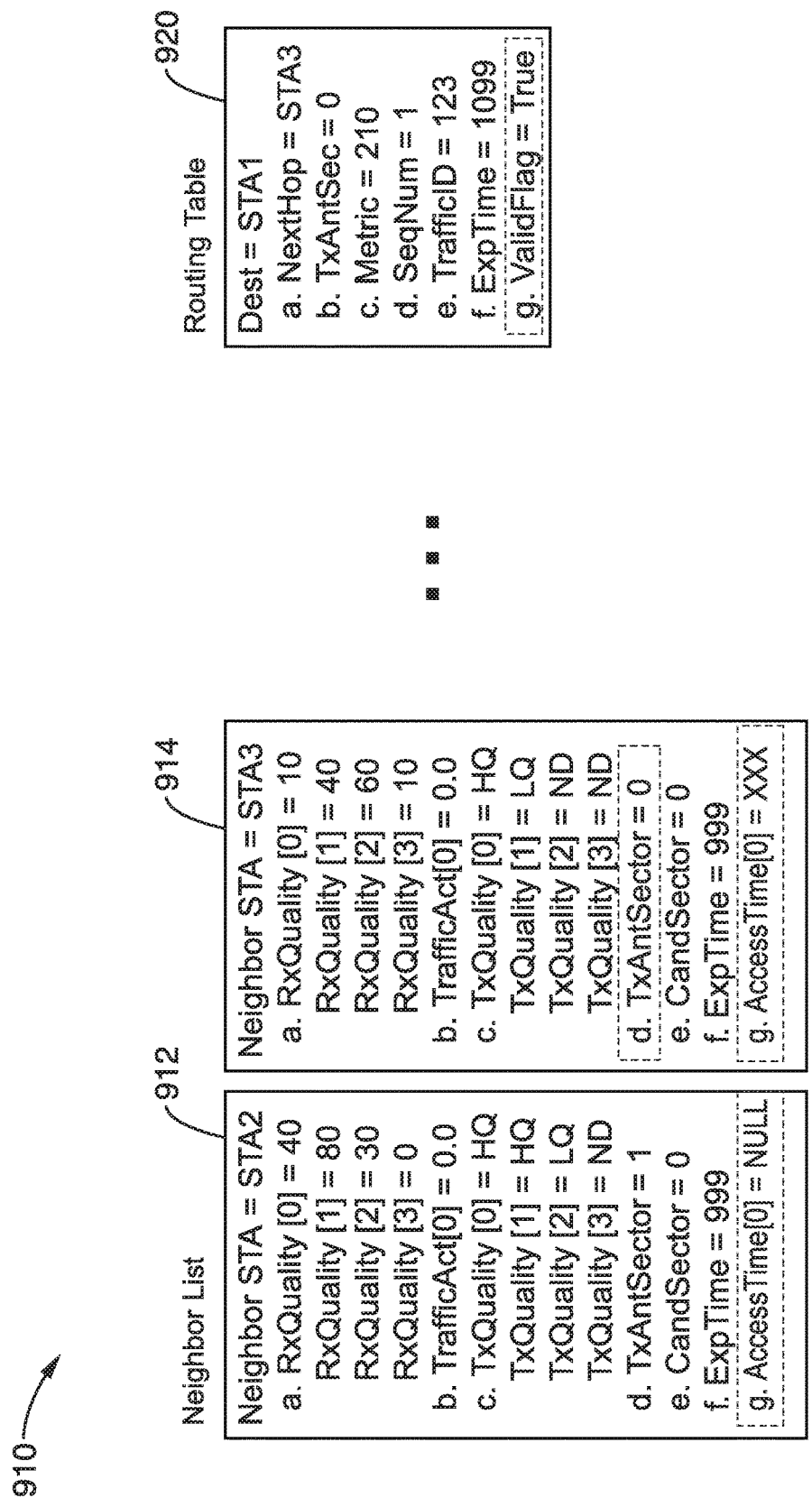

FIG. 41 is a neighbor list and routing table structure example for a communication scenario of STA4@P47, as utilized according to an embodiment of the present disclosure.

Figure 42:
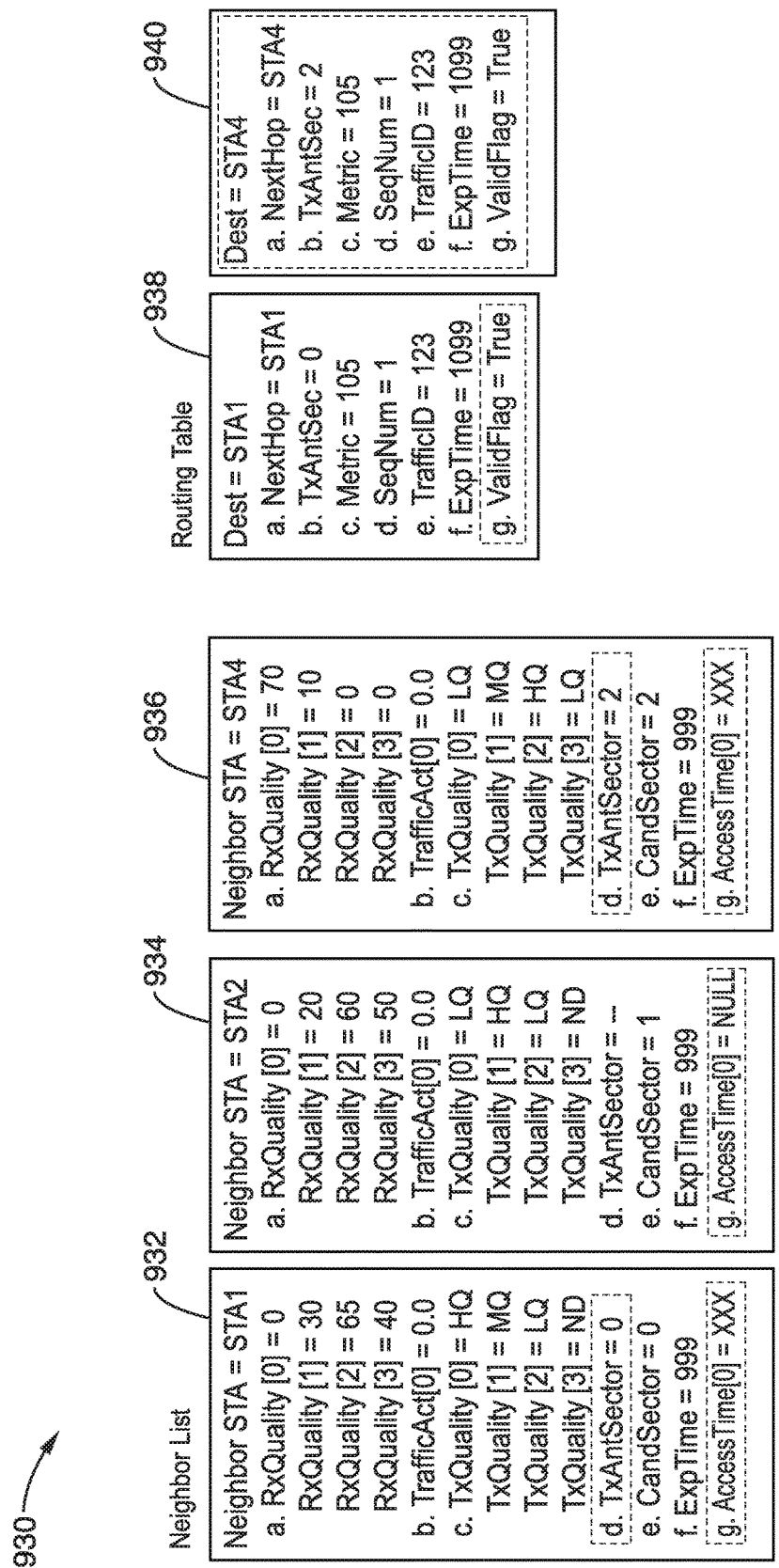

FIG. 42 is a neighbor list and routing table structure example for a communication scenario of STA3@P48, as utilized according to an embodiment of the present disclosure.

Figure 43:
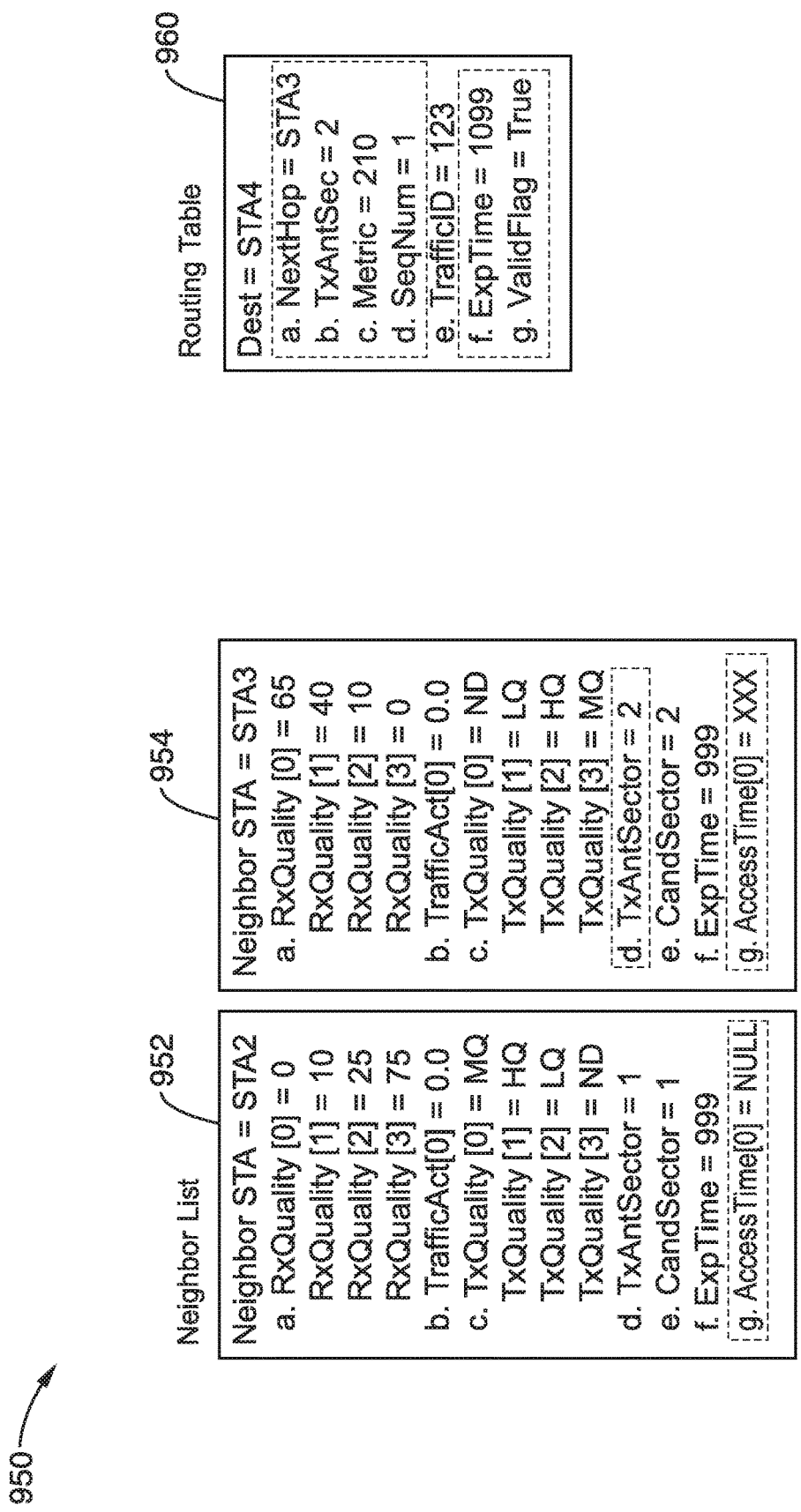

FIG. 43 is a neighbor list and routing table structure example for a communication scenario of STA1@P49, as utilized according to an embodiment of the present disclosure.

DETAILED DESCRIPTION

1. Beamforming (BF) Training in IEEE802.11ad

The existing 802.11ad protocol is a standard for 60 GHz PHY WLAN, and defines how to select antenna sectors for use by exchanging signals among 2 STAs (STA1 and STA2), assuming each STA has multiple antenna sectors and utilized the antenna sector which provides the highest link quality. The protocol defines sector sweep handshaking for initial sector learning, and beam refinement handshaking for maintenance of the beam forming. By completing these handshaking, STAs can learn which antenna sector should be used to secure the best link quality of the link.

However, 802.11ad does not consider limiting or mitigating interference to neighboring STAs, or mm-wave mesh network operations.

1.1 Routing Protocol Example (AODV)

Routing protocol is a set of rules to establish a communication path between an originating STA and a destination STA over multiple hops (intermediate STAs). AODV is a routing protocol which represents the general essence of multi-hop routing over wireless media. With AODV, STAs generate a route according to the following steps: (1) STA1 (originating STA) broadcasts RREQ frames (RREQ1); (2) STA2 receives the RREQ1, measures quality of the link between itself and transmitter of the RREQ1 (STA1), and rebroadcasts the RREQ embedding the link quality info (RREQ2); (3) STA3 receives the RREQ1, measures quality of the link between itself and transmitter of the RREQ1 (STA1), and rebroadcasts the RREQ embedding the link quality info (RREQ3); (4) STA4 (destination STA) receives RREQ2 from STA2, measures quality of the link between itself and transmitter of the RREQ2 (STA2), and accumulate the value with link quality embedded in the RREQ2. Now STA4 knows what the end-end quality to STA1 is via STA2; (5) STA4 also receives RREQ3 from STA3, measures quality of the link between itself and the transmitter of the RREQ3 (STA3), and accumulate the value with link quality embedded in the RREQ3. Now STA4 knows what the end-end quality to STA1 is via STA3; (6) STA4 finds link quality to STA1 via STA2 is better than via STA3. STA4 sends back RREP frame (RREP1) to STA2 to confirm the best route to intermediate and Originating STAs. Set STA2 as the next hop STA toward STA1; (7) STA2 receives RREP1 from STA4. STA2 recognizes it is an intermediate STA between STA4 and STA1. STA4 is set as the next hop STA toward STA4; (8) STA2 further retransmits the RREP (RREP2) toward STA1 (Originating STA). STA1 is set as the next hop STA toward STA1; (9) STA1 receives RREP2 from STA2. STA1 recognizes the multi-hop path toward STA4 has been confirmed and the next hop STA to STA4 is STA2; and (10) As a consequence, a bidirectional route between STA1 and STA4 via STA2 is established.

2. STA Topology for Consideration.

Figure 1:
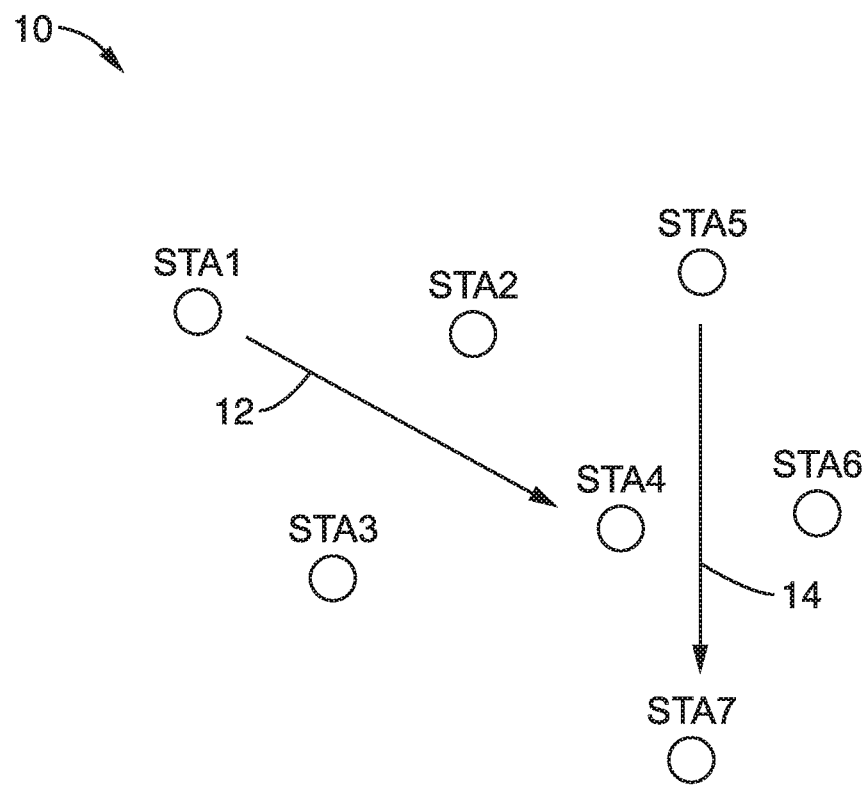
FIG. 1 is a radio node topology diagram exemplifying communication between multiple stations (STAs), as utilized according to an embodiment of the present disclosure.

FIG. 1 depicts an example wireless network 10 in which a plurality of STAs (STA1 through STA7) are in the same spatial vicinity. In this example scenario, STA1 is trying to communicate 12 with STA4, and then STA5 tries to communicate 14 with STA7. In this scenario, the direct links 12, 14 from STA1 to STA4 and from STA5 to STA7, are both too weak to provide proper communication. Thus, it is desirable in this scenario if other STAs can aid in establishing these End-End paths performing as intermediate STA.

Figure 2:
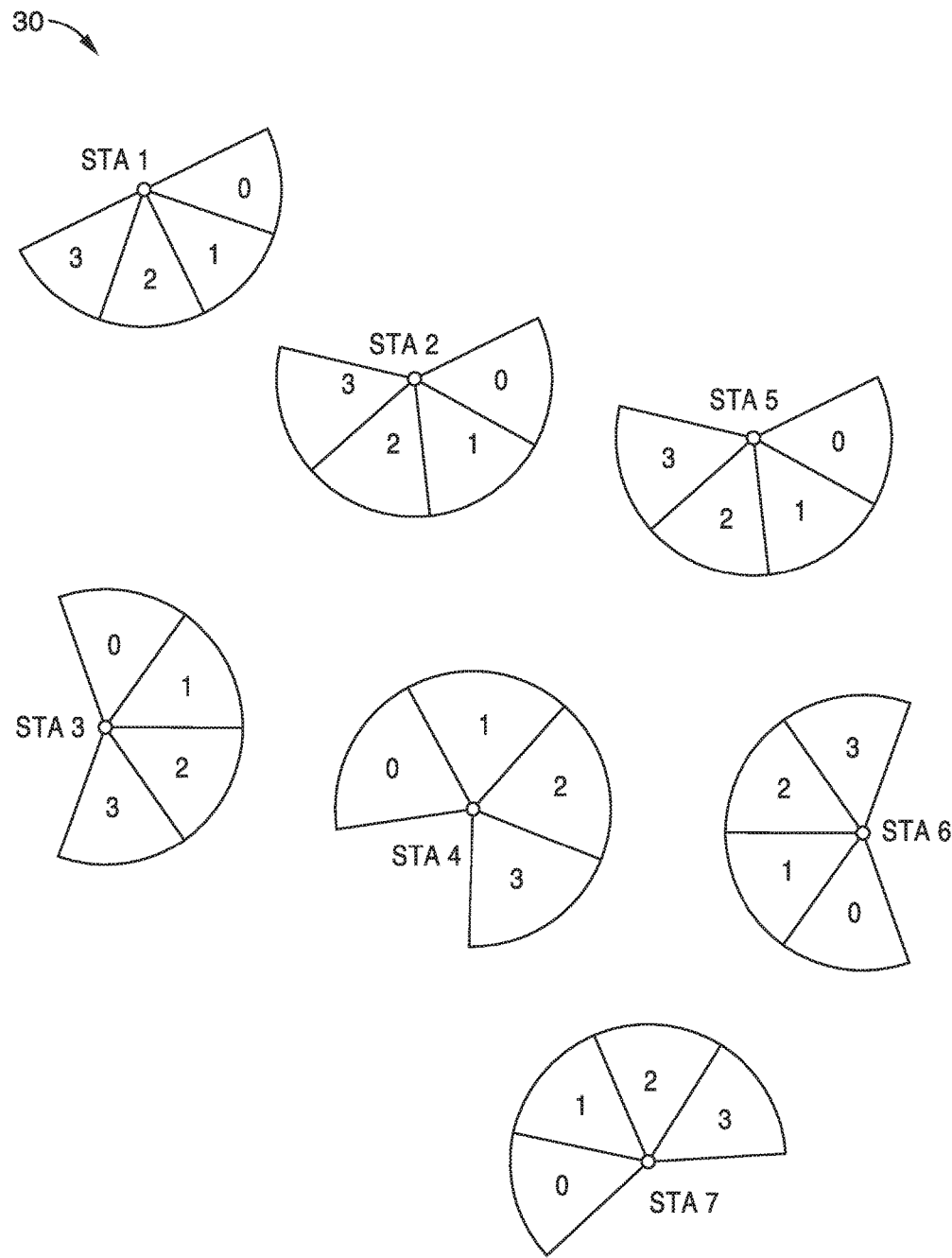
FIG. 2 is a radio node topology diagram exemplifying antenna sector directions for communication between multiple stations (STAs), as utilized according to an embodiment of the present disclosure.

FIG. 2 illustrates example antenna directions 30 for the STA1 through STA7 as shown in FIG. 1. In the example each STA is considered to use multiple antenna sectors (e.g., four in this example). It will be noted that the angular span of each pie shaped antenna sector can vary depending on STA's hardware configuration and how the STA fits within the context of the group of stations. For example it is seen that sectors 0-3 in STA1 span only about 180° facing the other STAs, while in STA4 sectors 0-3 span at least 270°. It should be appreciated that the number of sectors can be set to any desired number, although more sectors requires additional bits for specifying sector number. The value of four sectors (0-3) was considered a compromise requiring only 2 bits of sector direction information, while eight sectors (0-7) may be more appropriate in certain high traffic applications and would require 3 bits of sector direction information.

2.1. STA Hardware Configuration.

Figure 3:
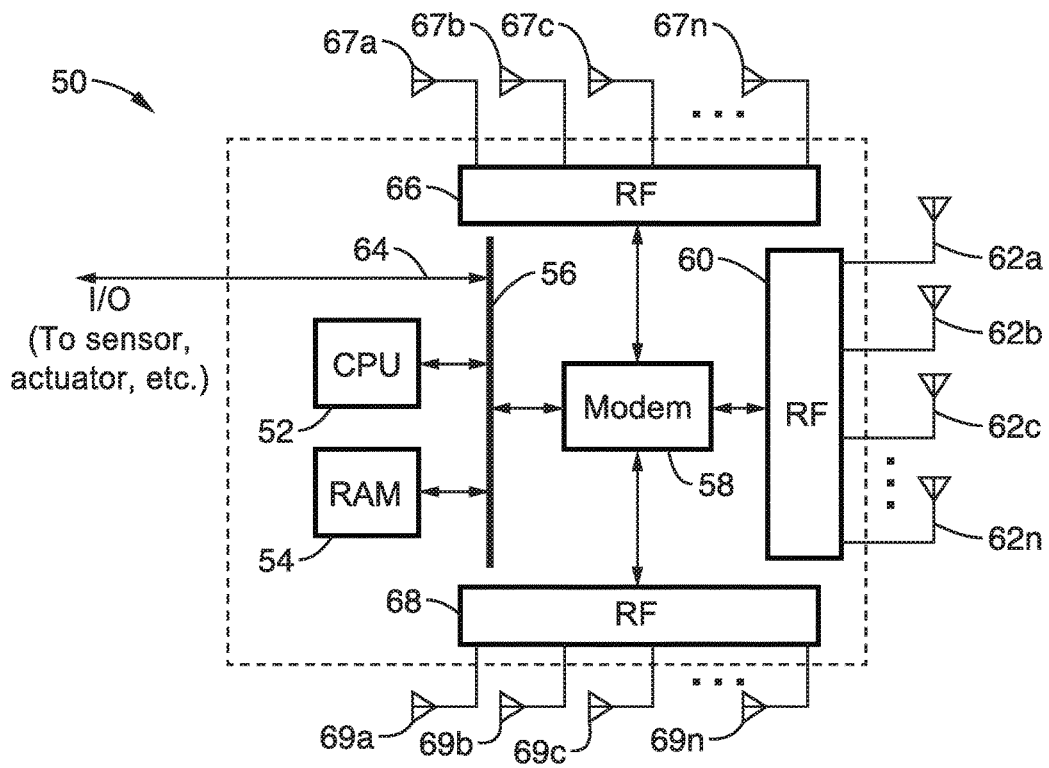
FIG. 3 is a block diagram of station hardware as utilized according to an embodiment of the present disclosure.

FIG. 3 illustrates an example embodiment 50 of station (STA) hardware configuration. In this example a computer processor (CPU) 52 and memory (RAM) 54 are coupled to a bus 56, which is coupled to an I/O path 64 giving the STA external I/O, such as to sensors, actuators and so forth. Instructions from memory 54 are executed on processor 52 to execute a program which implements the communication protocols. This host machine is shown configured with a modem 58 coupled to radio-frequency (RF) circuitry 60, 66, and 68 to a plurality of antennas 62*a* through 62*n*, 67*a* through 67*n*, and 69*a* through 69*n* to transmit and receive frames with neighboring STAs. Although three RF circuitries are shown coupled to modem 58 in this example, it should be appreciated that an arbitrary number of RF circuits can be coupled to the modem without departing from the present disclosure. In general, larger number of RF circuits will result in broader coverage of the antenna beam direction. In general, the number of RF circuits and number of antennas utilized is determined by hardware constraints of a specific device and application. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector. Antenna sector is determined by a selection of RF circuitry and beamforming commanded by the array antenna controller. Although it is possible that STA hardware components, i.e., 52 through 69*n* in FIG. 3, can have different functional partitions from the one described above, such configurations are merely different examples of the disclosed system.

Figure 4:
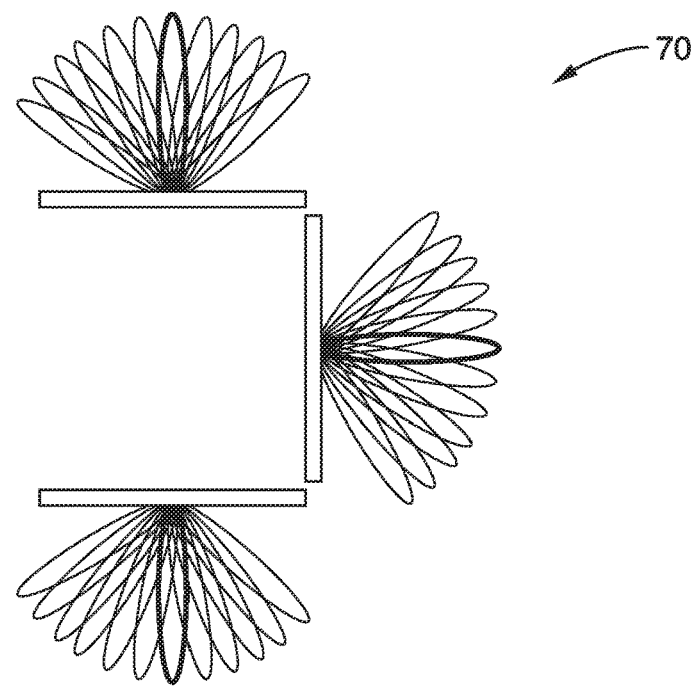
FIG. 4 is a beam pattern diagram as utilized on STAs according to an embodiment of the present disclosure.

FIG. 4 illustrates an example embodiment of antenna directions 70 which can be performed by a STA to generate multiple antenna sector patterns (e.g., 36 shown by example). In this example, the STA implements three RF circuits and connected antennas, and each RF circuit and connected antenna generates multiple (e.g., 12 shown by example) beamforming patterns, which is termed as the STA has 36 antenna sectors. But we assume all STAs have four antenna sectors to ease explanation of the specification. Any arbitrary beam pattern can be mapped to an antenna sector. Typically, the beam pattern is formed to generate a sharp beam, but it is possible that the beam pattern is generated to transmit or receive signals from multiple angles.

2.2. Antenna Sector Info Learning Process

Figure 5:
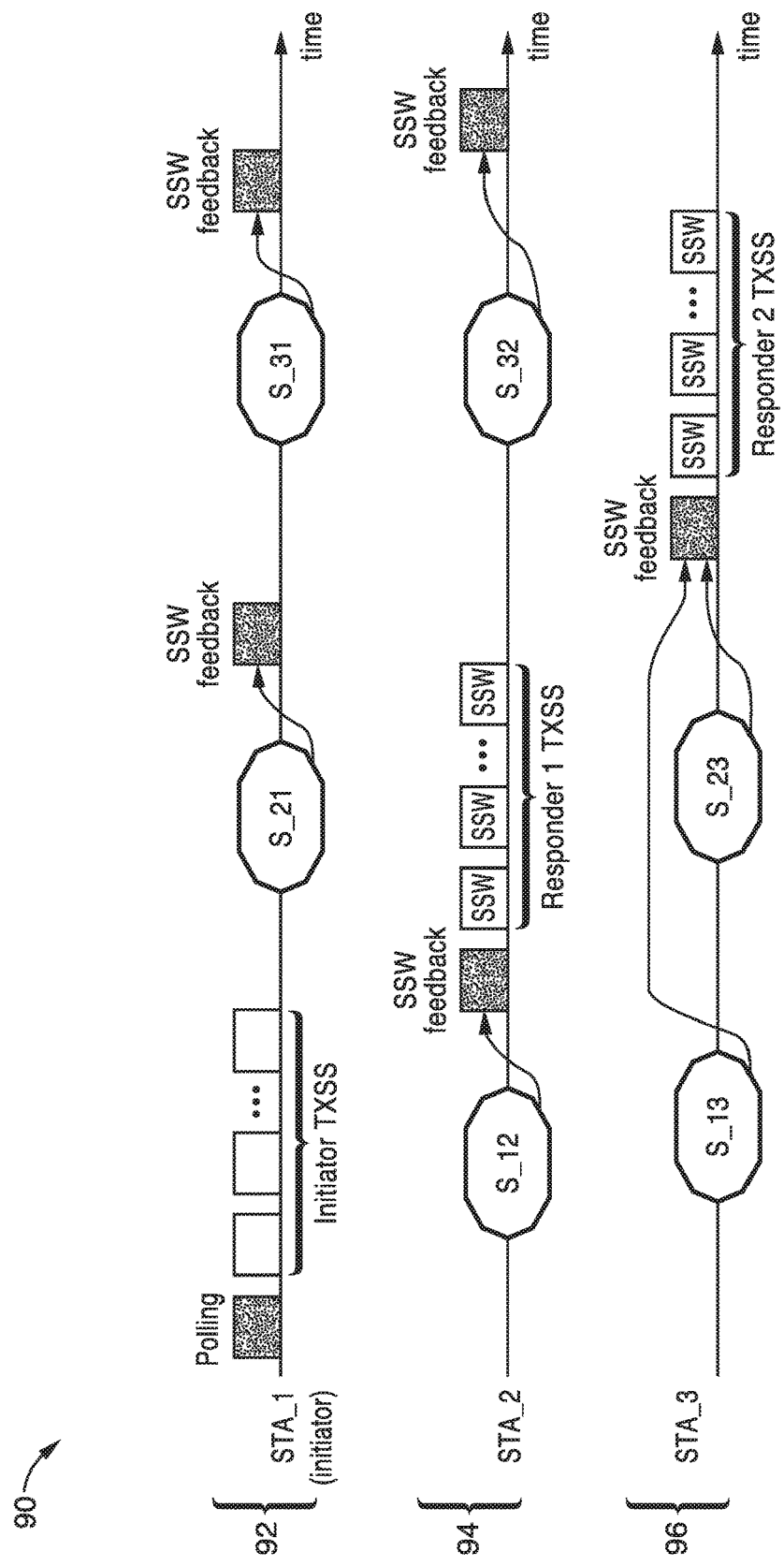
FIG. 5 is a sector sweep learning sequence as utilized according to an embodiment of the present disclosure.

FIG. 5 illustrates an embodiment 90 in which each STA performs sector sweep signal exchange to learn link quality of each antenna sector. Each STA transmits 92, 94, 96 a series of sector sweep (TXSS) signals to let neighboring STAs learn received signal quality of each antenna sector. Neighbor STAs listen to the TXSS signals, and report back with SSW feedback to let their neighbor STAs know signal quality of each antenna sector. As a result, STA1, STA2, and STA3 learn signal quality per antenna sector from each neighbor STAs.

Considering the learning process shown in FIG. 5 with the topology depicted in FIG. 1, STA1 thru STA7 can learn antenna sector signal quality info in its neighborhood. As a result of the antenna sector info learning process, each STA builds a database called Neighbor List and stores received signal quality info per STA per TX antenna sector in its memory. Each instance of the Neighbor List stores miscellaneous information on the neighbor STA.

Figure 6:
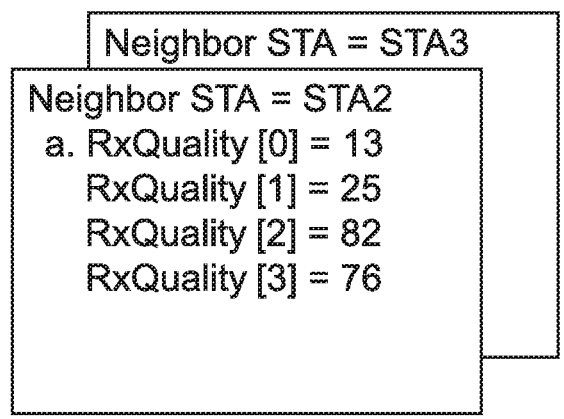
FIG. 6 is a data table for neighbor lists as utilized according to an embodiment of the present disclosure.

FIG. 6 illustrates an example embodiment 110 of a Neighbor List constructed at STA1, in which STA1 recognizes STA2 and STA3 as its neighbor STAs, and creates two instances of Neighbor List entry. STA1 stores receive link quality information to a.RxQuality[N], where N is associated with Tx Antenna Sector of the neighbor STA.

2.3. Traffic Activity Supervision

Each STA also monitors its traffic activity, and tracks what type of traffic the STA is serving at the time. STA collects traffic flow information when a new flow is activated through the route discovery process, and it records the following information per traffic flow: (a) Traffic originating STA, (b) Traffic destination STA, (c) Traffic ID, (d) Traffic bandwidth, (e) Channel time ratio (duty cycle) required to transfer this traffic. This information is stored in the Neighbor List as well. The traffic flow instance is added to the Neighbor List instance of which the STA is transmitting to.

2.4. Information Sharing Among Neighbor STAs

Each STA transmits management information containing antenna sector information and traffic activity info to its neighboring STAs. In this manner neighbor STAs can learn the antenna sector information and traffic activity of neighbor STAs. Neighbor STAs exchange management frames containing the information in a process referred to herein as "neighbor info exchange".

Figure 7:
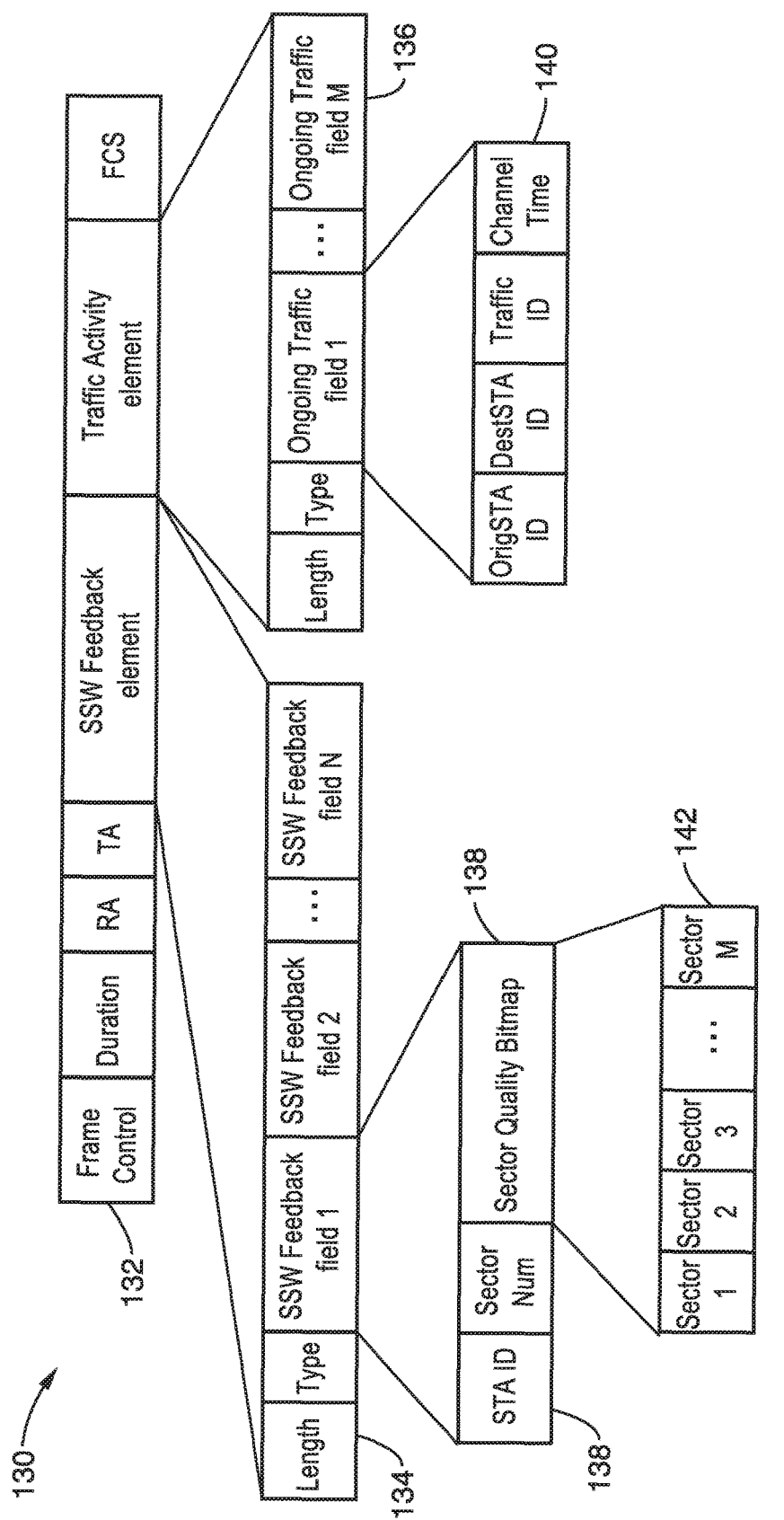
FIG. 7 is a data field format for neighbor information exchange as utilized according to an embodiment of the present disclosure.

FIG. 7 illustrates an example embodiment 130 of frame content for neighbor info exchange in the sector sweep (SSW) control frame 132. The Frame Control (Frame Control) field indicates the type of the frame. Duration field (Duration) contains NAV information used for CSMA/CA channel access. RA field (RA) contains address of the recipient of the frame. TA field (TA) contains address of the STA that transmits the frame.

SSW Feedback element 134 (SSW Feedback element) contains signal quality information as utilized according to this disclosure. Within the element, following length (Length) and type fields (Type), there are one or more SSW Feedback field(s) (SSW Feedback field 1, SSW Feedback field 2, . . . SSW Feedback field N). Each field contains link quality info from particular neighbor STAs. For instance, STA1 in FIG. 5 includes 2 SSW Feedback fields, one contains RX link quality info on STA2's antenna sectors, and another contains RX link quality info on STA3's antenna sectors.

Inside the SSW Feedback field, there are 3 subfields 138, i.e., station identification (STA ID), sector number (Sector Num), and sector quality information (Sector Quality Bitmap). STA ID subfield identifies the STA that associates with this information, Sector Num subfield identifies the length of the Sector Quality Bitmap, and the Sector Quality Bitmap shows quantized link quality value for each sectors.

It should be noted that in FIG. 7 there are 2 bits are assigned for each sector, and the bitmap starts from 1st sector continuing to M-th sector. Each Sector Bitmap is encoded to represent quantized link quality value, In this example: 00: high quality (HQ), 01: medium quality (MQ), 10: low quality (LQ), 11: signal not detected (ND). Although we keep on using this quantized link quality value in this specification, the granularity (resolution) of the quantization can be configured as desired by assigning less or more bits to the Sector Bitmap, and operating accordingly according to the selected resolution.

Following the SSW Feedback element, the STA containing information on traffic activity (Traffic Activity element) in the frame. This element presents when the STA is accommodating (transmitting and/or receiving) ongoing traffics. The Traffic Activity element 136 contains a length (Length) and type (Type) fields, there are 1 or more fields containing information on ongoing traffic (Ongoing Traffic field 1, . . . Ongoing Traffic field M). Each field contains 140 ongoing traffic information per traffic stream, with the following subfields. An originating station identifier field (Orig STA ID) containing traffic originating STA, destination station identifier field (Dest STA ID) containing traffic destination STA, traffic identification field (Traffic ID) containing traffic ID, and a channel time information field (Channel Time) containing information on when the traffic is transferred in a certain time frame. There are 2 ways to transmit the neighbor info as described below.

2.4.1. Information Sharing (Case 1).

In one implementation, information sharing is performed using the SSW feedback seen in FIG. 5, with the frame or information element shown in FIG. 7 transmitted as a SSW feedback frame.

2.4.2. Information Sharing (Case 2).

In another implementation, information sharing is performed through a designated frame that is specifically utilized for neighbor info exchange, as shown in FIG. 7, with this frame being periodically transmitted by an STA, such as based on time or events.

Figure 8:
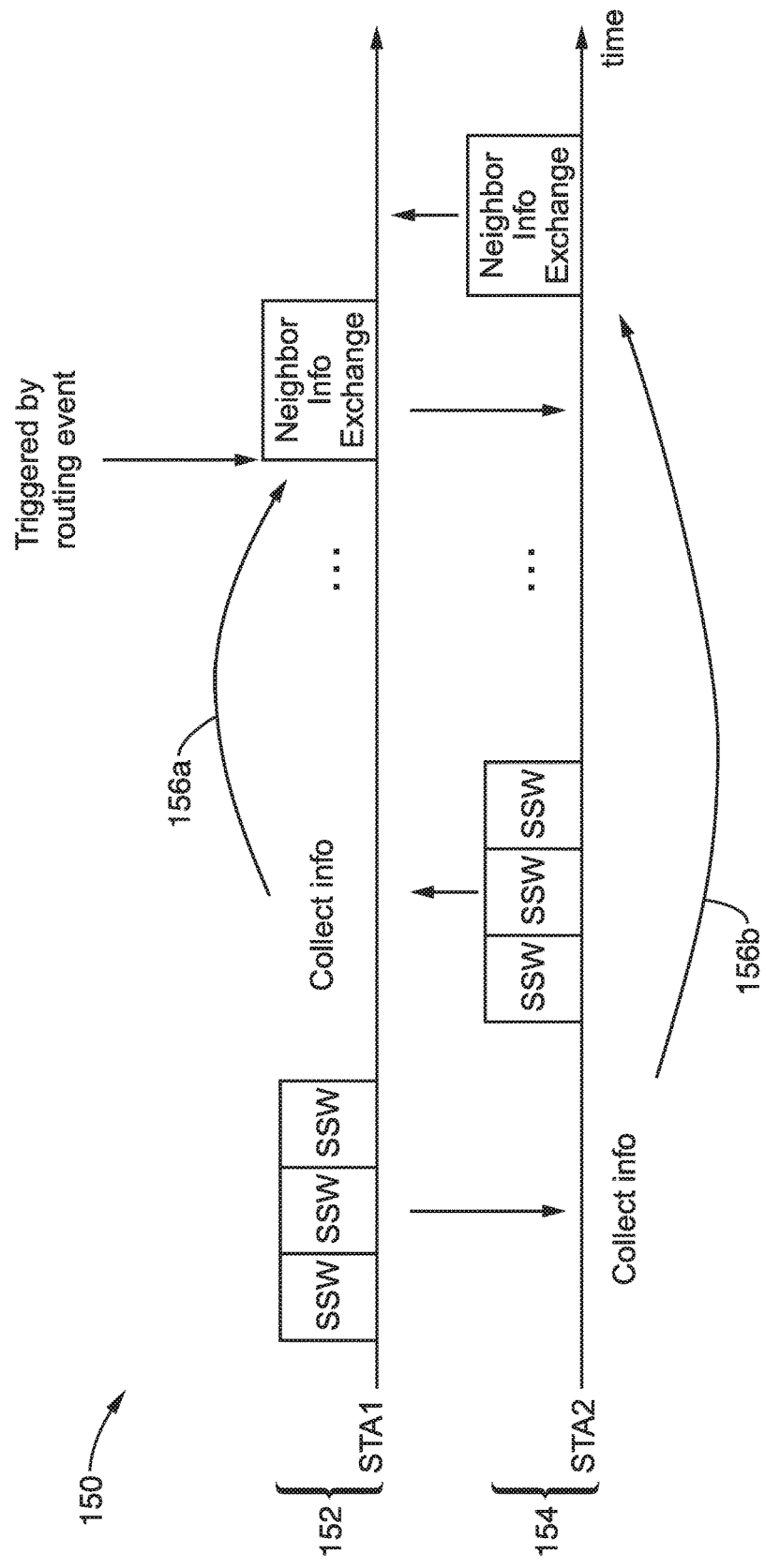
FIG. 8 is an air-time diagram for neighbor information exchange as utilized according to an embodiment of the present disclosure.

FIG. 8 illustrates another example embodiment 150 of neighbor info exchange. The Neighbor Info Exchange frame is transmitted as a general management frame anytime it is needed, such as after collecting neighbor's antenna sector signal quality as seen 152 for STA1 with neighbor info exchange occurring 156*a* after collecting information. A similar situation is seen for STA2 154 which performs neighbor information exchange after collecting information 156*b* and receiving the neighbor information exchange from STA1. It is possible that, when the Neighbor Info Exchange frame is transmitted in a unicast frame, RA field of the frame is set to a particular STA's address, and only 1 SSW Feedback field (which contains info on a neighbor STA that is identified by the RA field) is contained in the SSW Feedback element.

In at least one embodiment it is considered most efficient for STAs to exchange all antenna sector information. However, it is also possible that STAs determine and exchange information on a smaller number of sectors than the actual number of antenna sectors that the STA is configured with. Thus, STAs may only exchange a subset of the sector information. Or in other embodiments STAs may group some sectors and exchange grouped sector information. For instance, if a STA has a hardware configuration such as shown in FIG. 3, it has three RF circuits such as resulting in 36 sectors in total. The STA may group 12 actual antenna sectors into a single sector information by averaging signal quality of sectors and exchange the grouped sector information to minimize the number of required bits for neighbor info exchange and to ease implementation. In this example case, the STA exchanges three sector information, although it has 36 sectors in total. In this example, the STA groups sector information per RF circuitry.

2.4.3. Storing Neighbor Information in Neighbor List.

As a result of the neighbor info exchange process, STA appends information obtained from the neighbor info exchange process to its Neighbor List.

When the STA receives either Neighbor Info Exchange frame or SSW Feedback frame, which contains SSW Feedback element and Traffic Activity element, it updates an instance of the Neighbor List.

FIG. 9 illustrates an example embodiment 170 of the Neighbor List data structure shown for STA2 172 and other stations 174. Traffic activity information is stored in b.TrafficAct[ ] of the corresponding Neighbor List instance.

The figure shows the Neighbor List build at STA1 as per FIG. 7 which collected SSW Feedback element and Traffic Activity element (either via Neighbor Info Exchange frame or SSW Feedback frame) from STA2 and STA3, assuming STA1 has 4 antenna sectors. STA1 parses received information element, copies the information in Traffic Activity element to b.TrafficAct array in its Neighbor List, copies each sector quality info to c.TxQuality[M] in its Neighbor List, where M is associated with Tx Antenna Sector of the STA1. At this point STA1 has obtained rough estimates of signal quality at STA2 and STA3, when it selects which antenna sector to utilize (e.g., sectors 1, 2, 3, or 4). In addition, the STA1 has obtained information about traffic activity at each neighbor STA. STA1 also refers to the timestamp from the timer it runs internally, calculating the expiration time of the written info, and sets the expiration time to f.ExpTime.

FIG. 10 illustrates an example embodiment 190 of the Neighbor list TxQuality data structure. In the figure the neighbor list 192 has structures for each neighbor STA, and by way of example depicts STA2 194*a* and STA3 194*b*, with TxQuality shown for each STA2 sector 196*a*, 198*a*, 200*a*, 202*a*, and TxQuality shown for each STA3 sector 196*b*, 198*b*, 200*b*, 202*b*. The data c.TxQuality[ ] is typically implemented as 2 dimensional list structure so that particular TxQuality[i] of each neighbor STAs can be scanned easily.

2.5. Routing Table and Data Forwarding.

FIG. 11 illustrates an example embodiment 210 of a routing table data structure, showing by way of example three destinations (subtables), as destination AAA 212, BBB 214, and CCC 216. When a STA (originating STA) is to transmit a data frame to another STA (destination STA), it must set up a route to the destination STA. The Routing Table is constructed as an outcome from the route discovery process, which will be explained in the later section.

The route to the destination STA is managed by creating a Routing Table. The Routing Table has data instances per destination STA, and the STA looks up the instance when it transmit a frame to the destination STA. Each instance of the Routing Table contains the following information (subfields) for each destination.

Dest: destination STA address;

a. NextHop: the next hop STA address toward the Dest;

b. TxAntSec: antenna sector used to transmit frames to next hop;

c. Metric: a value that determines distance to the destination STA;

d. SeqNum: value to control loop of routing management frame;

e. TrafficID: corresponding Traffic ID handled by routing table;

f. ExpTime: expiration time of this routing table instance;

g. ValidFlag: identify if this instance is valid or not;

When a STA has a data frame to transmit to a destination STA, it looks up the Routing Table, set RA field of the frame to an address stored in a. NextHop, and transmits the frame using an antenna sector stored in b. TxAntSec.

It should be appreciated that the Routing table has a read section and write section. When seeking a route to the destination STA, a lookup is performed in the read section of the routing table, while the write section is utilized during the process of route determination.

2.6. Routing Management Frame Format.

When a STA found that a route to a destination STA is not available, the STA starts running a routing protocol. The routing protocol exchanges two types of frames to set up a route from an originating STA to a destination STA. RREQ frame is transmitted from the originating STA toward the destination STA. When the destination STA receives an RREQ frame, it will respond with an RREP frame whose destination is the originating STA.

FIG. 12A and FIG. 12B illustrate an example embodiment 230, 240 of content within an RREQ and RREP frame, respectively. By way of example, and not limitation, the basic form of RREQ and RREP exemplified in the FIGS. 232, 242 is the same with Frame Control, Duration, RA, TA, and FCS surrounding the RREQ/RREP element. The frame control field (Frame Control) indicates the type of frame. The duration field (Duration) contains a network allocation vector (NAV) information used for CSMA/CA channel access. The recipient address field (RA) contains an address of the recipient of the frame. The transmitting address field (TA) contains the address of the STA transmitting the frame.

The RREQ element 234 of FIG. 12A contains the following fields:

Length: length of this frame;
Type: type of this frame (RREQ);
Orig STA: address of the Originating STA;
Dest STA: address of the Destination STA;
SeqNum: Sequence Number identifying this route set up. SeqNum is incremented every time the Originating STA attempt to set up or maintain the route;
Metric: carries accumulated metric value toward the Originating STA;
Lifetime: lifetime to the expiration time of this route;
Traffic ID: Traffic ID of the associated traffic stream;
QoS Spec: traffic specification of this traffic stream, i.e., bandwidth, etc.
Access Time: the channel time that TA STA (the STA identified by the TA field) uses for the transmission of data frames toward RA STA (the STA identified by the RA field);
TxAntSector: Tx Antenna Sector that TA STA uses for the transmission of the data frames toward RA STA;
AffectRatio: channel time duty cycle that this transmission affect to other neighboring STAs;
RxQualList: the values contained in a.RxQuality[ ] in TA STA's Neighbor List instance (corresponding to the RA STA).

The RREP element 244 of the RREP frame 242 of FIG. 12B contains the same fields as in the RREQ element 234 described above, except that it is missing the AffectRatio and RxQualList fields.

2.7. Constructing a Routing Table (Scenario 1).

For the sake of example in this routing scenario the STA topology is assumed to be as in FIG. 2, considering the situation when STA1 is attempting to communicate with STA4, when STA1 does not have any valid direct route to STA 4. The following discusses this route set up process for this subcase.

2.7.1. Message Sequence Chart (Scenario 1).

In this scenario, STA1 is trying to transmit data frames toward STA4. As such, STA1 is the traffic originating STA, and STA4 is the traffic destination STA. Other STAs are potential intermediate STAs, but it is uncertain until the route from STA1 to STA4 is determined. These potential intermediate STAs activate a series of events per RREQ frame reception and RREP frame reception. When originating STA, STA1, tries to establish a route to the destination STA, it starts to transmit RREQ frames to its neighbor STAs, the neighbor STAs, which are potential intermediate STAs, propagates the RREQ frames to their neighbor STAs, and the destination STA, STA4, eventually receives the RREQ frames. By receiving RREQ frames from its neighbor STAs, the destination STA, STA4, determines that the route via STA2 is best suited for this transmission, and responds back with RREP frame back towards the originating STA1. When originating STA1 receives RREP via STA2, which is determined as an intermediate STA, an end-end route from STA1 to STA4 (and from STA4 to STA1) is established. This is described in more detail as follows.

FIG. 13 illustrates an example embodiment 250 of a message sequence chart depicting the overall frame exchange sequence taking place in setting up this route. Time periods p1 through p9 are shown, which may be referenced throughout the disclosure. Each of the stations (STA1 through STA7) is seen along the top of the chart, with time starting at the top of the chart and moving down the chart in sequence. In the sequence, one can see STA1, which is a traffic originating STA, sending an RREQ to its neighbor STAs, STA2 and STA3. Each STA which received the RREQ, propagates the RREQ to its neighbor STAs, unless it is the destination STA of this route set up attempt. In this example, in response to which STA2 sends RREQs to its neighbor STAs, which are STA3, STA4 and STA5. STA3 having received an RREQ sends an RREQ to STA2 and to STA4. Similarly, STA5 having received an RREQ sends an RREQ to STA4 and to STA6. STA6 having received an RREQ sends an RREQ to STA4 and to STA7. STA7 having received an RREQ sends an RREQ to STA4. Having collected the necessary information on the local STAs, the destination STA, which is STA4, picks up STA2 as an intermediate STA toward originating STA1 and sends a routing response RREP to STA2. Upon reception of RREP, STA2 recognizes that it is selected as an intermediate STA, and it sends the RREP back to originating STA1. Now, the RREP is received at the originating STA1. STA1 recognizes STA2 as an intermediate STA toward destination STA4. In this way, STAs establish the routing path from STA1 (originating STA) through STA2 (intermediate STA) to STA4 (destination STA).

2.7.2. RREQ Transmitter STA Behavior.
2.7.2.1. RREQ Transmitter STA Logic Flow 1.

FIG. 14 illustrates an example embodiment 270 of originating STA RREQ transmission logic. When the STA receives transmitting traffic from higher layer it enters the RREQ TX procedure 272, it looks up its Routing Table, to determine 274 if there is an available route to the destination STA. If there is a route to the destination, then block 276 is executed to determine if the route expiration time is close to being reached. If the route is not near its expiration time, then the route may be used and the process ends 282. If the route is near expiration time, or there is no route found to the destination as per block 274, then execution moves to block 278 which sets initial, default, or given values to the transmitting RREQ, and then runs a process 280 to propagate RREQ to neighbor STAs, before ending the process 282. Thus, it is seen that when the route to the destination STA is found, the STA also checks if the expiration time of the route is close. If it is the case, it also kicks the RREQ transmission to refresh and maintain the existing route. Otherwise, the STA just uses the existing Routing Table.

2.7.2.2. RREQ Transmitter STA Logic Flow 2.

FIG. 15A and FIG. 15B illustrate an example embodiment 290 of logic flow of propagating RREQs to neighbor STAs as seen in block 280 of FIG. 14. RREQ transmission is a process of testing to determine possible routes, in which the STA transmits RREQ to multiple neighbor STAs, or selected neighbor STA(s), if it has multiple neighbor STAs.

The process starts 292, and then the STA scans 294 all neighbor STAs in its Neighbor List, picking up neighbor STAs one by one, with the target neighbor being the picked neighbor STA instance. Thus, the STA tries to send an RREQ to each of these neighbors 294, 296. A determination at block 298 if the RREQ transmission is triggered by reception of RREQ and the TargetNeighbor matches with either RREQ.TA or RREQ.OrigSTA. If there is a match, it does not transmit RREQ to the neighbor STA and execution ends 310. Otherwise, as there was no match the STA process moves forward to block 300, which determines transmit antenna sector toward the TargetNeighbor. As a consequence of this step, the STA determines AffectRatio and BestSector. Then in block 302 a number of RREQ field values are set, including AffectRatio field, TxAntSector field, RxQual[ ] fields, and the RA fields of the transmitting RREQ.

Then, at block 304 the STA determines when this traffic is to be transmitted if it transmits data frames to TargetNeighbor using the BestSector. Specifically it determined channel time allocation referring RREQ.QoSSpec and the neighbor list, and allocates channel time to the transmission of the traffic to TargetNeighbor using the best sector. Thus, information set in the QoSSpec field (requested bandwidth) in the RREQ element, and c.TxQuality[BestSector] and b.TrafficAct[ ] in Neighbor List instances are referred to seek for available time allocation. For the sake of conciseness, details of the process to decide channel time is not described, yet it will be appreciated by one of ordinary skill in the art that it can be determined in a number of ways.

Reaching block 306, the determined channel time is copied to AccessTime field in the RREQ element and stored to g.AccessTime in the TargetNeighbor. However, this channel time allocation is pending until the route is confirmed. As such, g.AccessTime in the TargetNeighbor is subject to removal per confirmation timeout. The STA runs a timer to remove the g.AccessTime. And when the timer fires, this data is removed from the TargetNeighbor.

Now, block 308 is reached, with the RREQ frame transmission toward TargetNeighbor being ready. The STA sets own address to TA field in the RREQ frame, and then transmits the RREQ frame to TargetNeighbor using the BestSector. The process then ends 310.

2.7.2.3. RREQ Transmitter STA Logic Flow 3.

FIG. 16A and FIG. 16B illustrate an example embodiment 330 of logic flow for determining the transmit sector toward the target neighbor, as was executed in block 300 of FIG. 15A. After the procedure is entered 332 in FIG. 16A, the STA determines which Tx antenna sector should be used to transmit data to TargetNeighbor. The fundamental strategy here is to try to find out the Tx sector that gives higher data rate while minimizing interference effect to other neighbor STAs.

First, in block 334 variable MaxRate is initialized. Then at block 336 the STA scans all TxQuality in this Neighbor List instance (TargetNeighbor), and picks up TxQuality[i] one by one. Then in block 338 the STA sets TxAnt to the picked Tx antenna sector (c.TxQuality[i]). Then it calculates 340 expected link rate to the TargetNeighbor using c.TxQuality[i] and b.TrafficAct. TxQuality[i] gives approximated link rate and b.TrafficAct gives available channel time duty cycle to accommodate this traffic. c.TxQuality[i] multiplied by the channel time duty cycle which can be used for the calculated link rate. This value is stored in variable TxRate.

Then, in block 342 the STA checks how much interference will the STA generate if the STA uses TxAnt. In this embodiment, this is determined by scanning c.TxQuality[i] of other neighbor STA instances in the Neighbor List, and running a loop and picking up neighbor STA's TxQuality[i] one by one. It will be appreciated that other methods may be utilized to estimate the level of interference, without departing from the teachings of the present disclosure.

In block 344 the picked neighbor STA instance is stored to AffectedSTA. A check is made 346 of FIG. 16B if the AffectedSTA is different from the TargetNeighbor. If it is not different, then a calculation is made to determine Affect Factor to the AffectedSTA referring c.TxQuality[i] of the AffectedSTA; Affect Factor indicates how much it will generate interference to the AffectSTA. If the c.TxQuality[i] is higher quality, it will be significantly affected and the Affect Factor can be larger (maximum 1.0). If the c.TxQuality[i] is not detected (ND), it will not be affected and the Affect Factor is zero. Affect Factor is then calculated 348. In at least one embodiment, the Affect Factor to the AffectedSTA is calculated as AffectFactor[AffectedSTA]=Func (c.TxQuality[i])*DutyCycle, where Func( ) is a linear function from 0.0 to 1.0, and DutyCycle is calculated from b.TrafficAct in the TargetNeighbor, although Affect Factor may be determined in other ways without departing from the teachings of the present disclosure. The STA repeats the same operation with all instances in its Neighbor List.

The STA then accumulates 350 Affect Factor among neighbor STAs, so that the total impact is reflected to the Affect Factor.

Next, the STA calculates 352 effective link rate to the TargetNeighbor using TxAnt. TxRate is the base link rate, and this value is adjusted by Affect Factor. The effective rate is calculated such as EffectRate=TxRate*(1−AffectFactor); where EffectRate is the final effective rate.

The STA will pick up data from a Neighbor List instance that gives the maximum EffectRate. A determination 354 is made if the EffectRate is greater than MaxRate. If the EffectRate is greater than MaxRate, then block 356 is executed in which the STA sets MaxRate to EffectRate, sets BestSector to TxAnt, and sets AffectRatio to the Affect Factor.

After running the loop back in block 336, the STA obtains in block 358 the final conclusion of BestSector. This is copied 360 to e.CandSector of the TargetNeighbor, in which CandSector indicates a candidate transmit antenna sector. Then the process is concluded 362.

2.7.2.4. Neighbor List and Routing Table at STA1@P1

The preceding sections have discussed how STA1, as an originating STA, determines transmitting RREQ. And as in FIG. 13, STA1 transmits RREQ to its neighbor STAs, STA2 and STA3, following the logic as explained. At the time of RREQ transmission, time reference P1 in FIG. 13, STA1's Neighbor List is updated.

FIG. 17 illustrates an example embodiment 370 of Neighbor List update at the time of RREQ transmission. In the figure is seen a table of data 372 for STA2, a table 374 for STA3, and an empty routing table 376.

As a result from step 300 in FIG. 15A, STA1 sets e.CandSector in Neighbor List instances to an appropriate number (Tx antenna sector that gives the best effective link rate). As a result from steps 304, 306 in FIG. 15B proposed channel allocation time and associated information are written in g.AccessTime in Neighbor List instances. In FIG. 17, data updated as a results of the RREQ transmission process is shown with underlining, while at this point in time, STA1 has no instance of a Routing Table yet.

2.7.3. RREQ Receiver STA Behavior
2.7.3.1. RREQ Receiver STA Logic Flow FIG. 18A and FIG. 18B illustrate an example embodiment 390 of program flow of the RREQ receive procedure for STAs that receive the RREQ frame. STA starts this process 392 in FIG. 18A, when it receives RREQ from a neighbor STA. With a scenario shown in FIG. 13, the process starts 392 in FIG. 18A with RREQs transmitted by STA1 being received at the other stations, herein exemplified as STA2 and STA3. By way of example and not limitation, this subclause example, focuses on STA2 and describes the behavior of STA2 upon reception of the RREQ.

When the STA receives an RREQ frame from one of its neighbor STAs, it looks up (searches) 394 the Neighbor List, and picks up (finds) an instance that matches with the address in the TA field of the received RREQ, and puts this Neighbor List instance to TargetNeighbor.

Then, the STA calculates 396 a link metric value from the neighbor STA (STA1) to itself (STA2). The link metric is a function of the received signal quality. If the signal quality is better, the link metric value will be smaller. The less metric value means the better link quality. The STA pick up link quality by referring to RxQuality[RREQ.TxAntSector] in the TargetNeighbor. Note that TxAntSector field in the RREQ contains STA1, which is the STA that transmitted the RREQ frame's Tx antenna sector number. The STA may take signal quality of the received RREQ into consideration to determine the link quality as well. As a result of the calculation, the STA stores the calculated metric value to a variable LinkMetricForward.

Then the STA runs logic 398 which is equivalent to step 300 in FIG. 15A. Block 398 in FIG. 18A determines transmit sector toward the TargetNeighbor. As a consequence of this step, the STA determines AffectRatio and BestSector, as described already.

The STA further calculates 400 link metric values from itself (STA2) to the neighbor STA (STA1). The STA picks up link quality by referring to RxQual[BestSector] field in the received RREQ element. It should be appreciated that RxQual field in the RREQ contains STA1's received signal quality from STA2. The STA stores the calculated metric value to a variable LinkMetricReverse.

Then, the STA determines 402 PathMetric by accumulating the value in the Metric field in the received RREQ element, LinkMetricForward, and LinkMetricReverse.

The STA looks up (searches) 404 its Routing Table and picks up an instance identified by Dest is equal to Orig STA field in the received RREQ element. If the STA cannot find such an instance, it generates a new Routing Table instance. The STA sets RouteTable pointer to the picked or newly generated Routing Table instance.

The STA then evaluates 406 in FIG. 18B the sequence number of the RREQ and metric value. If the received RREQ is new route set up or maintenance attempt (RREQ.SeqNum>RouteTable.d.SeqNum) or the calculated PathMetric is better (smaller) than the metric value stored in the RouteTable before, then block 408 is executed in which the STA replaces candidate route to the destination STA with the new data which suggest to use TargetNeighbor as the next hop STA to the destination STA. If the above condition does not meet, the STA simply discard received RREQ frame and end the process at block 420.

If the STA replaces candidate route to the destination STA as per block 408, then as seen in that block the STA replaces members in the RouteTable with the variables shown.

Then the STA stores information 410 contained in the TrafficID field and QoSSpec field to g.AccessTime of the TargetNeighbor.

A determination is made 412 if the Dest STA field in the RREQ frame matches with its own address. If this is its own address, then the STA executes block 418 to set a timer (RREP transmit timer) to schedule a transmission of the RREP frame.

Otherwise, if the Dest STA field in the RREQ frame is different from its own address, then the STA reaches block 414 and copies fields in the received RREQ frame to transmitting RREQ frame to overwrite Metric field with PathMetric. After that, the STA runs a process 416 to propagate RREQ to neighbor STAs which is equivalent to block 280 in FIG. 14, the details of which were explained in a previous section.

2.7.3.2. Neighbor List and Routing Table at STA2@P2/P5

The above has described how a station (e.g., STA2 in the example) behaves upon reception of RREQ frame, with steps up to block 410 in FIG. 18B illustrating the process of RREQ reception, and steps 414 and 416 showing the process of RREQ propagation.

FIG. 19 illustrates an example embodiment 430 of how STA2's Neighbor List and Routing Table were updated as a result of the process of RREQ reception and in view of time reference P2 in FIG. 13. FIG. 19 depicts neighbors lists for the participating stations STA1 432, STA3 434, STA4 436, STA5 438, and shows a routing table 440 for Dest=STA1. It will be seen that the updated values are shown, specifically for STA1 432 e.CardSector=3, g.AccessTime[0]=x, and the whole of the routing table 440.

The above updates arise as a result from step 398 in FIG. 18A, STA2 sets e.CandSector in Neighbor List instances of STA1 to an appropriate number (Tx antenna sector that gives the best effective link rate). As a result from step 410 in FIG. 18B, Traffic ID and QoSSpec are written in g.AccessTime in the Neighbor List instance. Also, as a result from step 408 of that figure, STA2 generated a Routing Table instance of which the Dest=STA1.

FIG. 20 illustrates an example embodiment 450 showing neighbor lists as a result of the process of RREQ propagation, as seen in FIG. 13 with STA2 transmitting RREQ to STA3, STA4, and STA5 following the explained logic as per block 416 in FIG. 18B. At the time of RREQ transmission, time reference P5 in FIG. 13, STA2's Neighbor List is updated. In FIG. 20 are shown the neighbor list STA1 452, STA3, 454, STA4 456, STA5 458 and the routing table 460 for Dest=STA1.

As a result from step 398 in FIG. 18A, STA2 sets e.CandSector in Neighbor List instances to an appropriate number (Tx antenna sector that gives the best effective link rate). As a result from step 304 and 306 as seen in FIG. 15B, proposed channel allocation time and associated information are written in g.AccessTime in Neighbor List instances. The changes in the lists of FIG. 20 as a results of the RREQ transmission process is shown surrounded by a dashed line.

2.7.3.3. Neighbor List and Routing Table at STA4@P6

RREQ frames that STA2 transmitted are received at STA3, STA4, and STA5. In this subclause, focus is turned to STA4 describing how STA4 behave upon reception of the RREQ according to the present disclosure.

FIG. 21 illustrates an example embodiment 470 of data updates, for STA2 472, STA3 474, and the routing table with Dest of STA1. The updates arise with STA4 running the same logic as shown in FIG. 18A and FIG. 18B, as it received an RREQ frame. Up to step 410 of FIG. 18B, STA4 follows the same processing as STA2 and updates it Neighbor List and Routing Table. As a result, at time reference P6 in FIG. 13, STA4's Neighbor List and Routing Table are updated as seen in FIG. 21.

As a result from step 398 in FIG. 18A, STA4 sets e.CandSector in Neighbor List instances of STA2 to an appropriate number (Tx antenna sector that gives the best effective link rate). As a result from step 410 from FIG. 18B, Traffic ID and QoSSpec are written in g.AccessTime in the Neighbor List instance. Also, as a result from step 408, STA4 generated a Routing Table instance of which the Dest=STA1. In FIG. 21 data update as a results of the process of RREQ reception are shown surrounded by a dashed lined.

At step 412 in FIG. 18B STA4 determines that the Dest STA field in the RREQ is equivalent to itself. As such, it does not propagate the RREQ further, but it starts an RREP transmit timer to respond with RREP.

2.7.4. RREP Transmitter STA Behavior 2.7.4.1. RREP Transmitter STA Logic Flow

FIG. 22 illustrates an example embodiment 490 of process flow when the RREP transmit timer fires (triggers). As discussed above, this timer is set at the destination STA, and the event occurs at the destination STA. In the example scenario shown in FIG. 13, STA4 initiates an RREP transmission procedure to start 492 this process. In block 494 the STA copies fields in the received RREQ frame to fields in transmitting an RREP, and then initializes the Metric field in the RREP frame. Then the STA runs logic to propagate 496 RREP to a neighbor STA, which is detailed in the following figure, before ending 498.

FIG. 23 illustrates an example embodiment 510 of process flow for propagating an RREP to a neighbor STA, as starting at block 512. The STA looks up (searches) 514 its Routing Table and picks up (finds) an instance of which Dest==OrigSTA in the RREP element. The STA sets RouteTable pointer to the picked instance. Then in block 516 the STA copies a.NextHop in the RouteTable to RA field of the RREP frame, and copies b.TxAntSec in the RouteTable to TxAntSector field of the RREP frame. Further, the STA sets g.ValidFlag of the RouteTable to True to validate this RouteTable instance. As a result of the validation, RouteTable info are sent to read section of the Routing Table, and it is used for data forwarding (relaying).

Then in block 518 the STA looks up (searches) its Neighbor List, and picks up (finds) a Neighbor List instance that matches with a.NextHop in the RouteTable, and TargetNeighbor identifies the instance.

At block 520, the STA determines when this traffic is to be transmitted to the TargetNeighbor using b.TxAntSec in the RouteTable. Information set in the QoSSpec field (requested bandwidth) in the transmitting RREP element, and c.TxQuality[RouteTable.b.TxAntSec] and b.TrafficAct[ ] in Neighbor List instances are referred to seek for available time allocation.

At block 522, after finding out available channel time, the determined channel time is copied to AccessTime field in the RREP element and stored to g. AccessTime in the TargetNeighbor. Here, this channel time allocation is decided allocation and the time information is used when it intends to transmit data frames.

Then at block 524, the STA copies e.CandSector to d.TxAntSector in the TargetNeighbor. By setting this value, the transmitting antenna sector is confirmed and valid for actual use.

At block 526 the STA copies its own address to TA field in the RREP frame, and then it transmits RREP frame to the TargetNeighbor using the Tx antenna sector identified by b.TxAntSec of the RouteTable, prior to ending the process 528.

2.7.4.2. Neighbor List and Routing Table at STA4@P7

FIG. 24 illustrates an example embodiment 530 of updates to neighbor lists for STA2 532, STA3 534 and the routing table 540 for Dest=STA1 at STA4. In the prior sections it has been discussed how STA4, as the destination STA, behaves at the time of RREP transmission. As a result of the RREP transmission, time reference P7 in FIG. 13, STA4's Neighbor List and Routing Table are updated.

As a result from step 516 in FIG. 23, STA4 validates the Routing Table instance of which Dest==STA1. As a result of step 524 in FIG. 23, STA4 sets d.TxAntSector in Neighbor List instances of STA2 to an appropriate number (Tx antenna sector that gives the best effective link rate). As a result from step 520 of FIG. 23, determined channel time information are written in g.AccessTime in the Neighbor List instance. In the figure, data updated as a result of the process of RREP initiation is shown surrounded by a dashed line.

2.7.5. RREP Receiver STA Behavior 2.7.5.1. RREP Receiver STA Logic Flow 1

FIG. 25 illustrates an example embodiment 550 of the RREP receive procedure starting at block 552. A STA starts this process 552 upon receiving an RREP from a neighbor STA. With a scenario shown in FIG. 13, RREP transmitted by STA4 is received at STA2. A STA that receives an RREP frame runs logic shown in the figure, with the discussion of this subclause focusing on STA2 and how it is configured to handle reception of the RREP.

When the STA receives a RREP frame from one of its neighbor STA, it is a confirmation of the candidate route that the built in the process of RREQ propagation. The STA that receives a RREP frame runs Confirm RREP reception 554 from a neighbor STA procedure, which will be discussed in detail in a later section.

A determination is made 556, if the OrigSTA field in the RREP frame matches with its own address. If RREP frame matches its own address then execution moves to the end 562 and the STA will finish the route set up process as the RREP has reached to the Originating STA, and all the routes to the Destination STA have been set up.

Otherwise, if the OrigSTA field in the RREP frame is different from its own address, then the STA copies fields 558 in the received RREP frame to transmitting RREP frame. and runs a process to propagate 560 the RREP to a neighbor STA, which is equivalent to 496 in FIG. 22.

2.7.5.2. RREP Receiver STA Logic Flow 2

FIG. 26 illustrates an example embodiment 570 of confirming RREP reception from a neighbor STA, as was executed in block 554 in FIG. 25. The process starts at block 572, then the STA looks up (searches) 574 its Routing Table and picks up (finds) an instance identified by Dest is equal to DestSTA field in the received RREP element. If the STA cannot find such instance, it generate a new Routing Table instance. The STA sets RouteTable pointer to the picked or newly generated Routing Table instance.

At block 576, the STA looks up (searches) its Neighbor List and picks up (finds) an instance that matches with TA field in the RREP frame. The instance is identified by NeighborEntry.

At block 578 the STA replaces members in the RouteTable with the variables shown. Here, the STA sets g.ValidFlag of the RouteTable to True to validate this RouteTable instance. As a result of the validation, RouteTable info are sent to read section of the Routing Table, and it is used for data forwarding (relaying).

Then the STA validates 580 g.AccessTime of the NeighborEntry, to make sure that the channel time allocation is decided allocation and the time information is used when it intends to transmit data frames.

In block 582 the STA copies e.CandSector to d.TxAntSector in the Neighbor Entry. By setting this value, the transmitting antenna sector is confirmed and valid for actual use, and the process ends 584.

2.7.5.3. Neighbor List and Routing Table at STA2@P8

FIG. 27 illustrates an example embodiment 590 of a Neighbor List and Routing Table status of STA2@P8. Shown in the figure are seen updates for STA1 592, STA3 594, STA4 596, STA5 598, as well as routing table for Dest=STA1 600, and Dest=STA4 602. In previous sections it has been discussed how STA2 is configured to behave at the time of RREP reception. As a result of the RREP reception and RREP propagation, time reference P8 in FIG. 13, STA2's Neighbor List and Routing Table are updated.

As a result from step 578 in FIG. 26, STA2 generates and validates the Routing Table instance of which Dest==STA4. As a result of step 580 of FIG. 26, STA2 validates g.AccessTime in the Neighbor List instance of STA4. As a result of step 582 in FIG. 26, STA2 sets d.TxAntSector in the Neighbor List instance of STA4 to an appropriate number.

As a result from step 516 in FIG. 23, STA2 validates the Routing Table instance of which Dest==STA1. As a result of step 524 in FIG. 23, STA2 sets d.TxAntSector in Neighbor List instances of STA1 to an appropriate value. As a result from step 520 in FIG. 23, determined channel time information are written in g.AccessTime in the Neighbor List instance. Further, g.AccessTime in other Neighbor List instances are returned to NULL per confirmation timeout. In FIG. 27 the updated fields are shown surrounded by a dashed line as a result of the process of RREP reception and RREP propagation.

2.7.5.4. Neighbor List and Routing Table at STA1@P9

FIG. 28 illustrates an example embodiment 610 of Neighbor List and Routing Table status of STA1@P9, for STA2 612, STA3 614, and routing table for Dest=STA4 620. The RREP frame that STA2 transmitted is received at STA1. STA1 runs the same logic as shown in FIG. 25, as it received an RREP frame. STA1 runs the same logic in step 554 in FIG. 25, but it determines that the OrigSTA field in the RREP frame matches its own address and finishes the procedure. As a result, at time reference P9 in FIG. 13, STA1's Neighbor List and Routing Table were updated as seen in FIG. 28.

In particular, as a result of step 578 from FIG. 26, STA1 generates and validates the Routing Table instance of which Dest==STA4. As a result of step 580 from FIG. 26, STA1 validates g.AccessTime in the Neighbor List instance of STA2. As a result of step 582 from FIG. 26, STA1 sets d.TxAntSector in the Neighbor List instance of STA2 to an appropriate number. The changes to the tables are shown surrounded by a dashed line in FIG. 28.

2.8. How to Construct Routing Table (Scenario 2)

FIG. 29 illustrates an example embodiment 630 of a message sequence according to a second scenario. In this scenario the STA topology as in FIG. 2 is again assumed. In this scenario, STA5 is attempting to communicate with STA7, after STA1 set up a route to STA4 as described in the previous subclause. It should be noted that STA5 does not have any valid route to STA7 at the beginning. The following discusses the route set up process in this subclause. Time periods p21 through p25 are shown, which may be referenced throughout the disclosure.

2.8.1. Message Sequence Chart (Scenario 2)

In this scenario, STA5 is the traffic originating STA, and STA7 is the traffic destination STA. Other STAs are potential intermediate STAs, but it is uncertain which STAs will intermediate until the route from STA5 to STA7 is determined. These potential intermediate STAs activate a series of events per RREQ frame reception and RREP frame reception. When STA5, originating STA, tries to transmit data frames to STA7, it starts to transmit RREQ frames to its neighbor STAs, in the example topology these are STA2 632, STA4 634, and STA6 636, and these neighbor STAs propagate the RREQ frames. At this stage, these neighbor STAs behave as potential intermediate STAs. In particular it is seen that STA2 propagates RREQ to STA1 638, STA3 640 and STA4 642. STA4 propagates RREQ to STA2 644, STA3 646, STA6 648 and STA7 650. STA6 propagates RREQ to STA4 652 and STA7 654. The result being from above being that STA7 eventually receives the RREQ frames. By receiving RREQ frames from its neighbor STAs, STA7, as the destination STA, eventually determines that the route via STA6 best suited for this transmission, picks up STA6 as an intermediate STA toward originating STA4, and responds back with generating an RREP frame toward STA5. In particular, STA7 sends a routing response RREP to pick up intermediate STA, STA6. Upon reception of RREP, STA6 recognizes that it is selected as an intermediate STA and it sends the RREP back to originating STA 5. When STA5 receives RREP via STA6, STA5 recognizes STA6 as an intermediate STA toward destination STA7. In this way, the end-end route from originating STA5 to destination STA7 (and from STA7 to STA5) is established.

2.8.1.1. Neighbor List and Routing Table at STA5@P21

FIG. 30 illustrates an example embodiment 670 of a Neighbor List and Routing Table status of STA5@P21, with STA5 running logic shown in FIG. 14. Neighbor lists are seen for STA2 672, STA4 674, STA6 676, while the routing table 678 has not been created yet.

As in FIG. 29, STA5 transmits RREQ to STA2, STA4, and STA6 following the explained logic. At the time of RREQ transmission, time reference P21 in FIG. 29, STA5's Neighbor List is updated.

As a result from step 300 in FIG. 15A, STA5 sets e.CandSector in Neighbor List instances to an appropriate number (Tx antenna sector that gives the best effective link rate). It should be noted that STA5 picks up antenna sector 0 as the BestSector to STA6, while antenna sector 1 gives the highest bandwidth to STA6. This results from the fact that antenna sector 1 generates interference to STA4 which has ongoing traffic. At the time of BestSector determination, steps 352, 354 in FIG. 16B, STA5 determined that EffectRate with antenna sector 0 gives better value than EffectRate with antenna sector 1.

As a result from step 304, 306 in FIG. 15B, proposed channel allocation time and associated information are written in g.AccessTime in Neighbor List instances. In the figure, data updated as a result of the RREQ transmission process is shown surrounded by a dashed line. At this point in time, STA5 has no instance of Routing Table yet.

2.8.1.2. Neighbor List and Routing Table at STA6@P22

FIG. 31 illustrates an example embodiment 690 Neighbor List and Routing Table status of STA6@P22. Neighbor lists are seen for STA4 692, STA5 694, STA7 696, with routing table for Dest=STA5 700.

RREQs transmitted by STA5 are received at STA2, STA4, and STA6. STAs that receives RREQ frame run the logic shown in FIG. 18A and FIG. 18B. The following section focuses on STA6 and how the Neighbor List and Routing Table of STA6 changes.

As a result of the process of RREQ reception and RREQ propagation, time reference P22 in FIG. 29, Neighbor List of STA6 and Routing Table are updated.

As a result from step 398 in FIG. 18A, STA6 sets e.CandSector in Neighbor List instances of STA5 to an appropriate number (Tx antenna sector that gives the best effective link rate). As a result from step 410 in FIG. 18B, Traffic ID and QoSSpec are written in g.AccessTime in the Neighbor List instance. It should be noted that STA6 picks up antenna sector 3 as the BestSector to STA5, while antenna sector 2 gives the highest bandwidth to STA5. This results from the determination that antenna sector 2 generates interference to STA4 which has ongoing traffic. At the time of BestSector determination, steps 352, 354 in FIG. 16B for STA6 determined that EffectRate with antenna sector 3 gives better value than EffectRate with antenna sector 2. Also, as a result from step 408 in FIG. 18B, STA6 generated a Routing Table instance of which the Dest=STA5.

As a result of the process of RREQ propagation, as in FIG. 29, STA6 transmits RREQ to STA4, and STA7 following the explained logic. As a result from step 398 in FIG. 18A, STA6 sets e.CandSector in Neighbor List instances of STA4 and STA7 to an appropriate number. It will be noted that STA6 picks up antenna sector 0 as the BestSector to STA7, while antenna sector 1 gives the highest bandwidth to STA7. This results from a determination that antenna sector 1 generates interference to STA4 which has ongoing traffic. At the time of BestSector determination, steps 352, 354 in FIG. 16B, STA6 determined that EffectRate with antenna sector 0 gives better value than EffectRate with antenna sector 1.

As a result from step 304, 306 in FIG. 15B, proposed channel allocation time and associated information are written in g.AccessTime in the Neighbor List instances. In the figure, data updated as a result of the RREQ transmission process is shown surrounded by a dashed line.

2.8.1.3. Neighbor List and Routing Table at STA7@P23

FIG. 32 illustrates an example embodiment 710 Neighbor List and Routing Table status of STA7@P23. Neighbor lists are seen for STA4 712, STA6 714 with routing table for Dest=STA5 720. RREQ frames that STA6 transmitted are received at STA4 and STA7.

In this subclause, the focus is on STA7 and how it is configured in the present disclosure to behave upon reception of the RREQ. STA7 runs logic as shown in FIG. 18A and FIG. 18B, as it received an RREQ frame. As a result, at time reference P23 in FIG. 29, Neighbor List and Routing Table for STA7 are updated.

As a result from step 398 in FIG. 18A, STA7 sets e.CandSector in Neighbor List instances of STA6 to an appropriate number. It should be noted that STA7 picks up antenna sector 3 as the BestSector to STA6, while antenna sector 2 gives the highest bandwidth to STA6. This result arises from a determination that antenna sector 2 generates interference to STA4 which has ongoing traffic. At the time of BestSector determination, steps 352, 354 in FIG. 16B, STA7 determined that EffectRate with antenna sector 3 gives better value than EffectRate with antenna sector 2. Also, as a result from step 408 in FIG. 18B, STA7 generated a Routing Table instance of which the Dest=STA6. STA7 further runs logic shown in FIG. 22, per RREP transmit timer expiration, and transmits a RREP frame to STA6. As a result of the RREP transmission, time reference P23 in FIG. 29, STA7's Neighbor List and Routing Table are updated as shown in FIG. 32.

As a result from step 516 in FIG. 23, STA7 validates the Routing Table instance of which Dest==STA5. As a result of step 524 in FIG. 23, STA7 sets d.TxAntSector in Neighbor List instances of STA6 to an appropriate number. As a result from step 520 in FIG. 23, the determined channel time information is written in g.AccessTime in the Neighbor List instance. In the figure, data updated as a results of the process of RREQ reception and RREP initiation are shown surrounded by a dashed line.

2.8.1.4. Neighbor List and Routing Table at STA6@P24

FIG. 33 illustrates an example embodiment 730 of Neighbor List and Routing Table status of STA6@P24. Neighbor lists are seen for STA4 732, STA5 734, STA7 736 with a routing table for Dest=STA5 738, and a routing table for Dest=STA7 740. The RREP transmitted by STA7 is received at STA6. STA that receives RREP frame runs logic shown in FIG. 25. As a result, STA6 confirms routes and propagate the RREP to STA5.

As a result of the RREP reception and RREP propagation, time reference P24 in FIG. 29, Neighbor List and Routing Table for STA6 are updated.

As a result from step S93, STA6 generates and validates the Routing Table instance of which Dest==STA7. As a result of step 580 in FIG. 26, STA6 validates g.AccessTime in the Neighbor List instance of STA7. As a result of step 582 in FIG. 26, STA6 sets d.TxAntSector in the Neighbor List instance of STA7 to an appropriate number.

As a result from step 516 in FIG. 23, STA6 validates the Routing Table instance of which Dest==STA5. As a result of step 524 in FIG. 23, STA6 sets d.TxAntSector in Neighbor List instances of STA5 to an appropriate number. As a result from step 520 in FIG. 23, the determined channel time information are written in g.AccessTime in the Neighbor List instance. Further, g.AccessTime in other Neighbor List instances are returned to NULL per confirmation timeout. In the figure, data updated as a result of the process of RREP reception and RREP propagation are shown surrounded by a dashed line.

2.8.1.5. Neighbor List and Routing Table at STA5@P25

FIG. 34 illustrates an example embodiment 750 of Neighbor List and Routing Table status of STA5@P25. Neighbor lists are seen for STA2 752, STA4 754, STA6 756 with a routing table for Dest=STA7 760.

RREP frame that STA6 transmitted is received at STA5. STA5 runs the logic shown in FIG. 25, as it received an RREP frame. STA5 determines that the OrigSTA field in the RREP frame matches its own address and finishes the procedure. As a result, at time reference P25 in FIG. 29, the Neighbor List and Routing Table for STA5 are updated.

As a result from step 578 in FIG. 26, STA5 generates and validates the Routing Table instance of which Dest==STA7. As a result of step 580 of FIG. 26, STA5 validates g.AccessTime in the Neighbor List instance of STA6. As a result of step 582 in FIG. 26, STA5 sets d.TxAntSector in the Neighbor List instance of STA6 to an appropriate number.

2.9. How to Construct Routing Table (Scenario 3)

In this scenario the STA topology as seen in FIG. 2 is again assumed. In this scenario STA1 is refreshing its route to STA4. It will be noted that communications set up as a result of the above discussion are ongoing. STA1 does have a valid route to STA4, but this time, the preferable route is changing as traffic from STA5 to STA7 is added after setting up the route. The following discusses the route maintenance process in this subclause.

2.9.1. Message Sequence Chart (Scenario 3)

FIG. 35 illustrates an example embodiment 770 of overall frame exchange sequence of this route set up process. In this scenario, originating STA, STA1, starts to transmit RREQ frames to its neighbor STAs comprising STA2 772 and STA3 774, in order to refresh a route toward destination STA, STA4. The STA which received the RREQ propagates the RREQ to its neighbor STAs, unless it is the destination STA of this route set up attempt. The neighbor STAs (STA2, STA3) propagate the RREQ frames. In particular, STA2 propagates RREQ to STA3 776, STA4 778 and STA5 780, STA3 propagates the RREQ to STA2 782 and STA4 784, STA5 propagates the RREQ to STA4 786 and STA6 788, STA6 propagates RREQ to STA4 790 and STA7 792, while STA7 propagates the RREQ to STA4 794. Time periods p41 through p49 are shown, which may be referenced throughout the disclosure.

In this way it is seen that STA4 receives the RREQ frames. As this RREQ is a different route discovery process than previously discussed in scenario 1, originating STA, STA1, increments SeqNum value in the transmitting RREQ. By receiving RREQ frames from its neighbor STAs, STA4 eventually determines that the route via STA3 is now better for this transmission, and responds back with RREP frame 796 toward STA1 via STA3. Upon reception of RREP frame 796, STA3 recognizes that it is selected as an intermediate STA, and it generates and sends RREP frame 798 to STA1. When STA1 receives RREP via STA3, it recognizes that the STA is the new intermediate STA toward destination STA4. In this way, the end-end route from STA1 to STA4 (and from STA4 to STA1) is refreshed.

2.9.1.1. Neighbor List and Routing Table at STA1@P41

FIG. 36 illustrates an example embodiment 810 of Neighbor List and Routing Table status of STA1@P41. Neighbor lists are seen for STA2 812, STA3 814, with a routing table for Dest=STA4 820.

STA1 runs logic shown in FIG. 14. Now the expiration of the route toward STA4 is closely approaching, so STA1 starts RREQ generation. As in FIG. 35, STA1 transmits RREQ to STA2 and STA3 following the explained logic. At the time of RREQ transmission, time reference P41 in FIG. 35, STA1's Neighbor List and Routing Table is unchanged since the last update.

2.9.1.2. Neighbor List and Routing Table at STA2@P43

FIG. 37 illustrates an example embodiment 830 of Neighbor List and Routing Table status of STA2@P43. Neighbor lists are seen for STA1 832, STA3 834, STA4 836, STA5 838, with routing tables for Dest=STA1 840 and Dest=STA4 842.

RREQs transmitted by STA1 are received at STA2 and STA3. Upon reception of the RREQ frame, STA2 runs logic shown in FIG. 18A and FIG. 18B. STA2 updates its Routing Table and propagates RREQ frames to its neighbor STAs, following the logic.

As a result of the process of RREQ reception and RREQ propagation, time reference P43 in FIG. 35, the Neighbor List and Routing Table in relation to STA2 are updated.

As this transaction is for maintenance, no changes to Neighbor List instances are made. However, as a result from step 408 in FIG. 18B, STA2 overwrote a Routing Table instance of which the Dest=STA1 with the information obtained by the RREQ(41) reception. This happens because SeqNum of the received RREQ is greater than the one in STA2's Routing Table. In the figure, data updated as a results of the RREQ transmission process is shown surrounded by a dashed line.

2.9.1.3. Neighbor List and Routing Table at STA4@P44

FIG. 38 illustrates an example embodiment 850 for Neighbor List and Routing Table status of STA4@P44. Neighbor lists are seen for STA2 852, STA3 854, with a routing table for Dest=STA1 860. RREQ frames that STA2 transmitted are received at STA3, STA4 and STA5. The following focuses on how STA4 is configured to behave in this instance.

STA4 runs logic as shown in FIG. 18A and FIG. 18B, as it received the RREQ frame. As a result, at time reference P44 in FIG. 35, STA4's Neighbor List and Routing Table are updated.

As a result from step 398 in FIG. 18A, STA4 sets e.CandSector in Neighbor List instances of STA2 to an appropriate number. It should be noted that the BestSector is changed from 1 to 0. STA4's Tx antenna sector 1 affects STA5. Now STA5 started communication, STA4 selected Tx antenna sector 0 as more preferable sector. This decision is concluded from steps 348, 350, 352 in FIG. 16B.

Also, as a result from step 408 in FIG. 18B, STA4 updated a Routing Table instance of which the Dest=STA1. This occurs because SeqNum of the received RREQ is greater than the one in STA4's Routing Table. Also, it should be noted that the b.TxAntSec of the Routing Table instance is also updated to 0. In the figure, data updated as a results of the process of RREQ reception and RREP initiation are shown surrounded by a dashed line.

2.9.1.4. Neighbor List and Routing Table at STA3@P45

FIG. 39 illustrates an example embodiment 870 for Neighbor List and Routing Table status of STA3@P45. Neighbor lists are seen for STA1 872, STA2 874, STA4 876, with a routing table for Dest=STA1 880.

RREQ transmitted by STA1 is also received at STA3. STA3 also runs logic shown in FIG. 18A and FIG. 18B. As a result of the process of RREQ reception and RREQ propagation, time reference P45 in FIG. 35, STA3's Neighbor List and Routing Table are updated.

STA3 did not change e.CandSector in Neighbor List instances of STA1 as it has not been changed since last time (it stays 0). As a result from step 410 in FIG. 18B, Traffic ID and QoSSpec are written in g.AccessTime in the Neighbor List instance (previous record has been removed per confirmation timeout). Also, as a result from step 408 in FIG. 18B, STA3 updated a Routing Table instance of which the Dest=STA1. This occurs because SeqNum of the received RREQ is greater than the one in STA4's Routing Table.

As a result of the process of RREQ propagation, as in FIG. 35, STA3 transmits RREQ to STA2 and STA4 following the explained logic. As a result from step 304, 308 in FIG. 15B, proposed channel allocation time and associated information are written in g.AccessTime in the Neighbor List instances of STA2 and STA4. In the figure, data updated as a results of the RREQ transmission process is shown surrounded by a dashed line.

2.9.1.5. Neighbor List and Routing Table at STA4@P46

FIG. 40 illustrates an example embodiment 890 for Neighbor List and Routing Table status of STA4@P46. Neighbor lists are seen for STA2 892, STA3 894, with a routing table for Dest=STA1 900. RREQ frames that STA3 transmitted are received at STA2 and STA4. The following focuses on how STA4 is configured to behave according to the present disclosure.

STA4 runs logic as shown in FIG. 18A and FIG. 18B, as it received the RREQ frame. As a result, at time reference P46 in FIG. 35, STA4's Neighbor List and Routing Table are updated.

As a result from step 408 in FIG. 18B, STA4 updated a Routing Table instance of which the Dest=STA1. This occurs because metric value via STA3 is better (smaller) than the one in the Routing Table (210<220). The Routing Table instance is overwritten by the information received by the RREQ(47). Now the nexthop STA toward STA1 is set to STA3.

As a result from step 410 in FIG. 18B, Traffic ID and QoSSpec are written in g.AccessTime in the Neighbor List instance (previous record has been removed per confirmation timeout). In the figure, data updated as a result of the process of RREQ reception and RREP initiation are shown surrounded by a dashed line. STA4 also runs RREP transmit timer to respond with RREP via STA3.

2.9.1.6. Neighbor List and Routing Table at STA4@P47

FIG. 41 illustrates an example embodiment 910 for Neighbor List and Routing Table status of STA4@P47. Neighbor lists are seen for STA2 912, STA3 914, with a routing table for Dest=STA1 920. At STA4, RREP transmit timer expires after it received a RREQ from STA3. Per RREP transmit timer expiration, STA4 runs logic shown in FIG. 22 and transmits a RREP frame to STA3 as the nexthop STA toward STA1 is now set to STA3 in its routing table.

As a result of the RREP transmission, time reference P47 in FIG. 35, STA4's Neighbor List and Routing Table are updated.

As a result from step 516 in FIG. 23, STA4 validates the Routing Table instance of which Dest==STA1. As a result of step 524 in FIG. 23, STA4 sets d.TxAntSector in Neighbor List instances of STA3 to an appropriate number. As a result from step 520 in FIG. 23, determined channel time information are written in g.AccessTime in the Neighbor List instance of the STA3, and g.AccessTime in the Neighbor List instance of STA2 is removed as the route via STA2 is no longer valid. In the figure, data updated as a result of the RREP initiation are shown surrounded by a dashed line.

2.9.1.7. Neighbor List and Routing Table at STA3@P48

FIG. 42 illustrates an example embodiment 930 for Neighbor List and Routing Table status of STA3@P48. Neighbor lists are seen for STA1 932, STA2 934, STA4 936 with routing tables for Dest=STA1 938 and for Dest=STA4 940.

The RREP transmitted by STA4 is received at STA3. STA3 runs logic shown in FIG. 25. As a result, STA3 confirms routes and propagate the RREP to STA1.

As a result of the RREP reception and RREP propagation, time reference P48 in FIG. 35, STA3's Neighbor List and Routing Table are updated.

As a result from step 578 in FIG. 26, STA3 generates and validates the Routing Table instance of which Dest==STA4. As a result of step 580 in FIG. 26, STA3 validates g.AccessTime in the Neighbor List instance of STA4. As a result of step 582 in FIG. 26, STA3 sets d.TxAntSector in the Neighbor List instance of STA4 to an appropriate number.

As a result from step 516 in FIG. 23, STA3 validates the Routing Table instance of which Dest==STA1. As a result of step 524 in FIG. 23, STA3 sets d.TxAntSector in Neighbor List instances of STA1 to an appropriate number. As a result from step 520 in FIG. 23, determined channel time information are written in g.AccessTime in the Neighbor List instance of STA1. Further, g.AccessTime in other Neighbor List instances are returned to NULL per confirmation timeout. In the figure, data updated as a result of the process of RREP reception and RREP propagation is shown surrounded by a dashed line.

2.9.1.8. Neighbor List and Routing Table at STA1@P49

FIG. 43 illustrates an example embodiment 950 for Neighbor List and Routing Table status of STA1@P49. Neighbor lists are seen for STA2 952, STA3 954, with a routing table for Dest=STA4 960.

RREP frame that STA3 transmitted is received at STA1. STA1 runs the logic shown in FIG. 25, as it received the RREP frame. STA1 determines that the OrigSTA field in the RREP frame matches its own address and finish the procedure.

As a result, at time reference P49 in FIG. 35, STA1's Neighbor List and Routing Table are updated.

As a result from step 578 FIG. 26, STA1 updates Routing Table instance of which Dest==STA4. Now the a. NextHop of the Routing Table instance is changed to STA3, and the b.TxAntSec of the Routing Table instance is changed to 2. As a result of step 580 of FIG. 26, STA1 validates g.AccessTime in the Neighbor List instance of STA3. As a result of step 582 of FIG. 26, STA1 sets d.TxAntSector in the Neighbor List instance of STA3 to an appropriate number. Further, g.AccessTime in other Neighbor List instances (STA2) is removed as the route via STA2 is no longer valid. In the figure, data updated as a result of the process of RREP reception is shown surrounded by a dashed line.

The enhancements described in the presented technology can be readily implemented within various wireless radio networking nodes (e.g., STAs). It should also be appreciated that each of these wireless radio nodes are preferably implemented to include at least one computer processor device (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following list of embodiments:

1. An apparatus for wireless communication between stations (STAs) using directional transmission/reception, comprising: (a) a wireless communication station (STA) configured for mm-wave communication, in which said STA, and nearby STA instances of the apparatus are configured for performing sector sweep and feedback signaling to exchange antenna sector information; (b) a transmitter of said wireless communication station (STA) configured for generating directional radio transmissions to other wireless radio communication devices which are in range; (c) a receiver of said wireless communication station (STA) configured for receiving radio transmissions from other wireless radio communication devices; (d) a computer processor coupled to said transmitter and said receiver for controlling communications between itself and other wireless radio communication devices; (e) a non-transitory computer-readable memory storing instructions executable by the computer processor; (f) wherein said instructions, when executed by the computer processor, perform steps comprising: (f)(i) exchanging quantized channel gain, or path loss, information of each antenna sector with one or more neighboring stations; (f)(ii) recording received quantized channel gain information from communication with neighboring stations; (f)(iii) generating route discovery messages to neighboring stations when establishing a multiple hop routing path from an originating station to a destination station; and (f)(iv) processing received route discovery messages by (f)(iv)(A) determining link metrics with a neighboring station that generated the route discovery message, (f)(iv)(B) considering interference impact when determining transmit antenna sector to a neighboring station as a potential next hop in the routing path; (f)(iv)(C) propagating the route discovery message to a neighbor station if the station is not the destination station.

2. The apparatus of any preceding embodiment, wherein interference impact is considered in response to checking multiple antenna sectors for use and selecting a sector based on link quality and/or interference impact to neighboring stations (STAs).

3. The apparatus of any preceding embodiment, wherein channel time utilization and impact to ongoing traffic at neighboring stations are utilized in determining interference impact when establishing the multiple hop routing path.

4. The apparatus of any preceding embodiment, wherein said wireless communication station (STA) mutually exchanges quantized channel gain information and traffic activity information with neighboring stations before route discovery takes place.

5. The apparatus of any preceding embodiment, wherein channel times are assigned when the multiple hop routing path from an originating station to a destination station.

6. The apparatus of any preceding embodiment, wherein channel times are assigned in response to transmitting assigned channel time information inside the route discovery message.

7. The apparatus of any preceding embodiment, further comprising accumulating and utilizing forward link and reverse link metrics from route discovery messages when determining the routing path.

8. The apparatus of any preceding embodiment, wherein said discovery messages are utilized for transmitting received signal quality information during the route discovery process.

9. An apparatus for wireless communication between stations (STAs) using directional transmission/reception, comprising: (a) a wireless communication station (STA) configured for mm-wave communication, in which said STA, and nearby STA instances of the apparatus are configured for performing sector sweep and feedback signaling to exchange antenna sector information; (b) a transmitter of said wireless communication station (STA) configured for generating directional radio transmissions to other wireless radio communication devices which are in range; (c) a receiver of said wireless communication station (STA) configured for receiving radio transmissions from other wireless radio communication devices; (d) a computer processor coupled to said transmitter and said receiver for controlling communications between itself and other wireless radio communication devices; (e) a non-transitory computer-readable memory storing instructions executable by the computer processor; (f) wherein said instructions, when executed by the computer processor, perform steps comprising: (f)(i) exchanging quantized channel gain, or path loss, information of each antenna sector with one or more neighboring stations; (f)(ii) recording received quantized channel gain information from communication with neighboring stations; (f)(iii) generating route discovery messages to neighboring stations when establishing a multiple hop routing path from an originating station to a destination station; and (f)(iv) processing received route discovery messages by (f)(iv)(A) determining link metrics with a neighboring station that generated the route discovery message, (f)(iv)(B) considering interference impact when determining transmit antenna sector to a neighboring station as a potential next hop in the routing path; (f)(iv)(C) propagating the route discovery message to a neighbor station if the station is not the destination station; (f)(v) wherein interference impact is considered in response to checking multiple antenna sectors for use and selecting a sector based on link quality and/or interference impact to neighboring stations (STAs); and (f)(vi) wherein channel time utilization and impact to ongoing traffic at neighboring stations are utilized in determining interference impact when establishing the multiple hop routing path.

10. The apparatus of any preceding embodiment, wherein said wireless communication station (STA) mutually exchanges quantized channel gain information and traffic activity information with neighboring stations before route discovery takes place.

11. The apparatus of any preceding embodiment, wherein channel times are assigned when the multiple hop routing path from an originating station to a destination station.

12. The apparatus of any preceding embodiment, wherein channel times are assigned in response to transmitting assigned channel time information inside the route discovery message.

13. The apparatus of any preceding embodiment, further comprising accumulating and utilizing forward link and reverse link metrics from route discovery messages when determining the routing path.

14. The apparatus of any preceding embodiment, wherein said discovery messages are utilized for transmitting received signal quality information during the route discovery process.

15. A method for performing wireless communication between stations (STAs) using directional transmission/reception, comprising: (a) exchanging quantized channel gain, or path loss, information of each antenna sector with one or more neighboring stations (STAs) which are configured for mm-wave communication and sector sweep and feedback signaling to exchange antenna sector information between STAs which are configured for generating directional radio transmissions to other wireless radio communication devices which are in range, and for receiving radio transmissions from other wireless radio communication devices; (b) recording received quantized channel gain information from communication with neighboring stations; (c) generating route discovery messages to neighboring stations when establishing a multiple hop routing path from an originating station to a destination station; and (d) processing received route discovery messages by (d)(A) determining link metrics with a neighboring station that generated the route discovery message, (d)(B) considering interference impact when determining transmit antenna sector to a neighboring station as a potential next hop in the routing path; (d)(C) propagating the route discovery message to a neighbor station if the station is not the destination station.

16. The method of any preceding embodiment, wherein interference impact is considered in response to checking multiple antenna sectors for use and selecting a sector based on link quality and/or interference impact to neighboring stations (STAs).

17. The method of any preceding embodiment, wherein channel time utilization and impact to ongoing traffic at neighboring stations are utilized in determining interference impact when establishing the multiple hop routing path.

18. The method of any preceding embodiment, wherein channel times are assigned when the multiple hop routing path from an originating station to a destination station.

19. The method of any preceding embodiment, further comprising accumulating and utilizing forward link and reverse link metrics from route discovery messages when determining the routing path.

20. The method of any preceding embodiment, wherein said discovery messages are utilized for transmitting received signal quality information during the route discovery process.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication between stations (STAs) using directional transmission/reception, comprising:
    (a) a wireless communication station (STA) configured for mm-wave communication, in which said STA, and nearby STA instances of the apparatus are configured for performing sector sweep and feedback signaling to exchange antenna sector information;
    (b) a transmitter of said wireless communication station (STA) configured for generating directional radio transmissions to other wireless radio communication devices which are in range;
    (c) a receiver of said wireless communication station (STA) configured for receiving radio transmissions from other wireless radio communication devices;
    (d) a computer processor coupled to said transmitter and said receiver for controlling communications between itself and other wireless radio communication devices;
    (e) a non-transitory computer-readable memory storing instructions executable by the computer processor;
    (f) wherein said instructions, when executed by the computer processor, perform steps comprising:

(i) exchanging quantized channel gain, or path loss, information of each antenna sector with one or more neighboring stations;

(ii) recording received quantized channel gain information from communication with neighboring stations;

(iii) generating route discovery messages to neighboring stations when establishing a multiple hop routing path from an originating station to a destination station; and (iv) processing received route discovery messages by (A) determining link metrics with a neighboring station that generated the route discovery message, (B) considering interference impact when determining transmit antenna sector to a neighboring station as a potential next hop in the routing path; (C) propagating the route discovery message to a neighbor station if the station is not the destination station;

(v) wherein channel time utilization and impact to ongoing traffic at neighboring stations are utilized in determining interference impact when establishing the multiple hop routing path.

2. The apparatus of claim 1, wherein interference impact is considered in response to checking multiple antenna sectors for use and selecting a sector based on link quality and/or interference impact to neighboring stations (STAs).

3. The apparatus of claim 1, wherein said wireless communication station (STA) mutually exchanges quantized channel gain information and traffic activity information with neighboring stations before route discovery takes place.

4. The apparatus of claim 1, wherein channel times are assigned when the multiple hop routing path from an originating station to a destination station.

5. The apparatus of claim 4, wherein channel times are assigned in response to transmitting assigned channel time information inside the route discovery message.

6. The apparatus of claim 1, further comprising accumulating and utilizing forward link and reverse link metrics from route discovery messages when determining the routing path.

7. The apparatus of claim 6, wherein said discovery messages are utilized for transmitting received signal quality information during the route discovery process.

8. An apparatus for wireless communication between stations (STAs) using directional transmission/reception, comprising:

(a) a wireless communication station (STA) configured for mm-wave communication, in which said STA, and nearby STA instances of the apparatus are configured for performing sector sweep and feedback signaling to exchange antenna sector information;

(b) a transmitter of said wireless communication station (STA) configured for generating directional radio transmissions to other wireless radio communication devices which are in range;

(c) a receiver of said wireless communication station (STA) configured for receiving radio transmissions from other wireless radio communication devices;

(d) a computer processor coupled to said transmitter and said receiver for controlling communications between itself and other wireless radio communication devices;

(e) a non-transitory computer-readable memory storing instructions executable by the computer processor;

(f) wherein said instructions, when executed by the computer processor, perform steps comprising:

(i) exchanging quantized channel gain, or path loss, information of each antenna sector with one or more neighboring stations;

(ii) recording received quantized channel gain information from communication with neighboring stations;

(iii) generating route discovery messages to neighboring stations when establishing a multiple hop routing path from an originating station to a destination station; and (iv) processing received route discovery messages by (A) determining link metrics with a neighboring station that generated the route discovery message, (B) considering interference impact when determining transmit antenna sector to a neighboring station as a potential next hop in the routing path; (C) propagating the route discovery message to a neighbor station if the station is not the destination station;

(v) wherein interference impact is considered in response to checking multiple antenna sectors for use and selecting a sector based on link quality and/or interference impact to neighboring stations (STAs); and (vi) wherein channel time utilization and impact to ongoing traffic at neighboring stations are utilized in determining interference impact when establishing the multiple hop routing path.

9. The apparatus of claim 8, wherein said wireless communication station (STA) mutually exchanges quantized channel gain information and traffic activity information with neighboring stations before route discovery takes place.

10. The apparatus of claim 8, wherein channel times are assigned when the multiple hop routing path from an originating station to a destination station.

11. The apparatus of claim 10, wherein channel times are assigned in response to transmitting assigned channel time information inside the route discovery message.

12. The apparatus of claim 8, further comprising accumulating and utilizing forward link and reverse link metrics from route discovery messages when determining the routing path.

13. The apparatus of claim 12, wherein said discovery messages are utilized for transmitting received signal quality information during the route discovery process.

14. A method for performing wireless communication between stations (STAs) using directional transmission/reception, comprising:

(a) exchanging quantized channel gain, or path loss, information of each antenna sector with one or more neighboring stations (STAs) which are configured for mm-wave communication and sector sweep and feedback signaling to exchange antenna sector information between STAs which are configured for generating directional radio transmissions to other wireless radio communication devices which are in range, and for receiving radio transmissions from other wireless radio communication devices;

(b) recording received quantized channel gain information from communication with neighboring stations;

(c) generating route discovery messages to neighboring stations when establishing a multiple hop routing path from an originating station to a destination station; and (d) processing received route discovery messages by (A) determining link metrics with a neighboring station that generated the route discovery message, (B) considering interference impact when determining transmit antenna sector to a neighboring station as a potential next hop in the routing path; (C) propagating the route discovery message to a neighbor station if the station is not the destination station;

(e) wherein channel time utilization and impact to ongoing traffic at neighboring stations are utilized in determining interference impact when establishing the multiple hop routing path.

15. The method of claim 14, wherein interference impact is considered in response to checking multiple antenna sectors for use and selecting a sector based on link quality and/or interference impact to neighboring stations (STAs).

16. The method of claim 14, wherein channel times are assigned when the multiple hop routing path from an originating station to a destination station.

17. The method of claim 14, further comprising accumulating and utilizing forward link and reverse link metrics from route discovery messages when determining the routing path.

18. The method of claim 17, wherein said discovery messages are utilized for transmitting received signal quality information during the route discovery process.

* * * * *